May 30, 1967     J. G. VERGOBBI     3,322,043
APPARATUS FOR PRODUCING A LINED CARTON
Filed April 13, 1964                        32 Sheets-Sheet 1

INVENTOR.
John G. Vergobbi
BY Robert R. Churchill
ATTORNEY

May 30, 1967 J. G. VERGOBBI 3,322,043
APPARATUS FOR PRODUCING A LINED CARTON
Filed April 13, 1964 32 Sheets-Sheet 4

INVENTOR.
John G. Vergobbi
BY Robert L. Churchill
ATTORNEY

INVENTOR.
John G. Vergobbi
BY Robert R. Churchill
ATTORNEY

INVENTOR.
John G. Vergobbi

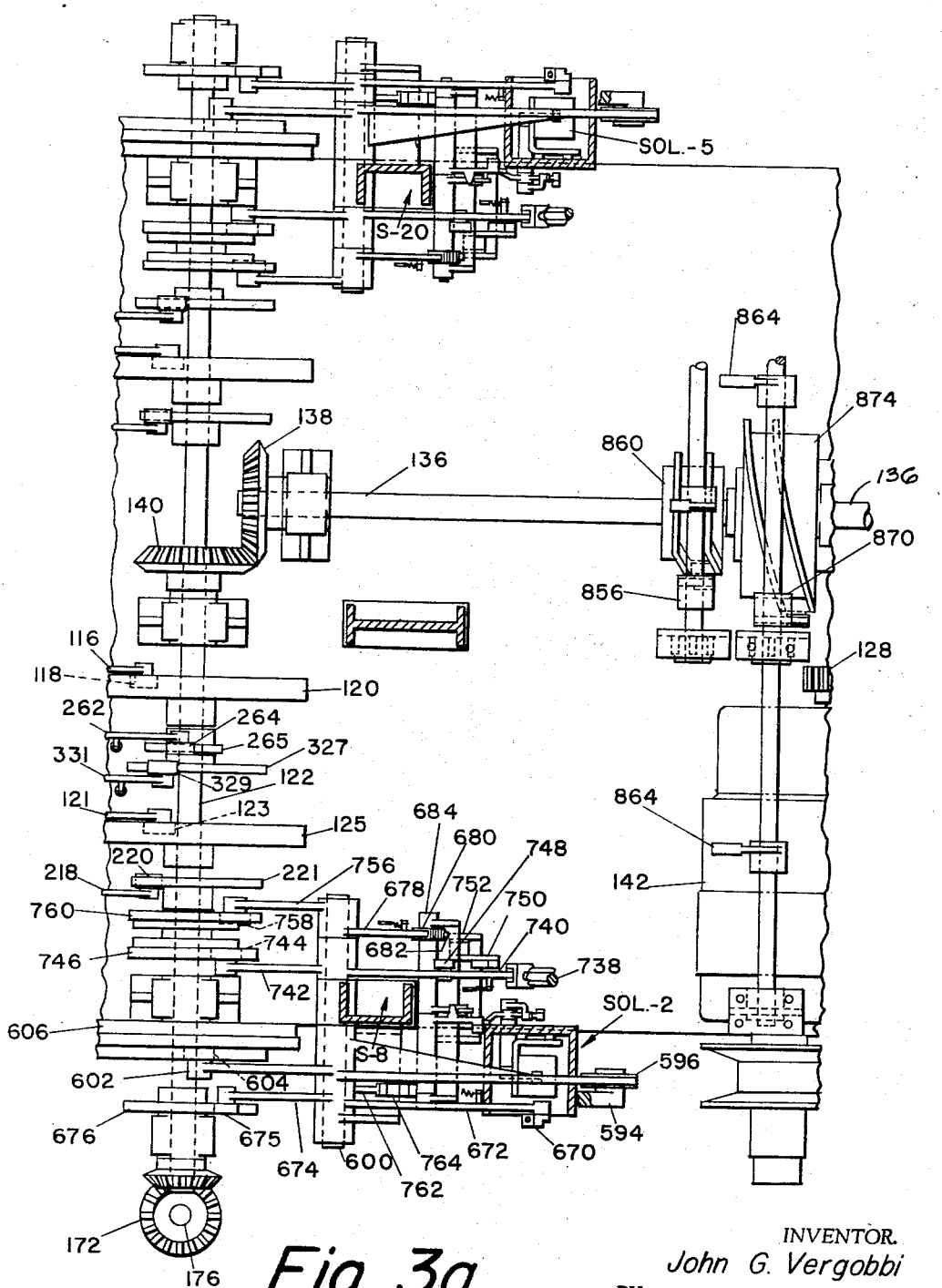

INVENTOR.
John G. Vergobbi
BY Robert R. Churchill
ATTORNEY

INVENTOR.
John G. Vergobbi
BY Robert R. Churchill
ATTORNEY

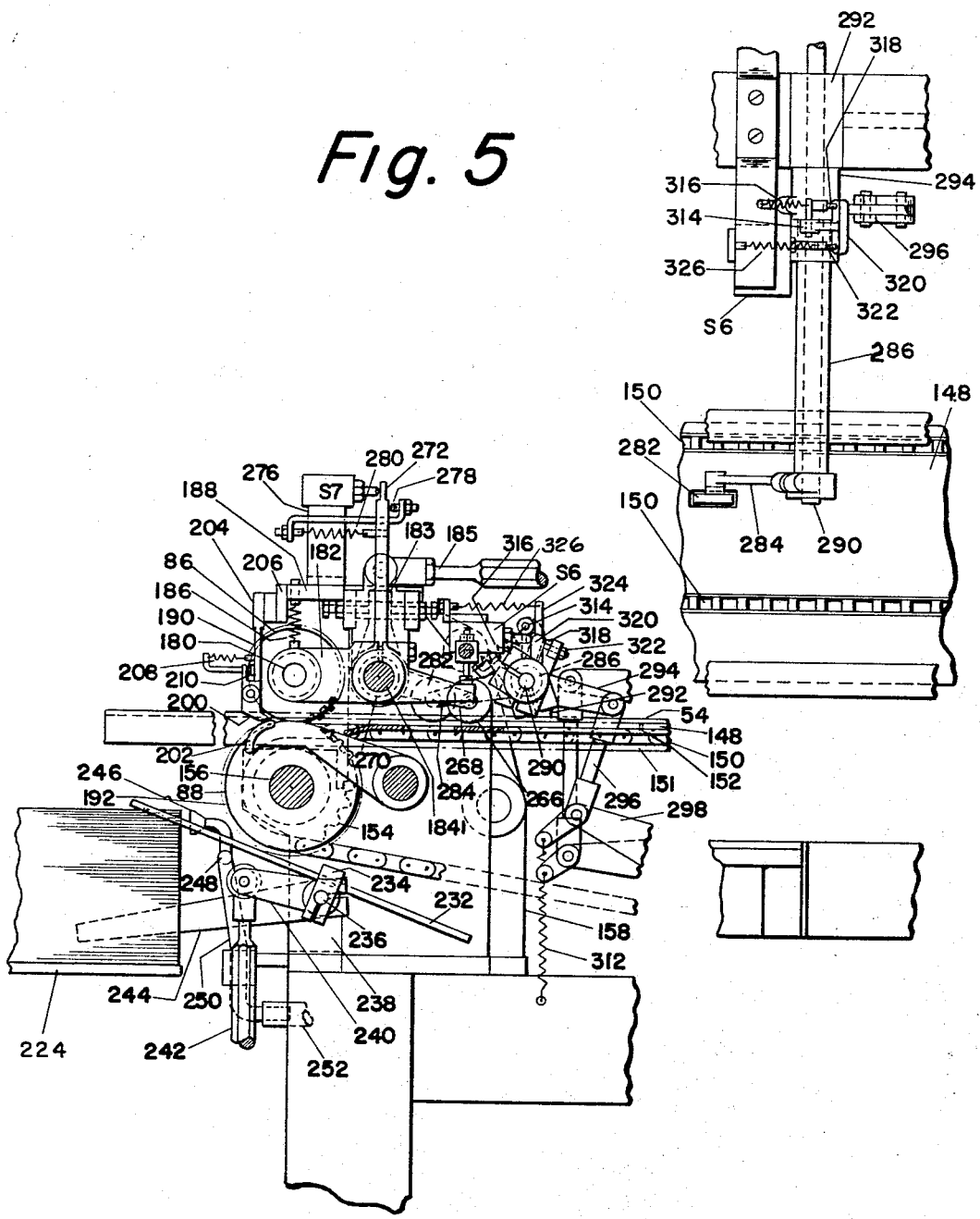

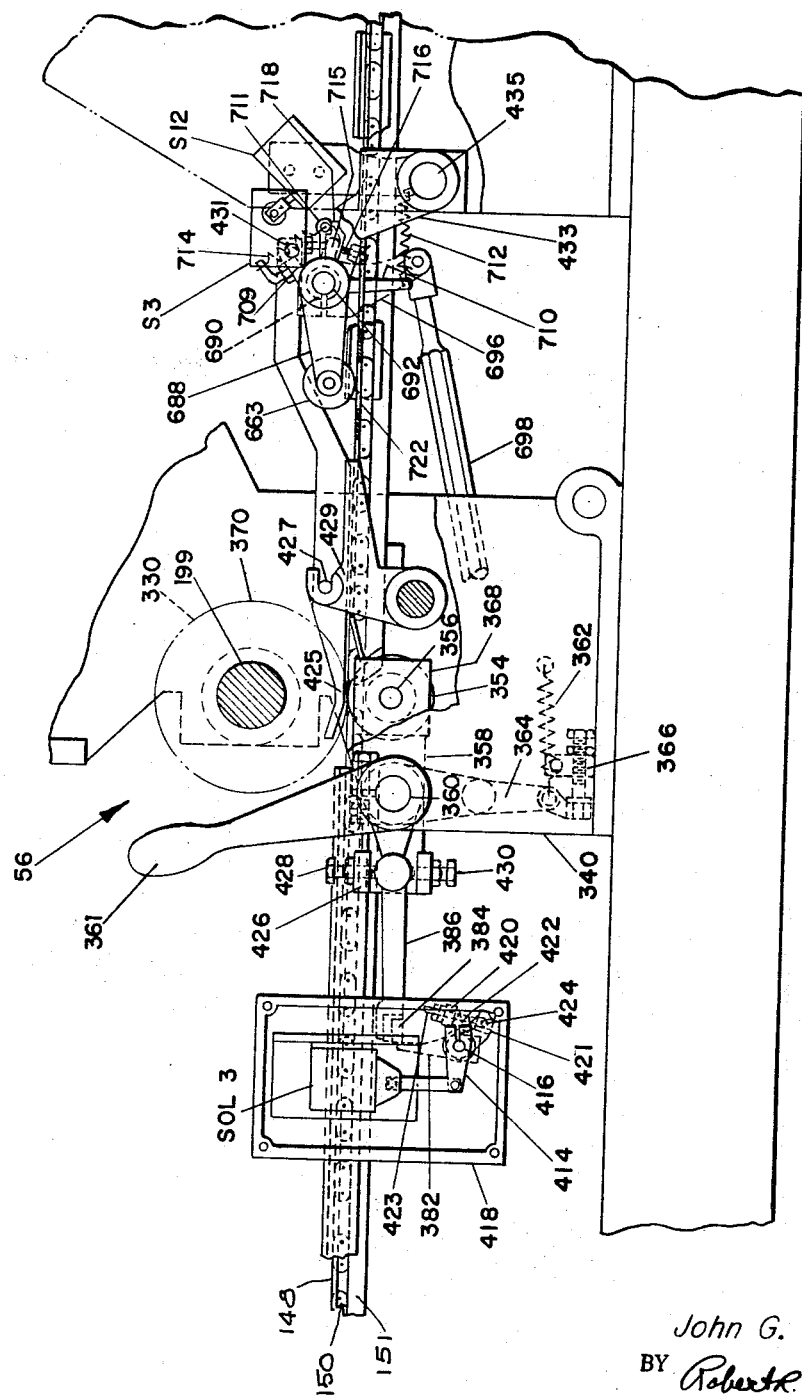

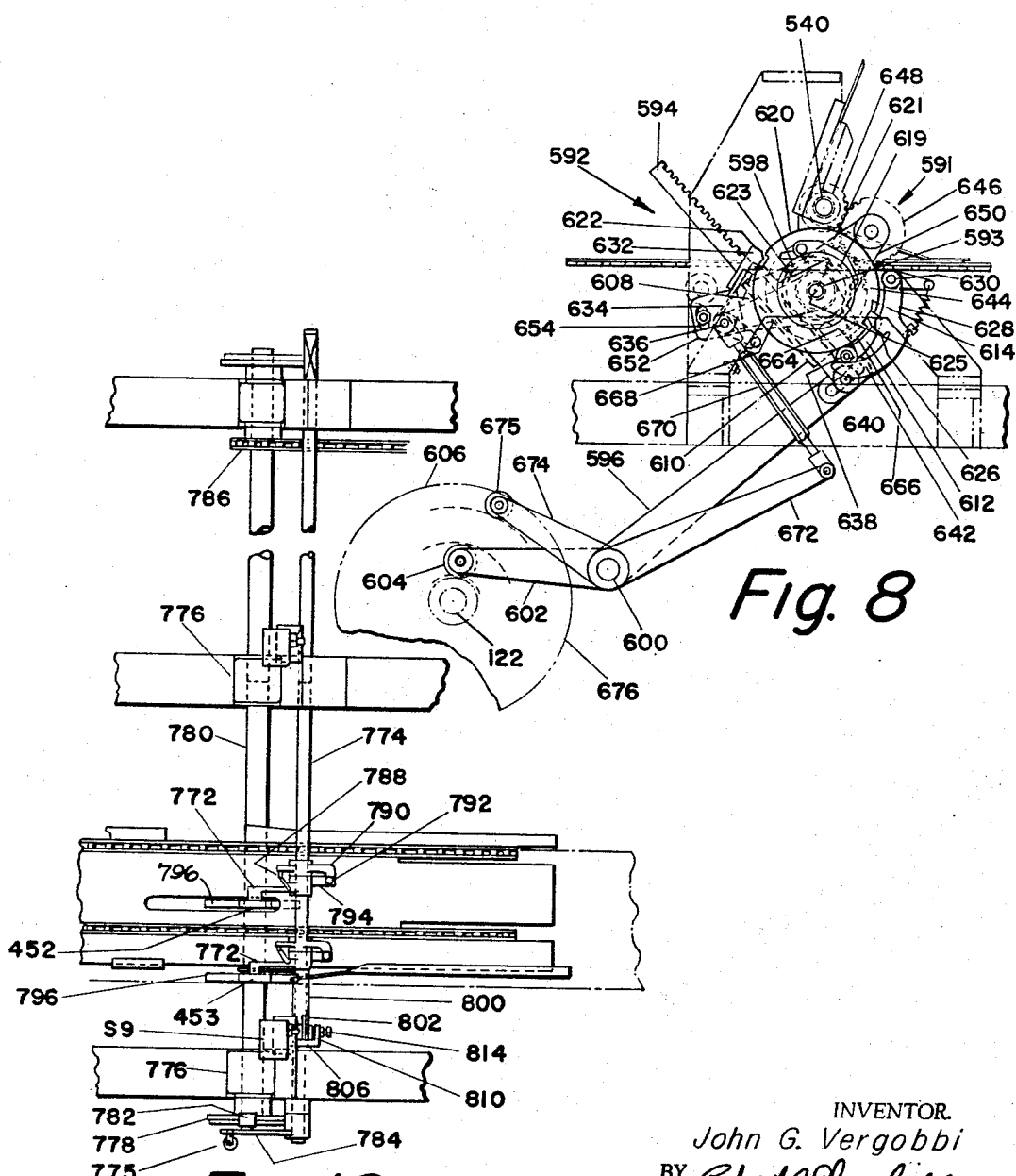

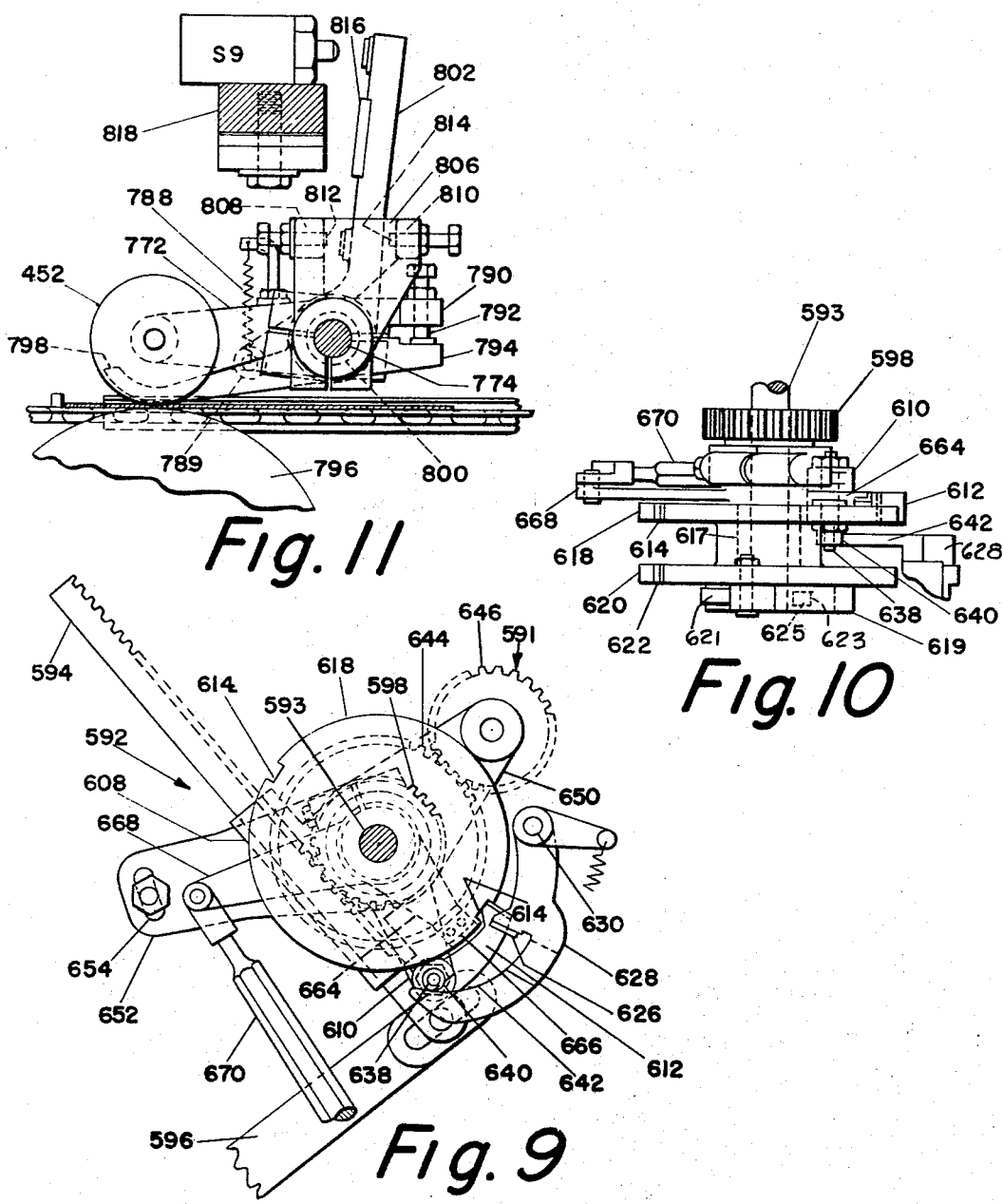

May 30, 1967     J. G. VERGOBBI     3,322,043
APPARATUS FOR PRODUCING A LINED CARTON

Filed April 13, 1964

INVENTOR.
John G. Vergobbi
BY Robert Churchill

ATTORNEY

May 30, 1967   J. G. VERGOBBI   3,322,043
APPARATUS FOR PRODUCING A LINED CARTON
Filed April 13, 1964   32 Sheets-Sheet 13
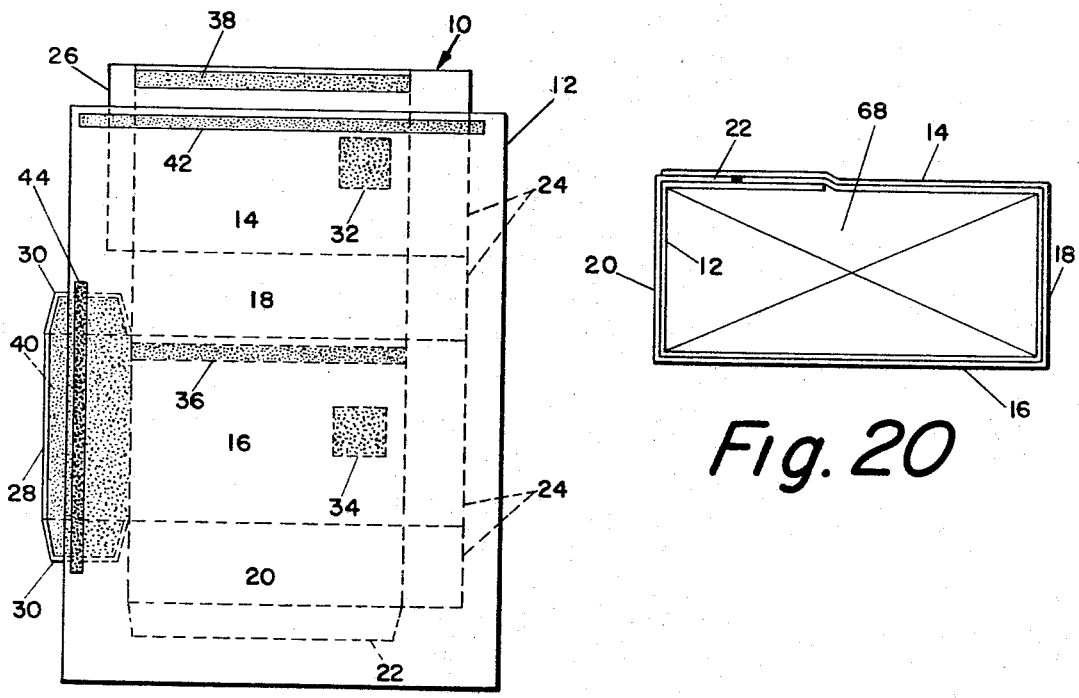
Fig. 20
Fig. 15
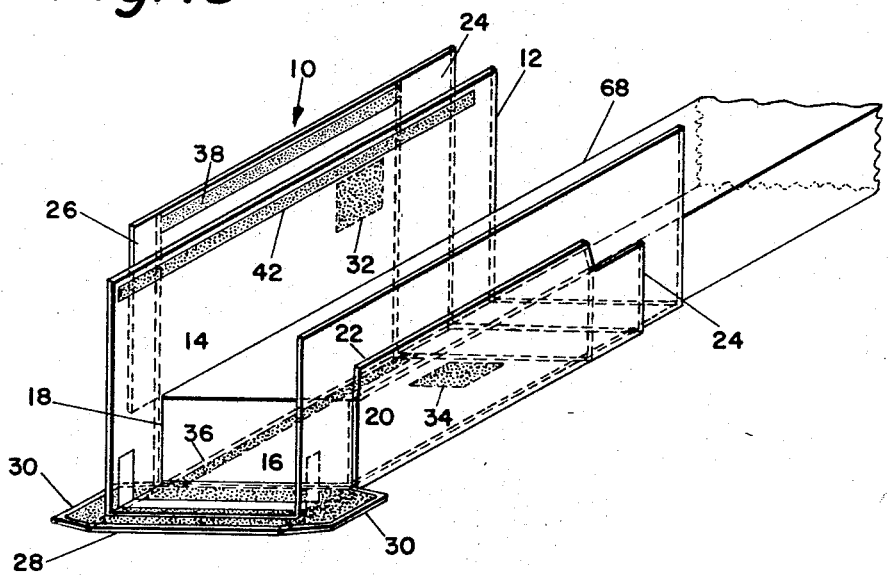
Fig. 16
INVENTOR.
John G. Vergobbi
BY Robert L. Churchill
ATTORNEY May 30, 1967   J. G. VERGOBBI   3,322,043
APPARATUS FOR PRODUCING A LINED CARTON
Filed April 13, 1964   32 Sheets-Sheet 20
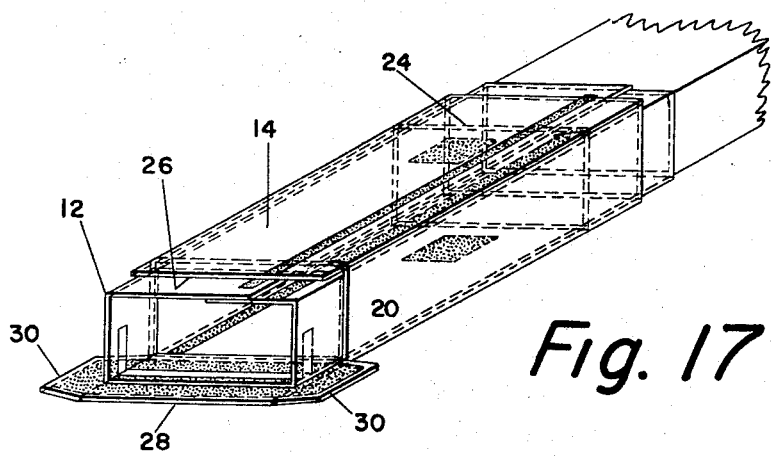
*Fig. 17*
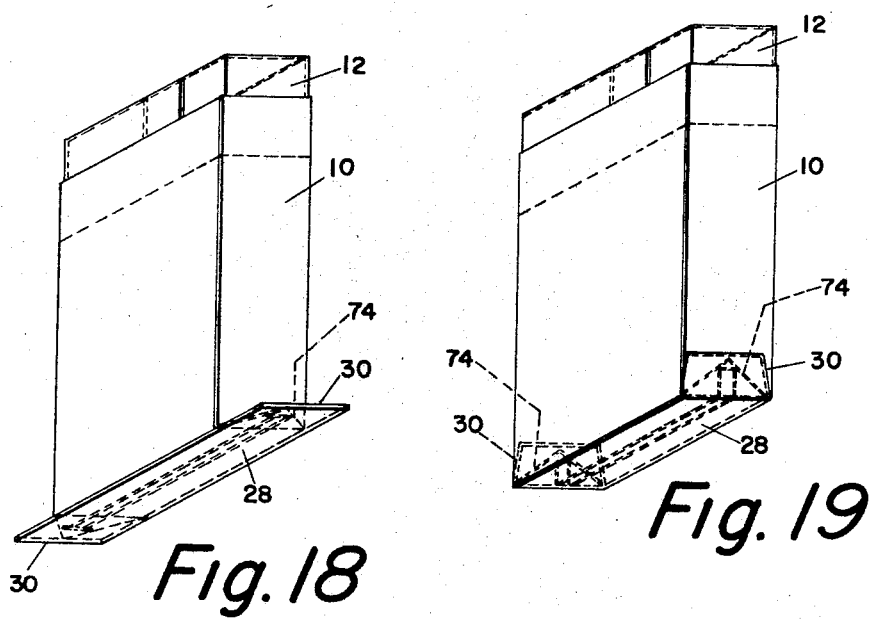
*Fig. 18*   *Fig. 19*
INVENTOR.
John G. Vergobbi
BY Robert R. Churchill
ATTORNEY INVENTOR.
John G. Vergobbi May 30, 1967  J. G. VERGOBBI  3,322,043
APPARATUS FOR PRODUCING A LINED CARTON
Filed April 13, 1964  32 Sheets-Sheet 25

INVENTOR.
John G. Vergobbi
BY Robert C. Churchill
ATTORNEY

May 30, 1967 J. G. VERGOBBI 3,322,043
APPARATUS FOR PRODUCING A LINED CARTON
Filed April 13, 1964 32 Sheets-Sheet 26

INVENTOR.
John G. Vergobbi
BY Robert C. Churchill
ATTORNEY

INVENTOR.
John G. Vergobbi
BY Robert P. Churchill
ATTORNEY

INVENTOR.
John G. Vergobbi
BY Robert A. Churchill
ATTORNEY

May 30, 1967    J. G. VERGOBBI    3,322,043
APPARATUS FOR PRODUCING A LINED CARTON
Filed April 13, 1964    32 Sheets-Sheet 30

INVENTOR.
John G. Vergobbi
BY Robert C. Churchill
ATTORNEY

May 30, 1967 J. G. VERGOBBI 3,322,043
APPARATUS FOR PRODUCING A LINED CARTON
Filed April 13, 1964 32 Sheets-Sheet 31

INVENTOR.
John G. Vergobbi
BY
ATTORNEY

May 30, 1967 — J. G. VERGOBBI — 3,322,043
APPARATUS FOR PRODUCING A LINED CARTON
Filed April 13, 1964 — 32 Sheets-Sheet 32

INVENTOR.
John G. Vergobbi
BY Robert C. Churchill
ATTORNEY

United States Patent Office 3,322,043
Patented May 30, 1967

3,322,043
APPARATUS FOR PRODUCING A LINED CARTON
John G. Vergobbi, Quincy, Mass., assignor to Pneumatic Scale Corporation, Limited, Quincy, Mass., a corporation of Massachusetts
Filed Apr. 13, 1964, Ser. No. 359,312
55 Claims. (Cl. 93—36.01)

This invention relates to apparatus for producing a lined carton.

The invention has for an object to provide novel and improved apparatus for producing a lined carton characterized by structure capable of producing lined cartons in a rapid, economical and efficient manner.

The invention has for another object to provide novel and improved apparatus of the character specified having duplicate carton forming mechanisms operating simultaneously through common driving means and adapted to produce lined cartons of the same or of different sizes.

A further object of the invention is to provide novel and improved apparatus of the character specified having novel control means adapted to discontinue the feed of carton blanks and lining material when the supply of lined cartons exceeds a demand therefor while permitting the machine to continue in operation to complete production of the lined cartons started through the machine whereby to clear the machine and to avoid stopping the machine with partially formed lined cartons therein.

A still further object of the invention is to provide novel and improved apparatus of the character specified having duplex carton forming mechanisms for producing two lined cartons simultaneously each cycle of operation and which is characterized by a compact design wherein the apparatus occupies a minimum floor area as compared with prior machines which produce but one lined carton each cycle.

With these general objects in view and such others as may herein after appear, the invention consists in the apparatus for producing lined cartons and in the various structures, arrangements and combinations of parts hereinafter described and particularly defined in the claims at the end of this specification.

In the drawings illustrating the preferred embodiment of the invention:

FIGS. 1, 1a, 1b and 1c, taken together, comprise a side elevation, partly in cross section, of the apparatus for producing lined cartons embodying in the present invention;

FIGS. 2, 2a, 2b and 2c, taken together, comprise a plan view of the same;

FIGS. 3, 3a, 3b, and 3c, taken together, comprise a plan view of the lower portion of the machine showing the drives and cam shafts;

FIG. 4 is a detail view in side elevation of the carton blank receiving end of the machine and showing various safety devices;

FIG. 5 is a plan view of a portion of the mechanism shown in FIG. 4;

FIG. 6 is a side elevation detail view of the carton adhesive applying mechanism and showing the safety devices associated therewith;

FIG. 8 is a detail view in side elevation of the lining indexing and advancing mechanism;

FIG. 9 is an enlarged detail view in side elevation of a portion of the mechanism shown in FIG. 8;

FIG. 10 is a plan view detail of the mechanism shown in FIG. 9;

FIG. 11 is a detail view in side elevation of the carton and lining combining roll and safety mechanism associated therewith;

FIG. 12 is a plan view of the mechanism shown in FIG. 11;

FIG. 15 is a plan view of a prescored lining blank provided with a lining sheet;

FIGS. 16 to 19 are perspective views showing the steps followed in producing a lined carton;

FIG. 20 is an end view showing the carton and lining wrapped about the forming block;

FIG. 36 is a wiring diagram to be referred to; and

Figure 1:
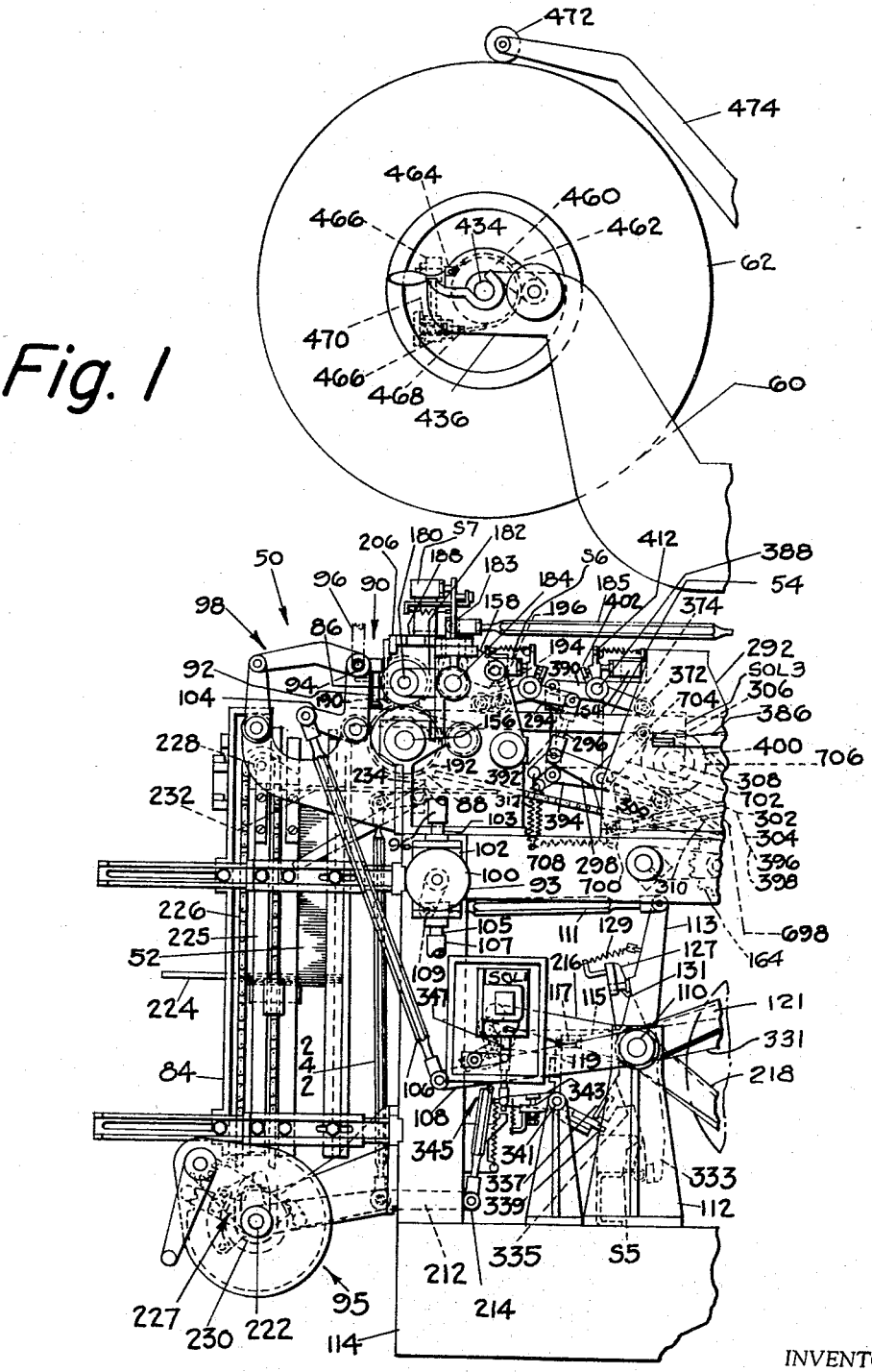

In general the present invention contemplates novel and improved apparatus for producing lined cartons in a rapid and expedient manner wherein provision is made for combining a lining sheet with a flat prescored carton blank prior to the carton forming operation. Provision is made for continuously advancing successive carton blanks with their attached lining sheets into operative relation to successive intermittently operated forming blocks about which the composite carton blanks and lining sheets are folded to form a tubular member having a sealed side seam. Thereafter, provision is made for folding extended portions of the tubular member against the end of the block and for sealing the same to produce a bottom closure. The completed lined carton is then stripped from its forming block and transferred to a conveyer having provision for accumulating a supply of lined cartons and for releasing successive foremost cartons into a succeeding machine, such as a filling or weighing machine in the packaging line.

In accordance with a feature of the present apparatus duplex mechanisms are provided, which are driven from a common source, for producing two lined cartons simultaneously each cycle of operation. The duplex apparatus is constructed so as to occupy a relatively small floor space as compared to the floor space occupied by prior carton making machines which produced a single lined carton each cycle. In practice the floor space for the present duplex apparatus is substantially the same as that occupied by the prior single carton machines. Thus, the production capacity of the present apparatus is practically doubled while occupying the same floor space as the prior single carton machines. Novel provision is also made for controlling the apparatus in response to the demand for cartons by a succeeding machine, such as a filling machine, in a manner such as to discontinue the feed of carton blanks when the supply of cartons exceeds the demand while permitting the carton forming mechanism to continue in operation to complete those cartons already started through the mechanism so as to avoid leaving partially completed cartons in the mechanism when the apparatus is brought to rest.

Referring now to the drawings, and particularly to FIGS. 15 to 20, the present apparatus is arranged to produce lined cartons of the type shown in FIG. 19 in the sequence illustrated wherein a flat prescored carton blank 10 is provided with a lining sheet 12 adhesively secured thereto as shown in FIG. 15. The prescored carton blank 10 is provided with side wall panels 14, 16 and end wall panels 18, 20 having a sealing flap 22 connected thereto. The carton blank is also provided with conventional top closing flaps 24. The bottom closing flaps comprise a relatively short side flap 26 and a wide side flap 28. The end wall panels 18, 20 are free of bottom closing flaps, and the wide side flap 28 is provided with laterally extended flaps 30 adapted to be folded against the end wall panels 18, 20 in the completed carton.

Prior to combining the lining sheet 12 with the carton blank 10 the latter is provided with adhesive at selected areas thereof by which the lining is secured to the carton blank and by which the carton side seam and bottom closure are sealed. As illustrated in FIG. 15, adhesive is applied to the inner faces or upper surfaces of the side wall panels 14, 16 at the areas indicated at 32, 34, respectively, and a strip of adhesive 36 is applied along one side of the panel 16 adjacent the end wall panel 18 as shown. The carton blank 10 is also provided with a strip of adhesive 38 along the outer marginal edge of the side wall panel 14 for sealing the side seam, and also over the entire bottom closing flap 28 and connected end flaps 30, as indicated at 40, for sealing the bottom closure. The lining sheet 12 is provided with a strip of adhesive 42 along a marginal edge thereof for the lining side seam, and a second strip is provided at 44 along the lining bottom closing area as illustrated.

In general the present apparatus is embodied in a machine for producing lined cartons and is provided with duplicate carton forming lines, indicated generally at 46, 48, having duplicate mechanisms driven from a common source for producing two lined cartons simultaneously. For convenience of description the carton forming lines 46, 48 may be referred to as left hand and right hand lines, respectively, a description of one line applying also to the other line except as may be hereinafter pointed out. Each carton forming mechanism includes mechanism generally indicated at 50 for transferring successive prescored carton blanks 10 in spaced relation from a stack 52 thereof onto a continuously moving conveyer 54. During the continuous advance of the carton blanks they are provided with a suitable adhesive at the selected areas indicated at 32, 34, 36, 38 and 40 by adhesive applying mechanism indicated generally at 56. The carton blank 10 is then advanced into operative relation to lining feed mechanism indicated generally at 58 wherein the leading end of a web 60 continuously withdrawn from a roll 62 of lining material is intermittently advanced and applied to the upper surface of the blank and severed from the web as the blank is continuously advanced. Prior to being applied to the carton blank the web of lining material is also provided with strips of a suitable adhesive at the areas 42, 44 by adhesive applying mechanism indicated generally at 64.

Thereafter, successive continuously moving composite lining and carton blanks are engaged by an intermittently operated pusher, indicated generally at 65, and advanced into operative relation to the carton forming mechanism, indicated generally at 66, which comprises an intermittently operated spider rotatable on a horizontal axis and having a plurality of radially extended forming blocks 68 intermittently rotated in a vertical plane. In operation each intermittently operated forming block 68 engages the lined carton blank and folds the same around three sides of the forming block along the prescored lines during movement of the forming block from one station to a second station of operation, leaving side wall panel 14 and side seam flap 22 extended beyond the sides of the block as shown in FIG. 16. The extended side wall panel 14 and flap 22 are then folded over the upper surface of the block at station 71 to present the marginal portions of the lining blank in overlapping relation and also to present the marginal portions of the carton blank in overlapping relation to form independent lining and carton blank side seams as indicated in FIGS. 17 and 20. The side seams are then engaged by a presser element 70 to set the seals, the side seam pressing element 70 remaining in engagement with its forming block during the remainder of the carton forming an operation until the time the carton is about to be stripped from the block.

At the next station of operation opposed bottom closing side flaps 26, 28 are folded inwardly with their extended lining portions by mechanism indicated at 72 to form independent overlapping seams for the lining and the carton and to form laterally extended triangular lining tabs 74 as shown in FIG. 18. At the next station of operation the partially formed bottom closure is pressed by presser mechanism 76 to set the seals. During intermittent movement of the forming block 68 from the end press station to the next station, the laterally extended end flaps 30 and the triangular lining tabs 74 are folded inwardly against the end wall panels 18, 20 of the lined carton by folding bars 78 with the triangular lining portions 74 under the carton end flaps 30. When the forming block comes to rest, provision is made for pressing the end flaps 30 into firm adhesive engagement with the end wall panels 18, 20 by toggle mechanism indicated generally at 79 to complete the production of a lined carton open at one end as shown in FIG. 19. At the final station of operation the lined carton is stripped from the block by mechanism indicated generally at 80 to be delivered to a discharge conveyer. The carton stripped from a forming block in one line 46 of the duplex unit are delivered to a conveyer 82, and those produced in the other line 48 are delivered to a conveyer 83.

Referring now to FIG. 1 for a more detailed description of the operating mechanisms, the stack 52 of carton forming blanks, which comprise the flat prescored blanks 10, are supported in a magazine 84, and successive uppermost blanks are arranged to be transferred onto the continuously moving conveyer 54. In operation successive uppermost carton blanks in the stack are transferred into operative relation to feed rolls 86, 88 by suction transfer means indicated generally at 90 arranged to withdraw the uppermost blank in the stack and to lift the blank upwardly and forwardly to present the leading edge of the blank to the feed rolls 86, 88. It will be observed that the blank is advanced longitudinally relative to the length of the carton to be formed with the top closing flaps at the leading edge and with the bottom closing flaps at the trailing edge. The suction transfer means 90 may be of a known type, such as illustrated and described in my United States Patent No. 2,890,047, issued June 9, 1959, and includes a plurality of suction cups 92 carried by a hollow pipe 94 connected to a source of vacuum through a flexible hose 96 as shown in FIG. 1. The suction line to the cups 92 includes a cam operated rotary control valve 93 by which the vacuum may be connected and disconnected to the suction cups each cycle of operation. The hollow pipe 94 is carried by parallel linkage indicated generally at 98 arranged to be operated from the carton forming machine through connections designed to rock the parallel linkage 98 to effect the transfer operation. The stack of blanks 52 may be kept at a constant level in the magazine by elevating mechanism indicated generally at 95 in FIG. 1 and which operates to automatically elevate the stack periodically to compensate for the blanks which have been withdrawn by the suction transfer mechanism.

Figure 3:
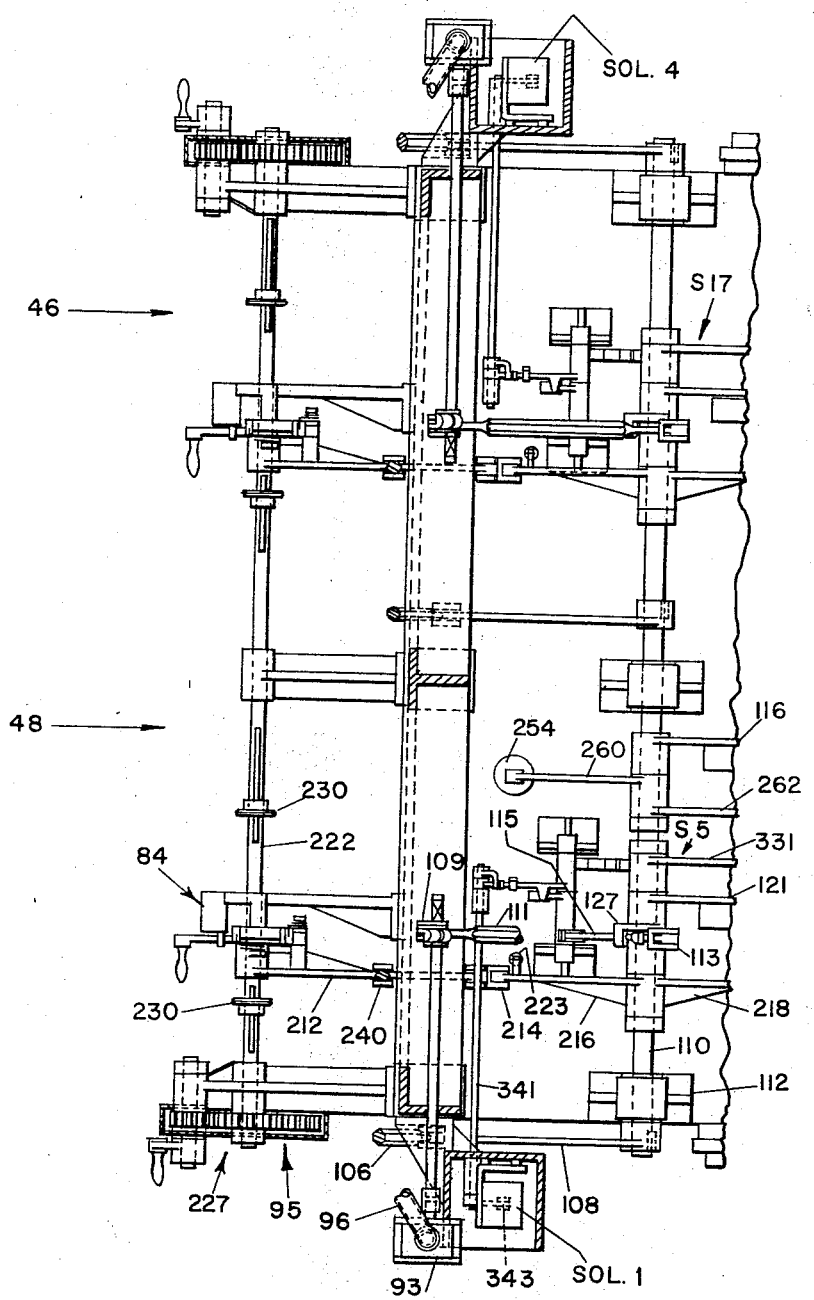
Figure 23:
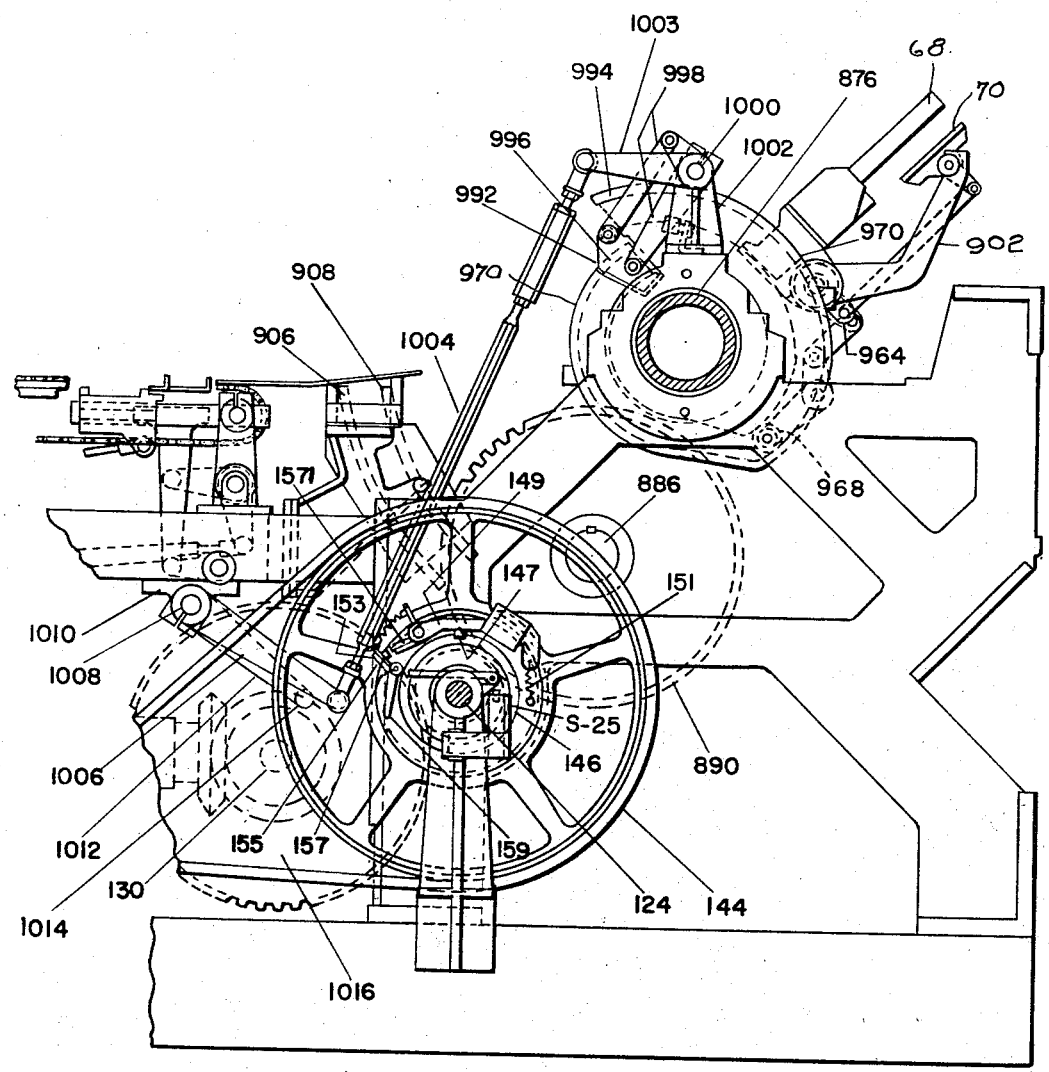
FIG. 23 is a side elevation showing a portion of the driving mechanism and illustrating a stationary cam for controlling the side seam clamping mechanism.

As illustrated in FIG. 1, the parallel linkage 98 includes a bell crank having an arm 104 connected by a link 106 to an arm 108 keyed to a rocker shaft 110 journaled in brackets 112 secured to the base 114 of the machine. A cam lever 116, also keyed to the rocker shaft, carriers a roller 118 arranged to cooperate with a cam 120 fast on a cam shaft 122 which extends transversely of the machine. As illustrated in FIGS. 3 to 3c, the cam shaft 122 forms one of a series of interconnected cam shafts driven from the main drive shaft 124, which latter is provided with a pinion 126 in mesh with a gear 128 fast on a cam shaft 130 which also extends transversely of the machine. The cam shaft 130 is connected by bevel gears 132, 134 to a cam shaft 136 extended longitudinally of the machine which in turn is connected by bevel gears 138, 140 to the cam shaft 122. The main drive shaft 124 is driven by a conventional brake motor 142 belted to a pulley 144 which is mounted for rotation on the main drive shaft and is arranged to be connected in driving engagement therewith through an overload safety clutch which includes a notched disk 146 keyed to the main drive shaft 124, and a pawl 147 mounted in an arm 149 pivotally carried by the drive pulley 144 for cooperation with the notched disk 146. The notch engaging walls of the pawl 147 are slightly tapered for cooperation with the correspondingly shaped walls of the notch in the disk 146 (FIG. 23). The pawl 147 is urged into engagement with its notch by a spring 151, and the angle of the taper is such as to maintain the clutch elements in driving engagement under normal load conditions and to be forced out of driving engagement under abnormal load conditions which might occur in the event of a jam of the driving connections in any part of the apparatus, thus preventing damage to the parts. Provision is made for locking the pawl arm 149 in its outwardly rocked non-driving engagement by a spring urged latch 153 carried by an arm 155 pivotally mounted at 157. As herein shown, when the pawl is disengaged from the notch the latch will be rocked in front of a latch plate 1571 carried by an extension of the pawl arm. The latch arm 155 is also provided with a handle 159 for manually moving the latch 153 to release the pawl 147 when the machine is free of its jammed condition.

Figure 3B:
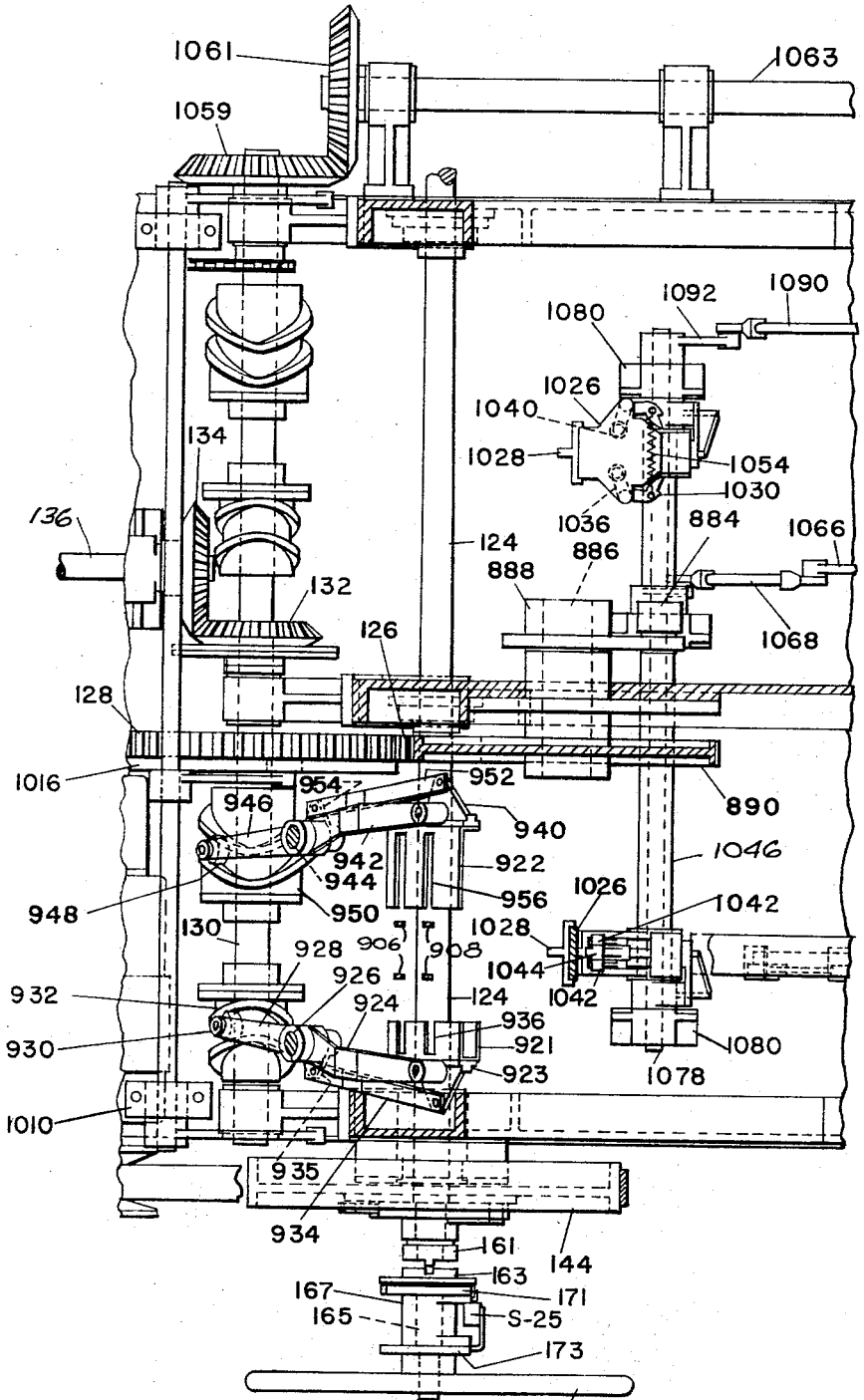
Figure 3C:
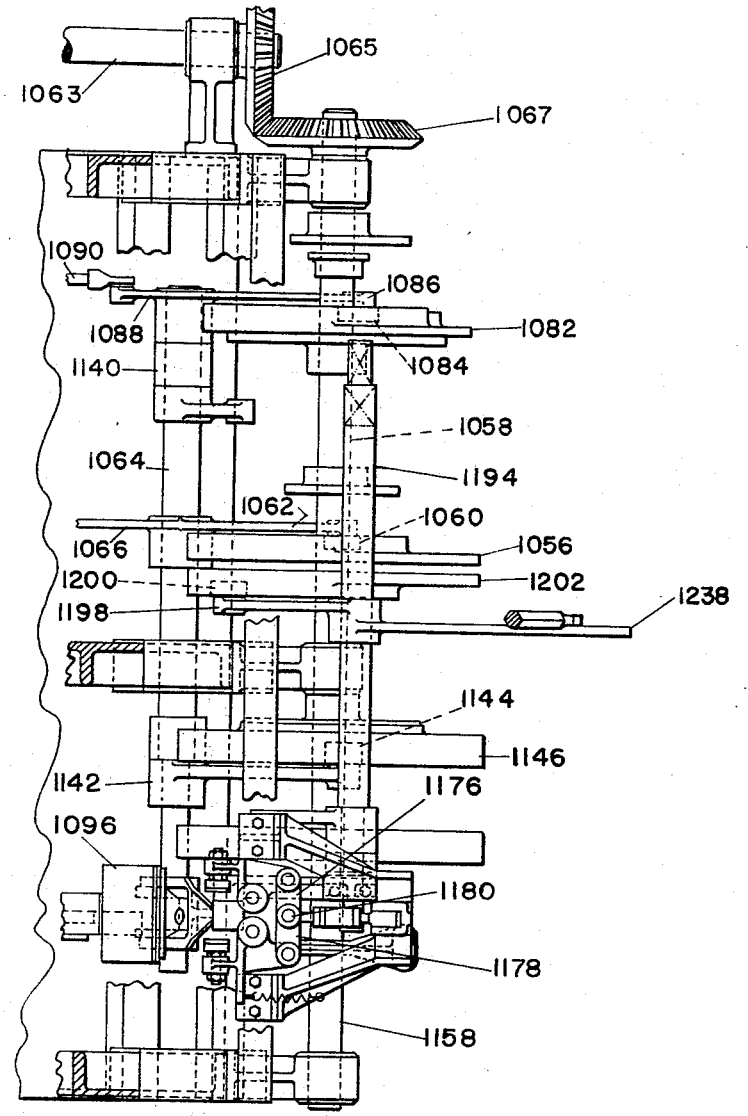

Each end of the transversely extended drive shaft 124 is provided with a clutch disk 161 arranged to be engaged by a cooperating disk 163 carried by similar shafts 165 slidably and rotatably supported in brackets 167 as shown in FIG. 3b. Each shaft 165 is provided with a handwheel 169 and is normally disengaged from the drive shaft 124 as shown. In order to effect inward movement of the shaft 165 to engage the clutch disks 161, 163, a pivotally mounted locking bar 171 is first rocked out of locking position, and when the shaft is pushed inwardly a second locking bar 173 falls into locking position to hold the clutch disks engaged. In order to prevent inadvertent engagement of a handwheel shaft 165 with the drive shaft 124 when the machine is running a microswitch S25 is arranged to be opened upon lifting of the locking bar 171 out of its locking position. The microswitch forms part of the motor circuit and when actuated will discontinue the circuit to the motor to stop the machine as diagrammatically shown in FIG. 36. The microswitch S25 is provided for the drive connection to the left hand line, and a corresponding switch S26 is provided for the drive connection to the right hand line.

It will be understood that in the following description of one carton making line 46, duplicate mechanisms are provided for the second line 48 which operate simultaneously to produce lined cartons in both lines. In some instances individual cams are provided for operating the mechanisms in each line, and in other instances a single cam is provided for operating the mechanisms in both lines as will hereinafter appear. For example, the operating mechanism for the two suction transfer mechanisms 90 includes but a single cam 120 and cam lever 116 arranged to rock the rocker shaft 110, and the rocker shaft 110 is provided with operating connections individual to each carton transfer mechanism as illustrated. However, in practice individual cams may be provided for each line.

Provision is made for operating the vacuum control valve 93 to connect the vacuum to the suction cups 92 in time to pick up a carton blank 10 and to open the vacuum to the atmosphere after the blank has been presented in operative relation to be engaged by the feed rolls 86, 88. The valve 93 is supported in a housing 100 connected to a bracket 102 attached to the machine frame. The valve is provided with an outlet 103 to which the end of the flexible hose 96 is connected and an inlet 105 connected by a pipe 107 to a source of suction, such as a vacuum pump. The valve is further provided with an arm 109 connected by a link 111 to one arm 113 of a two-armed lever pivotally mounted on the rocker shaft 110. The second arm 115 of the two-armed lever is provided with a latch member 117 arranged to cooperate with a solenoid operated latch 119 forming a part of a control mechanism including a solenoid SOL–1 which is arranged to lock the valve operating arm 113 in a position to hold the vacuum valve open to the atmosphere so as to prevent feeding of carton blanks as will hereinafter be more fully described. A second two-armed lever pivotally mounted on the rocker shaft 110 adjacent the first two-armed lever includes a cam lever 121 which carries a roll 123 for cooperation with a cam 125 fast on the cam shaft 122, and an integral arm 127 which is connected to the arm 113 by a spring 129 which urges the arm 113 against a stop screw 131 carried by the arm 127. In operation the arm 113 will move along with the arm 127 to operate the valve 93 each cycle during normal operation and will continue to operate in this manner until the latch 117 is engaged by the solenoid operated latch 119 whereupon the valve operating arm 113 will be held in a position to maintain the vacuum valve 93 open to the atmosphere so that the feed of carton blanks will be discontinued when the solenoid is energized. In this manner the cam operated arms 121, 127 may continue to follow the cam 125 by virtue of the resilient connection between the arms 113, 127. It will be understood that a cam 125 and associated linkage is provided for operating individual vacuum control valves 93 for each carton making line of the duplex apparatus so as to permit independent operation of each line.

It may be stated here that the solenoid operated latch 119, normally in a position to permit free rocking movement of the cam operated vacuum valve linkage to continue the transfer of successive carton blanks into the machine, is arranged to latch the linkage in an inoperative position to discontinue the transfer of carton blanks when the supply of lined containers produced by the machine exceeds the demand therefor by a filling machine or other succeeding machine in the packaging line. Provision is made for detecting such condition and for energizing the solenoid SOL–1 when such condition is detected to discontinue the transfer of carton blanks. However, in accordance with a feature of the present invention, provision is made for permitting the machine to continue in operation even though the transfer of carton blanks is discontinued so as to complete the production of the lined cartons already started through the machine whereby to avoid stopping production of half-completed lined cartons, as will hereinafter be more fully described.

The lower feed rolls 88 are mounted fast on a sprocket shaft 156 forming a part of the conveyor 54. The upper feed rolls 86 are mounted fast on a shaft 180 carried by and extended between spaced arms 182 fast on a rocker shaft 184 journaled in spaced brackets 158 and are arranged to be rocked into and out of feeding engagement with the lower rolls each cycle of operation in timed relation to the transfer of successive carton blanks by the transfer mechanism 50. In operation, when a blank is transferred into operative position to be advanced by the feed rolls, the vacuum to the suction cups is discontinued to release the blank from the transfer mechanism before the upper rolls 86 are rocked down to advance the blank onto the conveyer 54. In order to support the leading edge of the blank in its lifted position at this time, upper and lower cooperating gripper members 200, 202 are provided. The lower gripper members 202 are mounted fast on a shaft 1841 and are curved at their free ends to follow the contour of the lower rolls 88 between which they extend. The upper gripper members 200 are pivotally mounted in depending arms 204 attached to a bar 206 extended between spaced plates 188 secured to the brackets 158. The pivotally mounted upper gripper members 200 are curved downwardly and inwardly to cooperate with the curved surfaces of the lower gripper members 88 and are resiliently urged thereagainst by springs 208 as limited by stops 210 engageable with the depending arms 204.

The arms 182 which carry the upper rolls 86 are spring urged downwardly by coil springs 186, which latter are interposed between the free ends of the arms and the spaced plates 188. The mechanism for rocking the upper rolls 86 into and out of operative feeding engagement with the lower rolls 88 includes an arm 183 fast on the rocker shaft 184. The arm 183 is adjustably held between set screws 196 carried by an arm 194 loosely mounted on the shaft 184, and the arm 194 is connected by a link 185 to an arm 187 fast on a rocker shaft 189 journaled in a bracket 191. The rocker shaft 189 is also provided with a cam lever 193 fast thereon having a cam roll 195 for cooperation with a cam 197 fast on a shaft 199 which forms a part of the carton blank adhesive applying mechanism 56 to be hereinafter described. The upper feed roll shaft 180 is geared to rotate with the lower shaft 156 by spur gears 190, 192 as shown. The upper feed rolls 86 may also be manually rocked upwardly out of cooperating engagement with the lower rolls 88 by a handle, not shown, fast on the shaft 184.

From the description thus far it will be seen that successive carton blanks 10 are lifted upwardly and forwardly by the suction transfer mechanism 50 to present the leading edge thereof between the feed rolls 86, 88 by which the blanks are advanced and deposited on the continuously moving conveyor 54. As herein shown, the conveyor 54 comprises a pair of spaced conveyor chains 150 provided with spaced lugs 152 arranged to engage the rear edges of the blanks at spaced points. The carton blanks 10 are moved along an elongated supporting table 148 which extends between the conveyor chains 150. The upper runs of the chains 150 are supported by tracks 151 and pass over sprockets 154 fast on the shaft 156 at the receiving end of the conveyor and over sprockets 160 fast on a shaft 162 at the delivery end of the conveyor. The lower runs of the chains 150 pass from the sprockets 154 over idler sprockets 164, drive sprockets 166 fast on a shaft 168, and idler sprockets 170 to the sprockets 160 at the delivery end of the conveyor. The shaft 168 extends transversely of the machine and is arranged to be driven through connections from the cam shaft 122 which include bevel gears 172, 174 connecting the cam shaft to a vertical shaft 176 and bevel gears 178, 179 connecting the vertical shaft to the shaft 168.

It will be observed that in operation successive carton blanks 10 are presented to the feed rolls 86, 88 in timed relation to the continuously moving conveyor chains 150 so that a carton blank is delivered to the conveyor each cycle of operation in spaced relation to be engaged and moved along the table 148 by the chain lugs 152. It will be understood that the gripper members 200, 202 associated with the feed rolls retain a carton blank in operative position to the feed rolls during the interval between the time when the vacuum is cut off from the suction cups to release the blank and the time when the upper rolls are lowered into engagement with the blank to advance the same in timed relation to the movement of the conveyor chain.

The stack elevating mechanism indicated generally at 95 includes a cam operated arm 212 connected by a link 214 to one arm 216 of a two-armed lever pivotally mounted on the rocker shaft 110. The second arm 218 carries a roller 220 for cooperation with a cam 221 fast on the cam shaft 122. The cam roller 220 is held against its cam by a spring 223. The arm 212 is pivotally mounted on a shaft 222 and is arranged to operate a conventional pawl and ratchet mechanism indicated generally at 227 which effects rotation of the shaft 222 a small increment when permitted to do so. The stack rests on a horizontal plate 224 mounted for vertical sliding movement in guides 225 forming a part of the magazine and which receive extensions from the stack supporting plate. The ends of the plate 224 are connected by chains 226 which run over upper and lower sprockets 228, 230, the sprockets 230 being fast on the shaft 222.

Provision is made for controlling the elevation of the stack by the cam operated arm 212 and the pawl and ratchet mechanism in accordance with the demand for carton blanks. As herein shown, see FIG. 4, a pair of feeler arms 232 arranged to engage the top of the stack are carried by clamp members 234 fast on a rocker shaft 236 journaled in a bracket 238 attached to the machine frame. An arm 240 also fast on the rocker shaft 236 is connected by a link 242 to the arm 212. In operation the feeler arm 232 is rocked with the arm 212 each cycle of operation to come to rest on top of the stack. If the top of the stack is above a predetermined height sufficient to enable the suction transfer mechanism to pick up a carton blank the downward movement of the arm 212 is arrested so that it cannot complete a full stroke to effect elevation of the stack. In practice the pawl will merely be rocked back and forth over the back of a tooth of the ratchet at this time. However, when sufficient carton blanks have been removed from the stack so that the top of the stack is below a predetermined height, the feeler arm 232 will be rocked to a lower position to permit a full stroke of the arm 212 and thus permit elevation of the stack to compensate for the blanks removed.

Provision is also made for rendering the elevating mechanism inoperative when the stack of blanks is depleted. As herein shown, an elongated downwardly inclined feeler arm 244 fast on the rocker shaft 236 is arranged in the path of the stack supporting plate 224. When the blanks in the stack are depleted to an extent where the plate 224 is elevated to engage the end of the arm 244, further upward movement of the plate will rock the arm 244 and the feeler arms 232 upwardly to a position where the arm 212 will be rendered inoperative to further elevate the stack. At such time the operator will lower the supporting plate 224 and provide a new supply of carton blanks in the magazine.

In order to assure separation of the blanks at the upper end of the stack, provision is made for blowing streams of air in a direction parallel to and against the edges of the carton blanks each cycle of operation. As herein shown, a plurality of spaced air nozzles 246 are carried by a manifold 248 connected to a pipe 250 which is supported in an extension from the bracket 238. The lower end of the pipe 250 is connected to a flexible hose 252 leading to a pilot valve 254. As diagrammatically shown in FIG. 33, the pilot valve 254 is connected to a regulated source of compressed air from a main air line 255 and is provided with an operating arm 256 pivotally mounted on the rocker shaft 110. The second arm 262 carries a roll 264 for cooperation with a cam 265 fast on the cam shaft 122. In operation the pilot valve 254 is opened each cycle of operation to cause air to be directed from the nozzles 246 against the front edges of the upper blanks immediately prior to and during the initial lifting movement of the suction transfer mechanism.

Provision is made for detecting the presence of a carton blank deposited on the conveyor each cycle of operation and for stopping the machine when a carton blank is found to be absent from the conveyor. As herein shown, see FIGS. 1, 4 and 5, a blank detecting roll 282 carried by an arm 284 fast on a sleeve shaft 286 is arranged to be rocked downwardly on top of a carton blank each cycle. An opening is provided in the table 148 so that if no carton blank is present the roll will be rocked down into the opening. When this occurs a microswitch S6 is actuated to open the circuit to the motor and stop the machine. The sleeve shaft 286 is mounted for rotation on a rocker shaft 290 journaled in a bracket 292 attached to the machine frame. The rocker shaft 290 is provided with an arm 294 fast thereon connected by a link 296 to an arm 298 of a two-armed lever pivotally mounted on a shaft 300. The second arm 302 is provided with a cam roll 304 arranged to cooperate with a cam 306 fast on a cam shaft 308 journaled in the bracket 292. The cam shaft 308 is rotated by a chain and sprocket drive 310 connected to the drive shaft 168 which drives the conveyor chains. A spring 312 is connected to the arm 298 to hold the roll 304 against its cam.

The cam operated arm 294 fast on the rocker shaft 290 is arranged to cooperate with an intermediate arm 314 clamped on the sleeve shaft 286. The intermediate arm 314 is connected to move with the cam operated arm 294 by a coil spring 316 connected between the arms. A stop screw 318 carried by the intermediate arm 314 is arranged to engage an extension 320 from the cam operated arm to limit the movement of the intermediate arm. A second stop screw 322 carried by the intermediate arm is arranged to engage a switch operating arm 324 loosely mounted on the sleeve shaft 286 and normally held in operative relation to the microswitch S6 by a relatively weak coil spring 326 as shown.

In operation the blank detecting roll 282 is rocked downwardly each cycle through the yieldable connections, as described, in timed relation to the arrival of a carton blank 10 deposited on the conveyor 54. If the roll engages the upper surface of a blank the movement of the intermediate arm 314 is arrested since the latter is secured to the sleeve shaft on which the detecting roll arm is mounted, and the cam operated arm 294 will continue its full stroke by virtue of the spring connection without operating the switch S6. However, if a carton blank is absent at this time the detecting roll 282 will drop into the opening in the table 148 to permit the intermediate arm 314 to follow the cam operated arm 294. As a result, the stop screw 322 will engage the switch operating arm 324 to actuate the switch S6 and discontinue operation of the machine. It will be understood that switch S6 is disposed in the left hand line 46 and that similar safety mechanism, including a corresponding switch S18, is provided in the right hand line 48 of the duplex apparatus for detecting the absence of a carton blank and for stopping the machine. However, the rocker shaft 290 is common to both mechanisms so that but a single cam 306 is provided for both.

The above-described safety mechanism for detecting the absence of a carton blank is provided for the purpose of discontinuing operation of the entire machine in the event that a carton blank is missing because of some malfunction of the carton transfer mechanism. After correcting the condition whereby a carton blank failed to be delivered to the conveyor, the circuit to the motor may again be reestablished to continue operation of the machine.

As above stated, provision is made for permitting the machine to continue in operation to complete the cartons already started through the machine when the suction to the carton blank transfer mechanism is cut off in response to an accumulation of lined cartons at the delivery end of the machine in excess of a demand therefor. When such excess is detected, the solenoid SOL-1 is energized to rock the solenoid operated latch 119 into a position to latch the vacuum valve linkage in an inoperative position to prevent the transfer of carton blanks onto the conveyor. However, since the machine would be stopped as soon as the no-carton detecting roll 282 indicated that a blank was not transferred at such time, provision is made for rendering the no-carton detecting means, including the microswitch S6, inoperative to stop the machine at this time so as to permit completion of the cartons already started through the machine. This is accomplished by actuating a microswitch S5 effective to render the no-carton detecting means inoperative simultaneously with latching of the vacuum control linkage. As herein shown, the microswitch S5 is arranged to be closed by a cam 327 fast on the cam shaft 122 and which cooperates with a roll 329 carried by a lever 331 mounted on the rocker shaft 110. An arm 333 formed integrally with the lever 331 is arranged to cooperate with the microswitch S5, and another integral arm 335 carries a latch member 337 arranged to cooperate with a latch 339 movable with the solenoid operated latch 119. Each latch 119, 339 is carried by a rocker shaft 341 which is connected by an arm 343 and linkage 345 to the movable member 347 of the solenoid SOL-1. In operation the latch members 119, 339 are normally disposed in a counterclockwise position, viewing FIG. 1, to remove the latch 119 from engagement with the latch member 117 and permit free rocking movement of the valve operating linkage. At this time the latch 339 is in a position to engage the latch member 337 to prevent actuation of the microswitch S5 by the cam 327. Conversely, when the solenoid SOL-1 is energized by detection of an excessive accumulation of lined packages on the delivery conveyor, the latches 119, 339 are rocked in a clockwise direction to lock the cam operated valve linkage in its inoperative position and to unlock the cam operated switch actuating arms, thus permitting the microswitch S5 to be actuated to render the no-carton detecting mechanism inoperative to stop the machine. It will thus be seen that when one latch is engaged the other is disengaged. The microswitches S6, S5 are incorporated in a wiring diagram shown in FIG. 36 to be hereinafter described. It will be understood that each package making line of the duplex machine is provided with individual controls including separate solenoids, the solenoid SOL-1 being provided in the left hand line 46 and a corresponding solenoid SOL-4 being provided in the right hand line. The switch S5 is also disposed in the left hand line, and a corresponding switch S17 is provided in the right hand line for cooperation with solenoid SOL-4 so that each line is separately controlled when an excessive accumulation of lined cartons is detected at the delivery end of their respective conveyors. Thus, the no-carton blank detecting switch S6 which would normally discontinue operation of the machine is rendered inoperative when an excessive accumulation of cartons is detected on the conveyor at the delivery end of the machine.

In the event that more than one carton blank is picked up by the suction transfer mechanism 50 and transferred onto the conveyor 54 by the feed rolls 86, 88, provision is made for detecting a multiple thickness of carton board transferred to the conveyer and for discontinuing operation of the entire apparatus in response thereto. As herein shown, successive blanks deposited on the conveyer are arranged to pass under a detecting roll 266 carried by an arm 268 fast on one end of a tubular shaft 270 rotatably mounted on an extension of the upper feed roll rocker shaft 184. The tubular shaft 270 is provided at its other end with an upstanding arm 272, the upper end of which cooperates with a microswitch S7 supported by a bracket 276 attached to the machine frame. The weight of the arms 272, 268 and roll 266 tend to rock the roll down against the conveyer table 148, as limited by an adjustable stop 278 engageable with the arm 272, and a coil spring 280 connected to the arm 272 is arranged to take up some of the weight of the detecting unit and to maintain the arm in operative engagement with the microswitch. The parts are adjusted relative to each other so that in operation a thickness of one carton blank passing under the roll 266 will not actuate the switch S7. However, in the event that a double thickness of carton material is detected the roll 266 will be raised to actuate the switch S7 and discontinue operation of the apparatus. It will be evident that a single carton blank which may be crumpled or otherwise deformed in a manner such as to present more than a single thickness of carton material under the roll 266 will also effect lifting of the roll 266 and actuation of the switch S7 to stop the machine. In practice after a double or defective carton blank is removed the circuit to the motor may be reset to continue operation of the apparatus. It will be observed that the blank detecting roll 266 for detecting a multiple thickness of carton board is disposed to be engaged by the leading end of a carton blank immediately after the blank passes under the detecting roll 282 which feels for the presence or absence of a carton blank. The switch S7 is disposed in the left hand line 46, and a corresponding switch S19 is disposed in the right hand line 48.

Figure 1A:
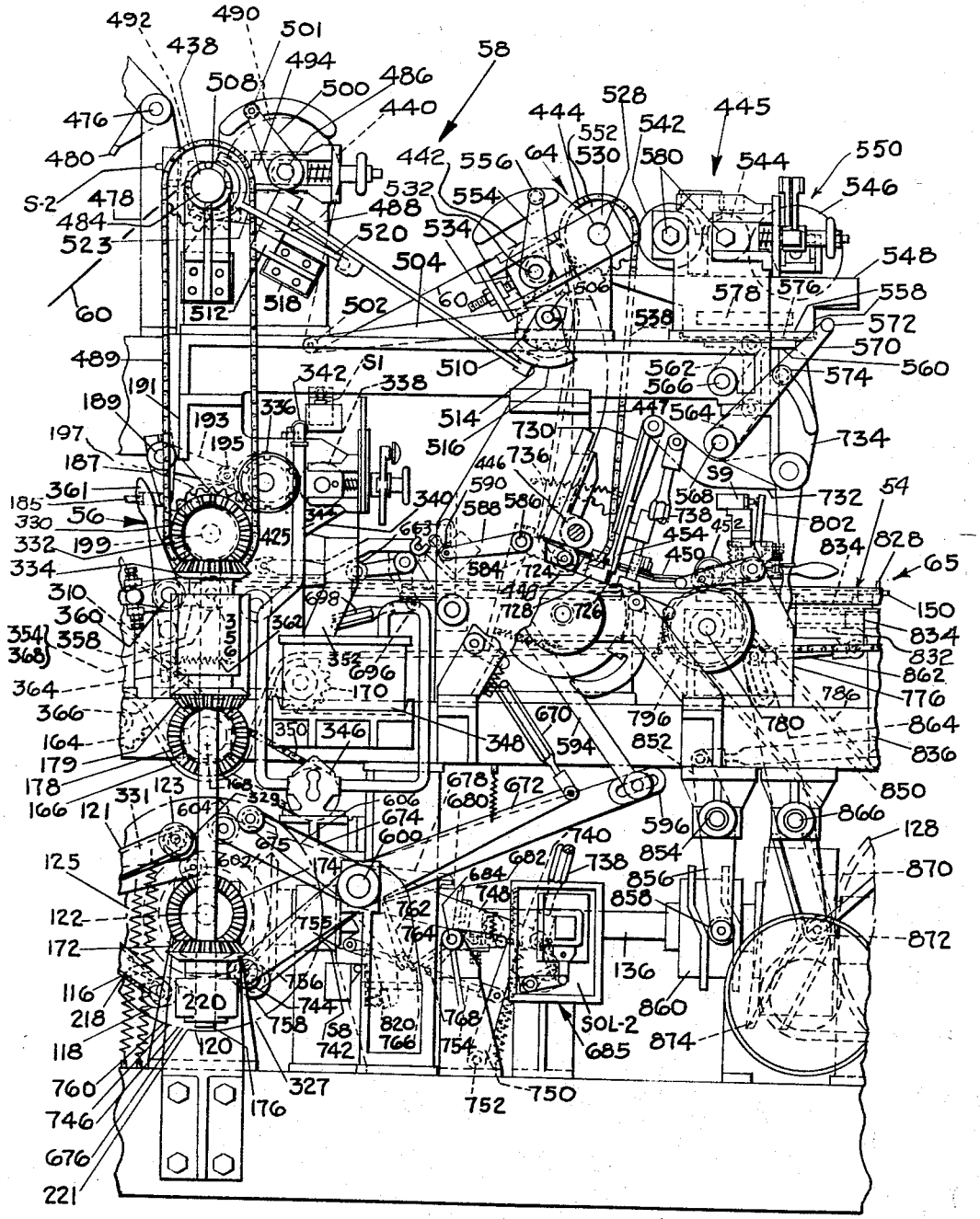

The continuously advancing carton blank is now provided with adhesive by the adhesive applying mechanism 56 at the selected areas described. As shown in FIG. 1a, the adhesive applying mechanism includes a segmental adhesive applying roll 330 mounted on the shaft 199. The shaft 199 is driven from the vertical drive shaft 176 through bevel gears 332, 334. The segmental applying roll 330 is provided with a coating of adhesive on the segmental portions thereof by a glue roll 336 which cooperates with a spreader roll 338, all of the rolls being supported for rotation in a bracket 340 attached to the machine frame. Liquid adhesive is supplied from a nozzle 342 which drops the adhesive between the glue roll 336 and the spreader roll 338. The nozzle 342 is connected to a pipe 344 to which adhesive is supplied by a recirculating pump 346 connected to a supply of adhesive contained in a supply tank 348. The pump 346 may be driven from the horizontal shaft 168 by a chain and sprocket connection 350. Excess adhesive passing below the rolls 336, 338 is received by a funnel 352 and returned to the supply tank 348 to be recirculated.

As herein shown, see FIG. 6, the segmental adhesive applying roll 330 is arranged in the path of an oncoming carton blank to apply the adhesive to the upper face of the blank. In order to provide sufficient pressure against the underside of the blank during the applying operation a cam operator presser roll 354 is provided to cooperate with the applying roll 330. The presser roll 354 is mounted on a shaft 356 carried by arms 358 pivotally mounted on a shaft 360 journaled in the bracket 340. The roll 354 is urged upwardly into pressing engagement with the underside of the carton blank during the adhesive applying operation by a spring 362 connected to an arm 364 also fast on the shaft 360. The movement of the arm 364 is limited by a stop 366 for cooperation with the end of the arm 364. The presser roll carrying shaft 356 is also provided with a cam roll 368 of the same diameter as the presser roll 354 and which cooperates with a cam 370 fast on the adhesive applying roll shaft 199. In operation the presser roll 354 is held down out of operative engagement with the applying roll 330 by the cam 370 until such time as a carton blank 10 is advanced into operative position to receive the adhesive. The carton blank is advanced on the conveyer in timed relation to the rotation of the segmental applying roll 330, and when the carton blank arrives in operative relation thereto the presser roll 354 is rocked upwardly to press the blank against the applying roll to effect application of the adhesive. A handle 361, also fast on the shaft 360, is provided for manually rocking the presser roll 354 out of engagement with the applying roll 330 when desired.

Provision is also made for detecting the presence of a carton blank 10 on the conveyer at a point preceding the adhesive applying device 56 and for latching the presser roll 354 in its downwardly rocked inoperative position in the event that a carton is found to be absent. As herein shown, see FIG. 1, the detecting means includes a second cam operated blank detecting roll 372 similar to the blank detecting roll 282 and which is similarly carried by an arm 374 fast on a sleeve shaft carried by a cam operated rocker shaft 388. An opening is provided in the table 148 so that if no carton blank is present the roll will be rocked down into the opening. When this occurs a microswitch S4 is actuated which closes a circuit to a solenoid SOL–3 arranged to rock a latch arm 382 into the path of a latch plate 384 carried by an arm 386 mounted on the shaft 360 and arranged to be rocked with the presser roll 354 as shown in FIG. 6. The rocker shaft 388 is provided with an arm 390 fast thereon connected by a link 392 to an arm 394 of a two-armed lever pivotally mounted on the shaft 300. The second arm 396 is provided with a cam roll 398 arranged to cooperate with a cam 400 fast on the cam shaft 308. The cam operated arm 390 is arranged to cooperate with an intermediate arm 402 clamped on the sleeve shaft and with a switch operating arm 412 loose on the sleeve shaft through resilient connections in a manner similar to that shown in FIGS. 4 and 5 in connection with the blank detecting mechanism previously described. With this construction it will be seen that when the detecting roll 372 engages the upper surface of a carton blank the sleeve shaft is held stationary so that the switch operating arm 412 will not be moved to actuate the switch S4 by virtue of the resilient connection between the cam operated arm 390 and the intermediate arm 402. On the other hand, when a carton blank is absent the detecting roll 372 will drop into the opening in the table and permit engagement of the switch operating arm 412 by the intermediate arm 402 to actuate the switch S4 and close the circuit to the solenoid SOL–3.

As herein illustrated, see FIG. 6, the solenoid SOL–3 is connected to an arm 414 fast on one end of a shaft 416 journaled in a housing 418. The other end of the shaft extended outside the housing is provided with an arm 420 keyed thereto and with the latch 382 loosely mounted thereon. The latch arm 382 is provided with an extension 421 and is yieldably connected to move with the keyed arm 420 by a spring 422 interposed between the extension 421 and the arm 420. A stud 424 connected at one end to the extension 421 is extended through an opening in the arm 420 to permit relative movement therebetween, the stud being provided with stop nuts 423 to limit such movement. In operation the latch arm 382 is rocked in a direction to engage the latch plate arm 386 through the spring connections, and the latch arm 382 is positively rocked in the opposite direction by the stud connection. The latch plate arm 386 is loosely mounted on the shaft 360 and is connected to move with the shaft 360 by a yoked arm 426 keyed to the shaft 360 and provided with opposed set screws 428, 430 between which the arm 386 may be adjustably secured. Thus, in operation, when a carton blank is found to be absent on the conveyor at a point preceding the adhesive applying mechanism, the presser roll 354 will be latched in an inoperative position so that adhesive will not be applied directly to the presser roll during the continued operation of the machine. It will be understood that similar safety mechanism is provided in each line of the duplex package maker, and while each detecting roll and each presser roll is operated by a single cam common to both lines, each line is provided with its individual safety mechanism so that one line may be operative to apply adhesive to a carton blank while the other line is inoperative. The above-described control mechanism is associated with the left hand line 46, and similar controls including a switch S16 and solenoid SOL–6 are provided in the right hand line 48.

Figure 7:
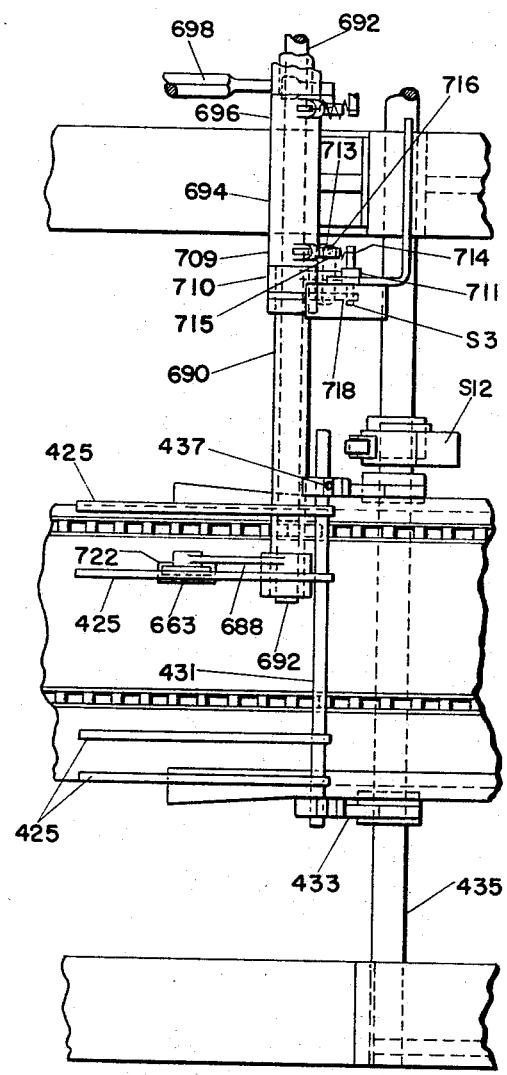
FIG. 7 is a plan view of a portion of the mechanism shown in FIG. 6.

In the event that the machine should be stopped for any reason, it is possible that a carton blank may come to rest under the adhesive applying roll 330, and if the machine remains at rest for any length of time the adhesive may set up so as to cause the blank to adhere to the applying roll. Under these conditions when the machine is subsequently started, a jam would occur when the carton blank starts to move around with the adhesive applying roll. As illustrated in FIGS. 6 and 7, in order to avoid this occurrence, one or more stripping fingers 425 are provided which are supported to extend adjacent the adhesive applying roll and above the carton blank in a position to strip the blank from the roll when the machine is started. Provision is also made for stopping the machine when this occurs and, as herein shown, the stripping fingers 425 are operatively supported at one end by pins 427 extending through the fingers, the pins being engaged in slots formed in stationary members 429. The other ends of the stripping fingers are connected to a transversely extended shaft 431. The shaft 431 is supported in U-shaped slots formed in arms 433 mounted on a shaft 435 supported in the machine frame. The action of the adhering carton blank being stripped from the adhesive applying roll effects frictional engagement of the blank with the underside of the stripping fingers 425 causing the same to move forwardly in the slots rotation of the roll. When this occurs the shaft 431 is arranged to engage and close a microswitch S12 forming a part of the motor circuit. The operator must then remove the torn carton blank and clean the adhesive applying roll before again starting the machine. A corresponding microswitch S24 is provided in the other line of the duplex machine.

It may be stated here that the only time that the machine is brought to rest is when a malfunction occurs, such as when a double carton blank or a crumpled carton blank is detected, and other malfunctions herein described. Otherwise, the machine will continue in operation even though a carton blank is absent, at which time the adhesive applying mechanism is rendered inoperative for a cycle as above described. Also, as will be hereinafter described, when a carton blank is missing at a point preceding the lining mechanism, provision is made for preventing advance of the web of lining material during the cycle which would otherwise provide a lining for the carton blank. This provision also prevents operation of the lining adhesive applying mechanism during such cycle. The advantage of keeping the machine in continues operation except when a malfunction occurs is that the adhesive applying rolls and the adhesive spreader rolls are continuously moved, and the adhesive is recirculated so as to prevent hardening or setting of the adhesive on the rolls during normal operation.

From the description thus far it will be seen that a carton blank 10 being advanced along the conveyor 56 is provided with a coating of adhesive by the segmental applying roll 330 each cycle of operation. The carton blank is next advanced into operative position to receive a lining sheet 12 which is placed on top of the continuously moving carton blank and adhesively secured thereto. As illustrated in FIGS. 1 and 1*a*, the web of lining paper 60 may comprise any suitable lining material, such as waxed paper, withdrawn from the supply roll 62 which is mounted on a shaft 434 supported in a bracket 436. In general, the web 60 of lining material extended from the supply roll 62 is trained between feed rolls 438, 440 arranged to effect continuous withdrawal of the web from the supply roll at a controlled rate of feed. The web is then trained over a pressure roll 442 which is arranged to press the web against a segmental adhesive applying roll 444 forming a part of the adhesive applying mechanism 445 for applying the adhesive strips 42, 44 to successive portions of the lining web. The adhesive for the lining may comprise any usual or preferred adhesive, and when the lining material comprises a waxed paper the adhesive preferably employed comprises a so-called "hot melt adhesive" comprising a microcrystalline wax emulsion which sets up to a dry condition immediately after application to the web and is subsequently reactivated by heat and pressure. The web is then passed over a chill plate 447 for setting the adhesive and also for stiffening the wax paper which becomes limp after passing the hot melt adhesive applying roll 444. Thereafter, the web is trained under an intermittently operated feed roll 446 which comprises an indexing or metering roll cooperating with a presser roll 448 for intermittently advancing the web along an inclined guide 450 in timed relation to the arrival of the continuously advanced carton blank 10 and to present the leading end of the intermittently advanced web in a predetermined registered position on top of the continuously moving carton blank. As the carton blank and the lining web are moved along in superposed relation the leading end of the blank and lining are engaged by a presser or combining roll 452 aligned with the adhesive strip 36 on the carton blank to cause the lining material to adhere to the carton blank. At the end of the rotation of the intermittently operated metering roll 446 the lining sheet is cut to length by a reciprocable knife or cutter blade 454 to be hereinafter more fully described.

Figure 2:
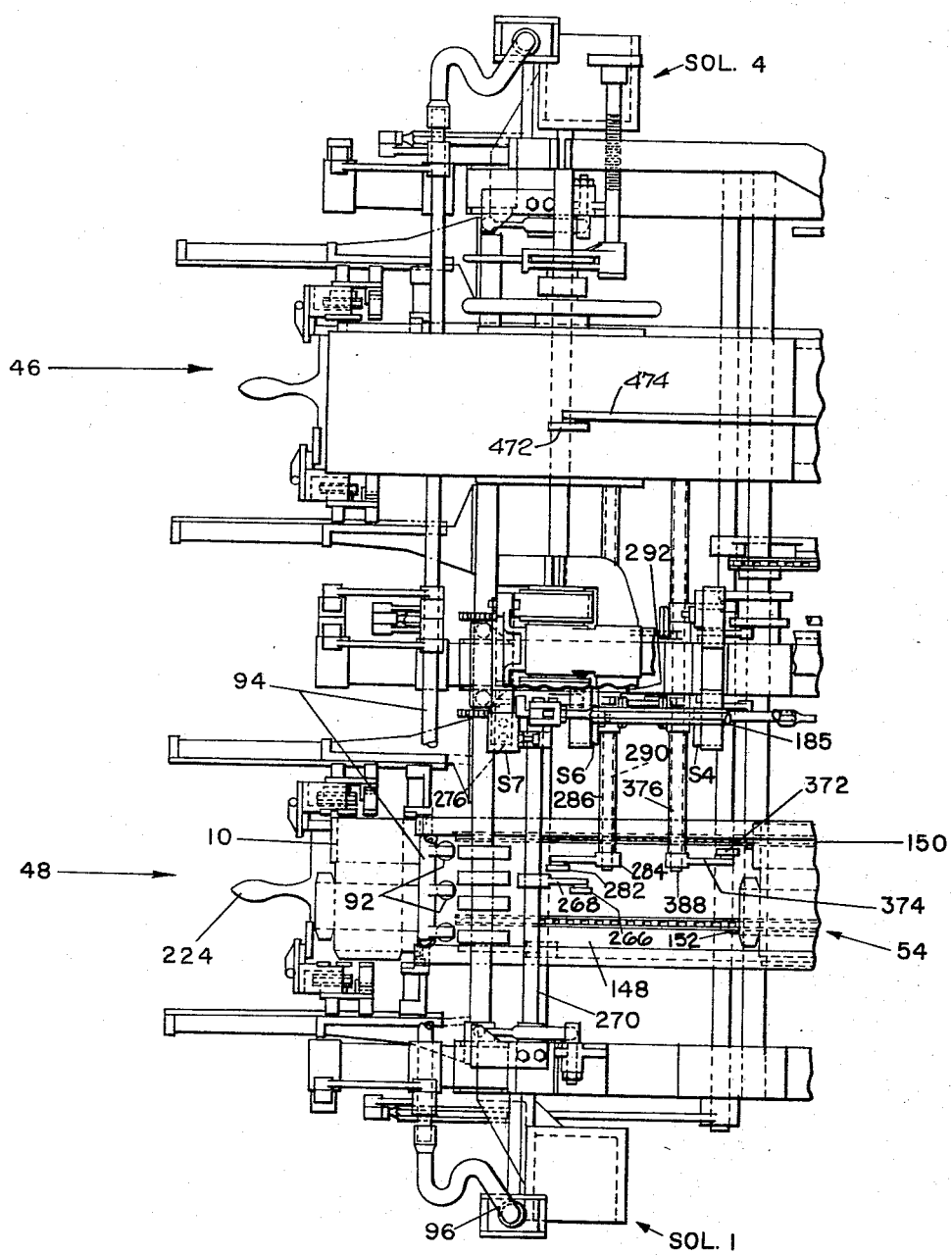

As shown in FIGS. 1 and 2, the supply roll 62 carried by the shaft 434 is detachably mounted for rotation in the brackets 436 attached to the upper framework of the machine. Provision is made for exerting a braking action to the shaft 434 in order to control the withdrawal of the web from the roll 62. In practice one end of the shaft 434 is inserted into an opening formed in a spool-shaped member or brake drum 460 mounted for rotation in a bearing carried by one of the brackets 436. A flexible metal brake band 462 trained over the spool 460 is fixed at one end to a stud 464 carried by a bracket 466 attached to the frame. The other end of the metal band is connected to a stud 468 which is spring urged in a direction to tighten the band about the spool. The stud 468 extends through a hollow member 470 threadedly engaged in an opening in the bracket 466, the hollow member 470 being provided with a handle for adjusting the tension of the spring. Thus, in operation, a frictional drag is applied to the spool to put a slight tension on the web being withdrawn and to prevent uncontrolled unwinding of the coiled supply roll.

Provision is also made for detecting depletion of the supply roll and for discontinuing the feed of carton blanks into the machine when the diameter of the roll reaches a predetermined minimum diameter so as to enable the operator to replace the depleted roll with a new roll. In practice the trailing end of the depleted roll is preferably spliced to the leading end of the new roll so that rethreading of the leading end of the roll through the lining feed mechanism is eliminated and continuity of production is facilitated. As herein shown, a detecting roll 472 carried by an arm 474 fast on a shaft 476 is arranged to rest on the supply roll and to pivot downwardly as the diameter of the roll is decreased by continued withdrawal therefrom. The shaft 476 is mounted to rock in a bearing formed in a bracket 478. Also fast on the shaft 476 is a switch operating arm 480 arranged to actuate a microswitch S2 when the supply roll reaches a predetermined minimum diameter. The microswitch S2 is mounted on the bracket 478 and forms a part of the control circuit to energize solenoid SOL–1 to discontinue the feed of the carton blanks. It will be understood that in the duplex machine the supply rolls are mounted in dependently on separate shafts, and duplicate control means are provided for each roll, a corresponding microswitch S14 being provided in the second line for cooperation with a corresponding solenoid SOL–4. The machine will continue in operation to complete production of the cartons already started through the machine, and upon replacement of a new roll the feed of carton blanks will again be started.

The feed rolls 438, 440 are carried by shafts 484, 486, respectively supported in spaced brackets 488. One of the rolls, 438, comprising a metering roll, is fast on its shaft 484 and is continuously driven by a chain and sprocket connection 489 from the carton adhesive applying roll shaft 199. The other roll, 440, which comprises a presser roll, is rotatably mounted on its shaft 486 and is connected to rotate with the metering roll 438 by spur gears 490, 492. The presser roll 440 may be rubber covered to assure positive feeding of the web without slippage between the feed rolls. The presser roll shaft 486 is eccentric with respect to the ends thereof, which latter are journaled in spaced blocks 494 slidably mounted in the brackets 488. The shaft 486 is resiliently and adjustably urged in a direction to present the presser roll 440 into cooperating engagement with the metering roll by a spring as shown. The shaft 486 is also provided with a handle 500 by which the shaft may be manually rocked to move the presser roll 440 away from the metering roll by virtue of the eccentric mounting in order to permit the web to be initially inserted between the feed rolls. The handle is also provided with a spring pressed pin 501 for cooperation with spaced openings in an extension of the bracket 488 to hold the roll 440 in its moved position.

The continuously rotated metering roll 438 is of a circumference preferably slightly greater than the predetermined length of a lining sheet subsequently severed from the web, and as a result the feed rolls 438, 440 effect a slight overfeed of such predetermined length of lining material each cycle of operation. Since the intermittently operated adhesive applying roll 444 and the indexing roll 446 are arranged to advance the web a predetermined length equal to the length of the lining sheet each cycle of operation, provision is made for taking up the slack of the web which is accumulated between the feed rolls 438, 440 and the adhesive applying roll 444, and for discontinuing withdrawal of the web from the supply roll when the slack in the web becomes excessive. Conversely, when the slack in the web has been reduced by continued withdrawal by the indexing roll 446 and the adhesive applying roll 444, the feed rolls 438, 440 are again rotated to continue withdrawal of the web from the supply roll. As herein shown, the slack in the web is taken up by a take-up roll 502 carried by an elongated arm 504 fast on a shaft 506 rockingly mounted in the machine frame.

Figure 2A:
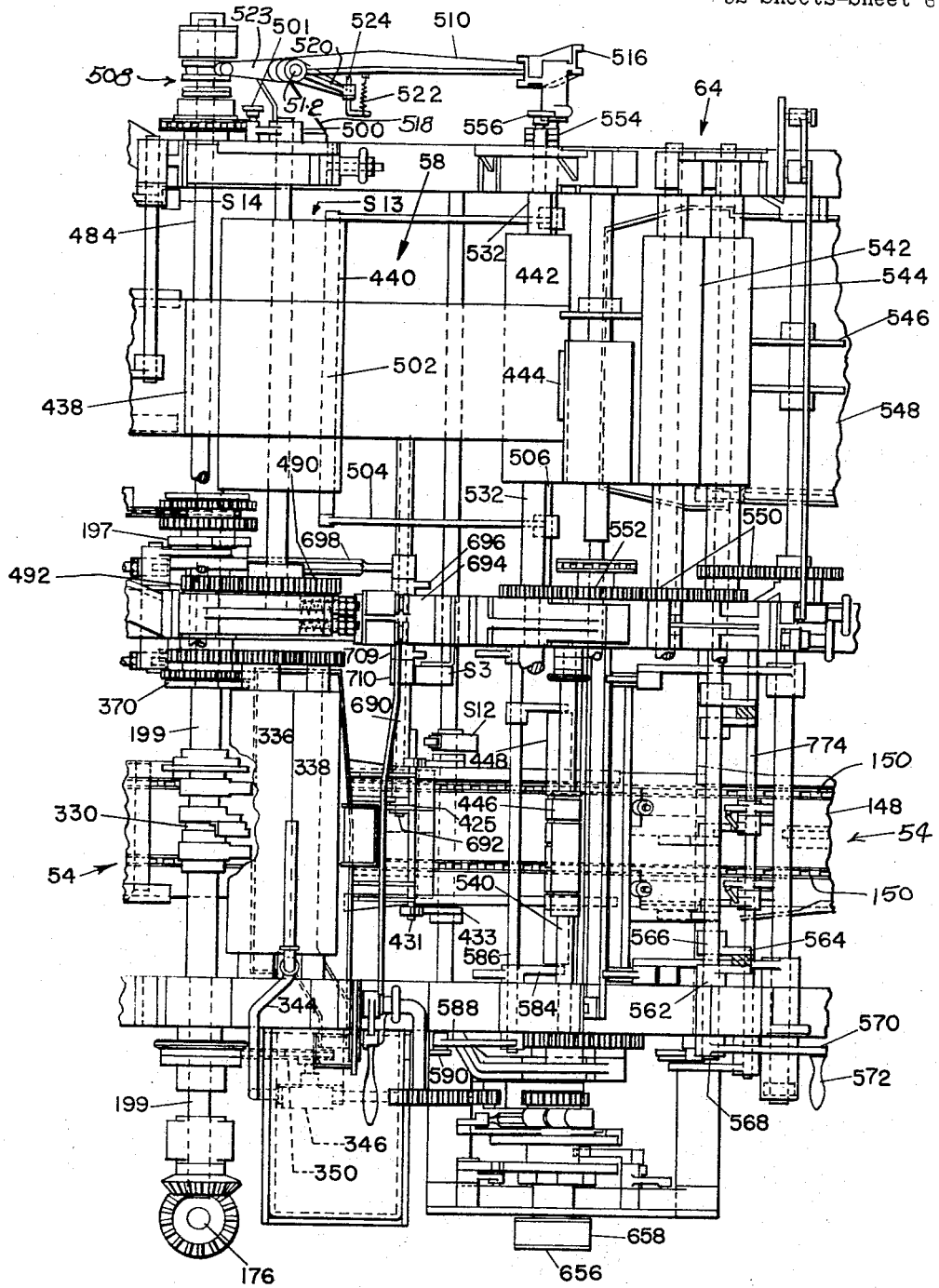

The chain and sprocket driven metering roll shaft 484 is provided with a clutch 508 arranged to be engaged and disengaged through connections responsive to the position of the take-up arm 504 and, as herein illustrated, an elongated arm 510 pivotally mounted on a stud 512 is provided with a cam roll 514 which cooperates with a segmental cam 516 also fast on the shaft 506. The stud 512 is carried by a bracket 518 attached to the machine frame, and the pivotally mounted arm 510 is arranged to cooperate with one arm 520 of a two-armed lever also pivotally mounted on the stud 512. As shown in FIG. 2a, the arm 520 is resiliently connected to move with the arm 510 by a spring 522 as limited by a stop member 524. The second arm 523 of the two-armed lever comprises a yoke arranged to cooperate with the driven member of the clutch 508. In operation the segmental cam 516 is designed to effect disengagement of the clutch when the take-up arm 504 assumes a predetermined downwardly rocked position indicating a surplus of slack in the web so as to discontinue driving of the feed rolls. Conversely, the clutch is again engaged to resume driving of the feed rolls 438, 440 when the take-up arm 504 is rocked upwardly to a predetermined position upon withdrawal of the surplus slack in the web by the intermittently operated indexing roll 446. It will be observed that when the clutch is engaged any overthrow of the arm 510 will be relieved by extension of the spring connection between the arm 510 and the clutch operating arm 520.

Provision is also made for discontinuing the feed of carton blanks in the event that the lining material is depleted or in the event the web 60 extending between the feed rolls 438, 440 and the adhesive applying roll 444 should break. As illustrated, the take-up roll 502 will be rocked to a lowermost position by gravity if the extended web should break or run out off the supply roll 62 and will engage a microswitch S1 secured to the frame of the machine. The microswitch S1 forms part of the control circuit to energize solenoid SOL–1 to discontinue the feed of carton blanks. A corresponding microswitch S13 for cooperation with solenoid SOL–4 is provided in the second line for independent control of each line of the duplex machine.

Referring now to the lining web adhesive applying mechanism 445, as shown in FIGS. 1 and 2, the segmental adhesive applying roll 444 is mounted on a shaft 528 supported in spaced brackets 530 attached to the machine frame. The pressure roll 442 is mounted for rotation on a shaft 532 which is eccentric with relation to the ends thereof, the latter being journaled in bearing blocks 534 adjustably mounted in guides in the brackets 530 to present the roll 442 into pressing engagement with the applying roll 444. The shaft 528, on which the applying roll 444 is mounted, is arranged to be driven by a chain and sprocket drive connection 538 from a shaft 540 on which the intermittently operated indexing roll 446 is mounted. Thus, each cycle of operation a predetermined length of the lining web 60 equal to the length of a lining sheet is intermittently advanced between the adhesive applying roll 444 and the pressure roll 442 to provide adhesive strips along the selected areas defined. The adhesive applying roll 444 receives a film of adhesive from a spreader roll 542 which cooperates with an intermediate roll 544. The intermediate roll receives its adhesive from a relatively narrow pickup roll 546 whose lower end extends into a tank 548 containing a supply of adhesive. All of the adhesive carrying rolls and the presser roll are geared to rotate together by a train of gears indicated at 550 and are driven from the adhesive applying roll 444 by a gear 552 formed integrally therewith. The shaft 532 is provided with a handle 554 by which the shaft may be rocked to move the presser roll 442 away from the applying roll by virtue of the eccentric mounting prior to introducing the lining material therebetween. The handle 554 is provided with a spring pressed pin 556 for cooperation with spaced openings in an extended portion of the bracket 530 to hold the shaft in its moved position.

The adhesive supply tank 548 is preferably mounted to be lowered away from the adhesive pickup roll 546 for convenience in cleaning and also to prevent the supply of adhesive to the supply rolls in the active line when only one line of the duplex machine is employed for producing cartons. As herein shown, the tank 548 is supported on spaced angle bars 558 carried by brackets 560 which are supported by parallel arms 562, 564 pivotally mounted on shafts 566, 568, respectively, which are journaled in the machine frame. The lower shaft 568 is provided with an elongated arm 570 fast thereon having a handle 572 by which the parallel linkage may be rocked to move the tank from an upper position in operative engagement with the adhesive applying pickup roll 546 to a lower position away from the adhesive applying pickup roll. The elongated arm is also provided with a spring pressed pin 574 for engagement with one or the other of two spaced openings in the supporting frame to hold the tank 548 in its unwardly or downwardly moved position.

In practice, when running a hot melt quick-setting adhesive, the base 576 of the tank may be provided with heating cartridges 578 to keep the adhesive fluid so as to prevent setting of the same. Likewise, the shafts on which the spreader rolls 542, 544 and adhesive applying roll 444 are mounted may be provided with electrical heating cartridges, as indicated at 580, so that the adhesive will not set up on the rolls. The heating cartridges may be connected to a suitable source of controlled electrical current.

The web 60, after being provided with adhesive, as above described, passes over the chill plate indicated at 447 which may comprise an elongated member having an outwardly curved face and secured to the machine frame. The chill plate 447 may be refrigerated in any known or conventional manner. Thus, the adhesive applied to the web is set up so as not to interfere with subsequent feeding of the web, and the web material is also stiffened to facilitate subsequent handling of the same.

The web 60 is then passed under the intermittently operated indexing roll 446 fast on the shaft 540 and which is arranged to advance the web one sheet length per cycle. As illustrated in FIG. 1a, the presser roll 448 is carried by an arm 584 and is arranged to cooperate with the indexing roll to advance the web therebetween. The arm 584 is fast on a shaft 586, and a second arm 588 fast thereon is provided with a spring pressed stud 590 arranged to fit into one or the other of two spaced openings formed in the side frame to hold the presser roll in operative engagement with the indexing roll in one instance, and out of such engagement in another instance for convenience in initially threading the web between the rolls.

As illustrated in FIGS. 1a, 8, 9 and 10, the indexing roll 446 is arranged to be driven through connections including a train of gears indicated generally at 591 driven from a cam operated rack and pinion indexing mechanism, indicated generally at 592, and which includes an indexing shaft 593. As herein shown a rack 594 connected at one end to an elongated rocker arm 596 is supported for recipraction in meshing engagement with a pinion 598. The arm 596 is fast on a rocker shaft 600 and is formed integrally with a cam lever 602 having a roll 604 for cooperation with a closed cam 606 fast on the cam shaft 122. The rack 594 is supported in a guide 608 which is carried free on the shaft 593. The pinion 598 is also free on the indexing shaft, and a hub extended from the pinion is provided with a pawl carrier arm 610 fast thereon. The arm 610 carries a drive pawl 612 which is spring urged to cooperate successively with opposed notches 614 formed in an indexing disk 618. The disk 618 is formed integrally with a second disk 620 having notches 622 aligned with the notches 614 and is mounted on the hub 617 of an overload safety release flange 619 which is keyed to the shaft 593. A spring pressed arm 621 pivotally carried by the second disk 620 is provided with a tapered projection 623 in driving engagement with a correspondingly shaped notch 625 in the flange 619 to provide a separable driving connection. The notches 614 in the disk 618 are spaced 180° apart, and in operation when the rack 594 is rocked on its down stroke or driving stroke the spring pressed drive pawl 612 engaged in the notch 614 moves the disk 618 through 180° in a counterclockwise direction to present the opposing notch 614 in the position formerly occupied by the previous notch 614.

Provision is made for checking or arresting any overtravel of the indexing unit and also for preventing any backlash or rotation in the opposite or clockwise direction of the indexing shaft. For this purpose a stationary pawl 626 carried by an arm 628 pivotally mounted at 630 is spring urged into engagement with the second disk 620 to fall into a notch 622 at the end of the driving stroke of the indexing unit to prevent overdrive of the unit in a counterclockwise direction. A second stationary pawl 632 carried by an arm 634 pivotally mounted at 636 is also spring urged into engagement with its disk 620 to fall into an opposing notch 622 at the end of the driving stroke to prevent backlash of the indexing unit in a clockwise direction. This pawl 632 also prevents inadvertent rotation of the disks in a clockwise direction during the return or upstroke of the rack 594.

Since the stationary pawl 626, which is arranged to check any overtravel of the intermittently rotated disks during the driving stroke, would prevent a succeeding advance of the disks through 180° in a counterclockwise direction unless the pawl 626 were removed, provision is made for removing the pawl 626 during the return stroke. As herein shown, an extension of the drive pawl pin 638 carries a roller 640 which is arranged to engage a cam surface 642 formed on the arm 628 to rock the arm and remove the pawl 626 from its notch during the return stroke of the drive pawl. Subsequently, during the advancing stroke, the pawl 626 is again permitted to rest against the disk 620 to fall into a notch 622 at the end of the advancing stroke.

The gear train 591 connecting the indexing mechanism to the intermittently operated web advancing roll 446 includes a drive gear 644 fast on the shaft 593 and which is in mesh with an idler gear 646, the latter being in mesh with a gear 648 fast on the indexing roll shaft 540. The idler gear 646 is supported by an arm 650 which is carried by and pivotally adjustable on the indexing shaft 593. A second arm 652 formed integrally with the arm 650 is provided with a slot 654 through which a bolt may be extended to adjustably secure the idler gear support to an adjacent frame member. By this structure the gear train is interchangeable with a different set of gear connections when it is desired to produce lined cartons of different sizes requiring different lengths of lining web to be advanced each cycle of operation.

It will be noted that the overload safety release flange 619 is provided with opposed tapered notches 625 spaced 180° apart so that if the separable driving connection 621 is released from one notch because of an overload it will enter the succeeding notch to maintain the timed relationship or synchronism of the driving elements with respect to the rest of the machine. It will be seen that the indexing mechanism 592, as thus far described, effects rotation of the shaft 593 through the separable driving connections 619, 621 to effect advance of the lining web one sheet length each cycle of operation.

As illustrated in FIG. 2a, an extended end of the indexing mechanism shaft 593 is provided with a brake drum 656 fast thereon and over which a flexible brake band 658 is trained. The brake band may be mounted for adjustment in any suitable manner by means carried by and extended from the machine frame, as shown. Thus, in operation a frictional drag is applied to the drum to arrest any tendency of the mechanism to pass beyond its registered position at the end of the driving stroke.

Provision is made for detecting the presence or absence of an oncoming carton blank 10 at a point preceding the lining mechanism and for rendering the lining feed indexing mechanism 592 inoperative to advance a length of lining material 60 when the absence of a carton blank 10 to be provided with a lining is detected by a detecting roll 663 at such point; see FIG. 6. As herein illustrated, see FIGS. 8 and 9, a cam operated stop arm 664 pivotally mounted on the shaft 593 and having a curved end portion 666 flush with the outer periphery of the indexing disk 618 is arranged to be rocked into and out of alignment with a notch 614 in the disk 618 each cycle of operation. The driving pawl 612 is provided with a lateral extension arranged to engage the curved end 666 of the stop arm 664 when the latter is in alignment with the slot to prevent engagement of the pawl therewith. Normally, when a carton blank 10 is detected by the roll 663 the cam operated stop arm 664 is permitted to rock out of the path of the driving pawl 612 to permit the latter to enter a notch 614 preparatory to a succeeding intermittent advance of a length of lining paper. However, in the event that a carton blank 10 is absent, as detected by the roll 663, provision is made for latching the linkage to the stop arm 664 to hold the curved end 666 in alignment with the notch 614, thus preventing engagement of the driving pawl 612 with the slot so that during the succeeding cycle of operation, the driving pawl 612 will ride over the outer periphery of the disk 618, thus preventing advance of a length of lining paper during such cycle of operation.

As shown in FIGS. 1a and 8, the cam operated stop arm 664 is formed integrally with a second arm 668 connected by a link 670 to one arm 672 of a two-armed lever pivotally mounted on the rocker shaft 600. The second arm 674 of the two-armed lever is provided with a cam roll 675 for cooperation with a cam 676 fast on the cam shaft 122. In operation, the stop arm 664 is rocked into and out of the path of a notch 614 each cycle of operation. As herein shown, the latching mechanism for preventing engagement of the driving pawl 612 with its notch includes an extension 678 integral with the two-armed lever and provided with a latch plate 680 arranged to be engaged by a solenoid operated latch arm 682. The latch arm 682 is pivotally mounted at 684 and is connected by linkage indicated generally at 685 to a solenoid SOL-2 arranged to be energized when a carton blank is found to be absent.

As illustrated in FIGS. 1a, 6 and 7, the carton blank detecting roll 663 is carried by an arm 688 mounted on a sleeve shaft 690 rotatably supported on a central shaft 692. The central shaft 692 is journaled in a bracket attached to the machine frame and is provided with an arm 696 keyed thereto and connected by a link 698 to one arm 700 of a two-armed lever pivotally mounted on the shaft 300. The second arm 702 of the two-armed lever is provided with a cam roll 704 arranged to cooperate with a cam 706 fast on the cam shaft 308. A spring 708 is connected to the arm 702 to urge the roll against its cam.

The sleeve shaft 690 is also provided with an arm 710 fast thereon which is connected by a spring 712 arranged to urge the roll 663 down in a counterclockwise direction into engagement with the upper surface of an oncoming carton blank. A second arm 709, fast on the shaft 692, is resiliently connected to a second arm 711 carried by the sleeve arm 710 by a spring 714 as limited by a stop screw 716 carried by an extension 713 from the sleeve arm 710, the stop screw 716 cooperating with an arm 715 formed integrally with the arm 709. The sleeve arm 710 is further provided with a switch operating extension 718 arranged to cooperate with a microswitch S3 which when closed will energize solenoid SOL-2.

In operation the cam operated arm 696 and the roll carrying arm 688 move together as one to effect rocking of the detecting roll 663 into and out of the path of an oncoming carton blank 10 each cycle of operation. During normal operation, when the detecting roll 663 engages the upper surface of a carton blank, the switch operating extension 718 is held in a position so as not to operate the microswitch S3. However, if a carton blank is absent the detecting roll 663 will be permitted to rock down below the upper surface of the carton blank and into an opening 722 in the table. When this occurs the microswitch S3 will be closed to energize the solenoid SOL-2. As a result, the latch 682 will be rocked into the path of the latch plate 680 carried by the extension 678 from the two-armed cam lever to hold the stop arm 664 in its position in alignment with a notch 614 and thus prevent operation of the indexing mechanism during this cycle. During a succeeding cycle of operation, if the detecting roll 663 detects the presence of a carton blank, operation of the indexing mechanism will be resumed to feed a length of lining material. Corresponding controls in the second line include a microswitch S15 arranged to energize a solenoid SOL-5.

The predetermined length of lining web 60 thus intermittently advanced by the indexing roll 446 is received by the inclined guide 450 and, as herein shown, is guided between upper and lower inclined guide rails 724 which extend in a horizontal plane at the lower end of the inclined portion to present the leading end of the lining web in the path of a continuously moving carton blank 10. Since the leading end of the web being advanced one bag length may be frictionally retarded in its forward travel between the rails 724, provision is made for releasing streams of air along the underside of the leading end of the web during the advancing movement to assure that the web is fully extended over the carton blank prior to being severed. As diagrammatically illustrated in FIG. 33, a manifold 725 is arranged to release air through the ends of hollow rails 727 which pass between grooves in the feed rolls 446, 448. The manifold 725 is connected by a pipe 729 to one end of a valve 731, the other end of the valve being connected by a pipe 733 to the main supply line 255 of the air circuit shown in FIG. 33. A valve stem 735 for porting the air to the manifold during the advancing movement of the web is connected by a link 737 to one arm 739 of a cam lever pivotally mounted at 741. The second arm 743 of the cam lever is provided with a roll 745 for cooperation with a cam 747 fast on the cam shaft 136. A spring 749 is provided to urge the stem in a non-porting position. When the web 60 comes to rest at the end of its intermittent movement, provision is made for severing the predetermined length advanced to provide the lining sheet 12. As herein shown, the web is severed by the reciprocable cutter blade 454 which is arranged to cooperate with a stationary cutter blade 728 supported beneath the guide rails 724. The ends of the rails 727 terminate adjacent the cutter 728. The reciprocable blade 454 is carried by an arm 730 connected at its upper end to an arm 732 pivotally mounted in a bracket 734. The bottom or cutting edge of the reciprocable blade 454 does not extend horizontally but is arranged at a suitable shearing angle so that the lower end 726 thereof is always in engagement with the stationary blade 728, sufficient clearance being provided under the blade when it is in its up position to permit the web to pass thereunder. The reciprocable blade 454 is resiliently maintained in operative relation to the stationary blade by a spring 736 as shown.

As illustrated in FIG. 1a, the pivotally mounted arm 732 which supports the cutter blade arm 730 is connected by a link 738 to one arm 740 of a two-armed cam lever pivotally mounted on the shaft 600. The second arm 742 carries a roll 744 for cooperation with a cam 746 fast on the cam shaft 122. In operation the cutter blade 454 is normally reciprocated each cycle of operation to cut a length of lining material. However, provision is made for locking the cam lever arm 740 and the cutter blade in its up-raised position in the event that a carton blank is absent so that a lining sheet will not be severed at such time. As herein shown, the cam lever arm 740 is provided with a roller 748 arranged to cooperate with the curved end of a stop lever 750 pivotally mounted at 752. The stop lever 750 is connected by a link 754 to one arm 755 of a three-armed lever pivotally mounted on the shaft 600. A second arm 756 carries a roll 758 for cooperation with a cam 760 fast on the cam shaft 122. A third arm 762 carries a latch plate 764 arranged to cooperate with a latch 766 carried by an arm 768 formed integrally with and movable with the solenoid operated latch 682.

In operation the latch 766 is normally disposed in a position to engage the latch plate 764 each cycle so as to prevent rocking of the stop arm 750 into the path of the roller 748 and thus permit operation of the web cutting mechanism. However, when a carton blank is found to be absent by the detecting roll 663 and switch S3 so as to cause the solenoid SOL-2 to be energized and to rock the latch 682 into a position to prevent operation of the lining indexing mechanism, the latch 766 is simultaneously rocked out of latching engagement with the latch plate 764, thus permitting the cam operated stop arm 750 to be moved into the path of the roller 748, thus also prevent operation of the web cutting mechanism when a carton blank is found to be absent. It will be understood that each line of the duplex machine is provided with independent controls for their respective lining feed and associated mechanisms so that one line may continue in operation while the other line is inoperative to feed and sever a lining sheet when a carton blank is absent in such other line, the corresponding controls in the second line comprising the switch S15 and solenoid SOL–5 as described.

From the description thus far it will be seen that a predetermined length of lining material is advanced and severed from the web 60 each cycle to provide a lining sheet 12 which is combined with and adhesively secured to the upper surface of an oncoming and continuously moving carton blank 10. It will be noted that in the illustrated lined carton, see FIG. 15, the leading end of the lining sheet overlies the leading edge of the carton blank with the edge of the lining sheet extending forwardly of the edge of the carton blank. It will be understood that the web is severed at the end of the feeding cycle when the web is at rest, and at this time the leading end of the severed lining sheet and the leading edge of the carton blank are disposed in a position to be engaged by the cam operated combining roll 452 arranged to be moved down to press the lining sheet into engagement with the adhesive strip 36 of the carton blank and in predetermined relation thereto, the operation being timed with the arrival of the carton blank into a position to receive the lining sheet. Thus, it will be seen that the lining sheet is secured to the carton blank and maintained in predetermined relation thereto during subsequent operation by the adhesive strip 36 previously applied to the carton blank.

As illustrated in FIGS. 1a, 11 and 12, the combining roll 452 is carried by an arm 772 mounted loosely on a rocker shaft 774 journaled in spaced brackets 776 attached to the machine frame. The shaft 774 is arranged to be rocked to present the combining roll into and out of engagement with the lining sheet and the carton blank each cycle of operation by a cam 778 fast on a cam shaft 780 also journaled in the brackets 776. A cam roll 782 cooperating with the cam is carried by an arm 784 fast on the shaft 774. A spring 775 is connected to the arm 784 to hold the roll against its cam. The cam shaft 780 is driven by a chain and sprocket connection 786 from the cam shaft 130 as shown. The loosely mounted roll carrying arm 772 is connected by a spring 788 to one arm 789 of a two-armed lever fast on the shaft 774. The second arm 790 of the two-armed lever carries a stop screw 792 for cooperation with an extension 794 from the arm 772. Thus, in operation the roll 452 is positively rocked upwardly by the cam and is resiliently rocked downwardly into engagement with the composite carton blank and lining sheet to press the lining sheet into engagement with the adhesive strip 36. A second roll 453, similarly mounted on the shaft 774, is aligned with the laterally extended marginal edge of the lining, and each roll 452, 453 cooperates with similar driven rolls 796 fast on the cam shaft 780 to advance the lined blank between the rolls at a linear speed equal to the travel of the conveyer chains 150. The provision of two rolls 452, 453 assures advance of the lined blank in a straight path without twisting out of alignment with the conveyer.

Provision is also made at this point for detecting the presence of a lining sheet 12 and for discontinuing operation of the machine in the event that a lining sheet has not been advanced into position to be combined with a carton blank due to some malfunction in the lining feed operation. As herein shown, one marginal edge of the lining sheet 12 extends laterally beyond the edge of the side seam flap 22 of the carton blank, and a feeler arm 798 carried by a sleeve shaft 800 is arranged to be rocked down on top of this extended lining portion each cycle of operation at the same time that the combining roll 452 is rocked down. The sleeve shaft 800 is loosely mounted on the cam operated shaft 774 and is also provided with an elongated switch operating arm 802 clamped to the sleeve shaft and arranged to cooperate with a microswitch S9. An operating arm 806 clamped to the shaft 774 is provided with two lateral extensions 808, 810 which carry set screws 812, 814 adjustably mounted therein for engagement with opposed sides of the switch operating arm.

In operation, when the shaft 774 is rocked in a counterclockwise direction to present the combining roll in engagement with the lining and the blank, the set screw 814 engages the front edge of the switch arm to rock the feeler arm 798 downwardly against the laterally extended lining portion. If there is a lining present, the feeler arm will be held up in a position to prevent further movement of the switch arm. However, should the lining be absent, the feeler arm 798 will be rocked downwardly beyond the level of the lining and into an opening in the table. When this occurs the switch arm 802 will be rocked into a position to engage and operate the microswitch S9 to effect stopping of the machine. Since the movement of the feeler arm is not sufficient to effect positive operation of the switch, the arm 802 may be provided with a spring to effect such positive movement or, as herein shown, the arm 802 may be provided with a bar 816 arranged to cooperate with a permanent magnet 818 carried by the switch support to effect such positive movement when the bar is rocked into the magnetic field of the magnet. After the fault in the lining feed operation has been corrected the machine is again started in operation. The sleeve shaft 800 is rocked in a clockwise direction to reset the feeler arm and the switch arm by the engagement of the set screw 812 with the rear edge of the switch arm through the cam operated connections described. It will be seen that the second roll 453 supports the marginal edge of the lining in a taut condition during the detecting operation. As herein shown, the cam operated shaft 744 may also be provided with an operating handle for convenience in manually rocking the combining roll and the feeler arm up out of the way when necessary. A corresponding switch S21 is provided in the right hand line 48 for stopping the machine in the event that a lining sheet fails to be detected at the combining station in the second line.

While the safety device above described is required to assure that a lining is provided on a carton blank before it is advanced to the carton forming mechanism, if a carton blank fails to be detected by the detecting roll 663 in a position prior to arrival at the combining station, and as a result thereof the lining indexing mechanism is automatically rendered inoperative, then at such time it is not desired to have the feeler arm 798 operate to stop the machine. Accordingly, when a carton blank is found to be absent and the lining indexing mechanism is rendered inoperative, provision is also made for simultaneously rendering the switch S9 inoperative to stop the machine at such time. As illustrated in FIG. 1a, the cam operated arm 755 which rocks the stop lever 750 for preventing the cutting operation is also provided with an extension 820 arranged to cooperate with a microswitch S8 forming a part of the control circuit to be described and which is arranged to render the lining detecting switch S9 inoperative to stop the machine. Thus, the machine is maintained in continuous operation, despite the absence of a carton blank and lining sheet, to permit the machine to complete the lined cartons previously advanced into the carton forming mechanism 66. A corresponding switch S20 is provided in the second line arranged to render the switch S21 inoperative to stop the machine when a carton blank fails to be detected prior to arriving at the combining station.

Figure 1B:
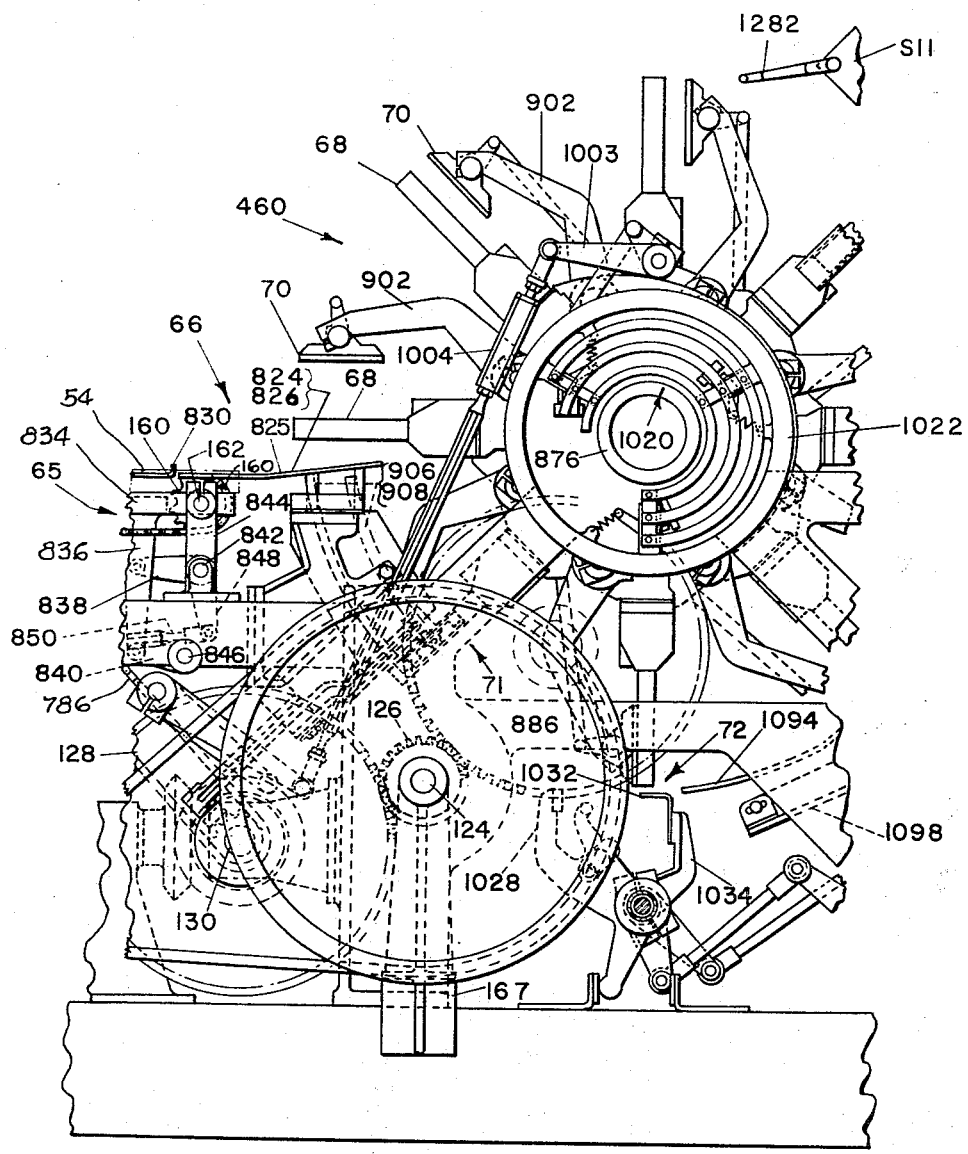
Figure 1C:
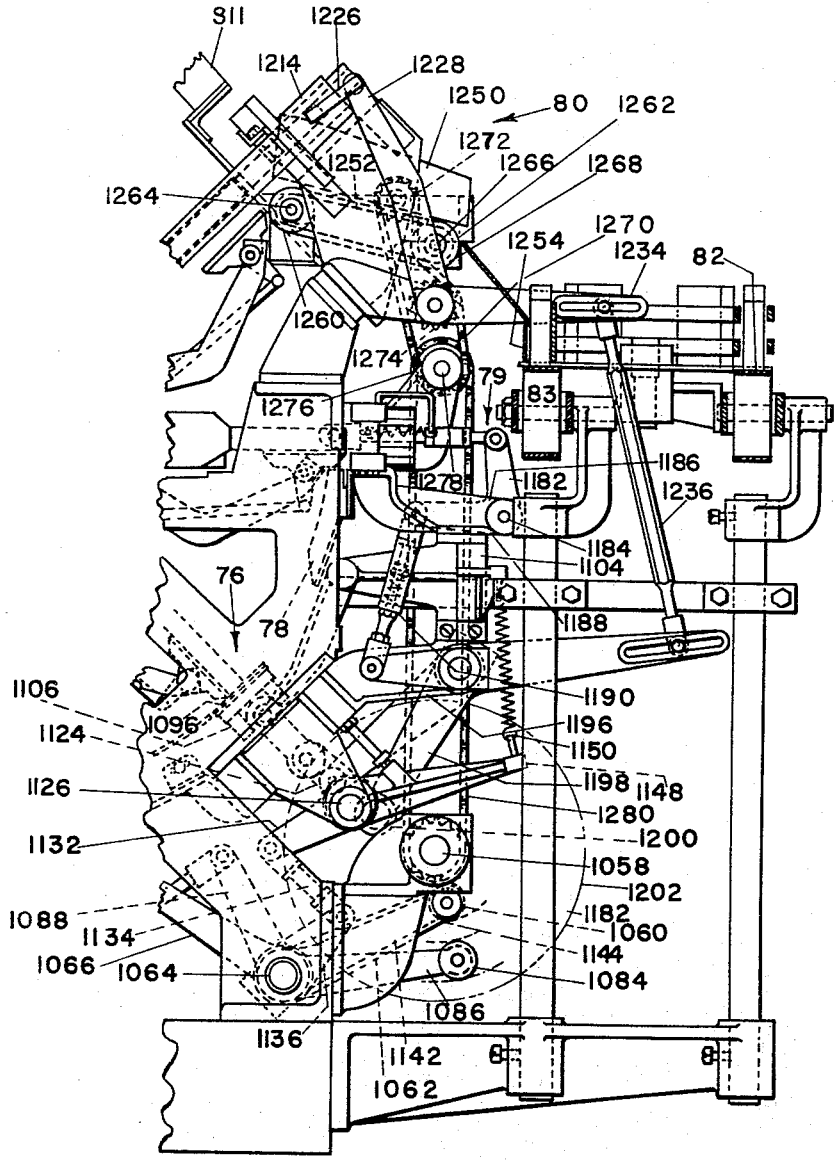

The carton blank 10 and lining sheet 12 secured thereto are continuously advanced between the combining rolls 452, 796, the lower rolls 796 being driven at the same surface speed as the linear speed of the conveyer 54. As previously stated, the carton blank 10 is continuously advanced along the supporting table 148 by the conveyer chain lugs 152 engaging the rear edges thereof. Now, as the composite carton blank and lining sheet approach the end of the conveyer 54, provision is made for transferring the composite blank from the conveyer 54 onto spaced supporting and folding members 824, 826 in operative position to be engaged by an intermittently operated forming block 68 forming a part of the carton forming mechanism 460. The transferring operation is accomplished by the pusher mechanism 65 which, as herein illustrated, see FIG. 1b, includes a pair of spaced pusher fingers 828, 830 which are offset to engage the rear edge of the bottom closing flap 28 and the rear edge of the side wall flap 26 without engaging any portion of the lining sheet. The pusher fingers 828, 830 are carried by a slide member 832 which is mounted on a slide bracket 834 arranged to be moved vertically during longitudinal reciprocation of the slide member 832 to cause the pusher fingers 828, 830 to be extended upwardly through openings in the table 148 to engage the rear edges of the blank and move it forwardly, the fingers then being lowered and returned to their initial position in readiness to engage and advance a succeeding carton blank. As herein shown, the vertically movable slide supporting bracket 834 is provided with a depending arm 836 carried by parallel arms 838, 840, one arm 838 of which is mounted on a shaft 842 supported in a bracket 844 attached to the machine frame and in which the shaft 162 supporting the conveyer chain sprockets 160 are journaled. The second parallel arm 840 is mounted on a lower shaft 846 journaled in the machine frame. The upper shaft 842 is provided with an arm 848 connected by a link 850 to an arm 852 fast on a rocker shaft 854 journaled in spaced brackets attached to the machine frame. Keyed to the rocker shaft 854 is a cam lever 856 provided with a roller 858 for cooperation with a barrel cam 860 fast on the cam shaft 136.

Figure 25:
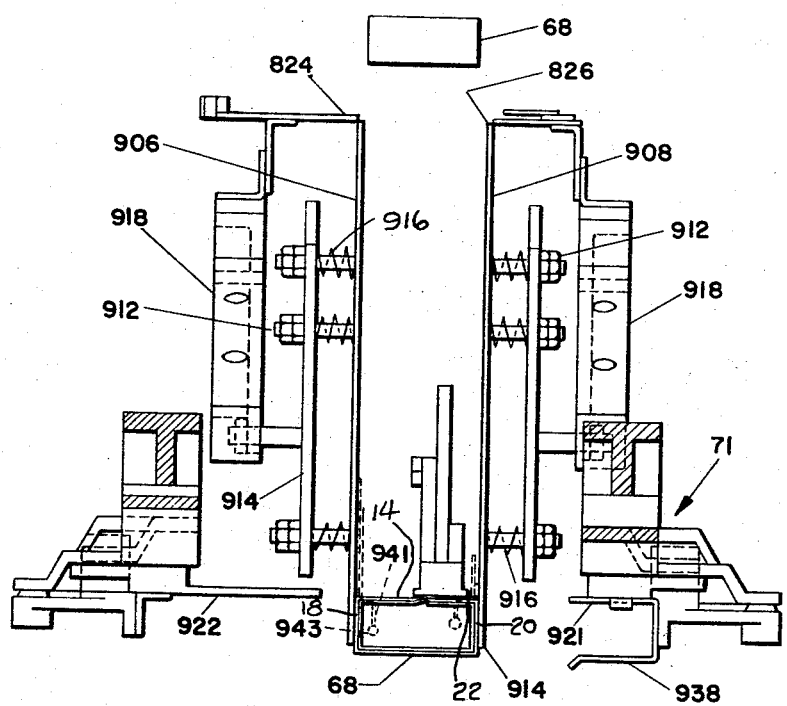
FIG. 25 is a detail view in front elevation of the side seam folding mechanism.
Figure 37:
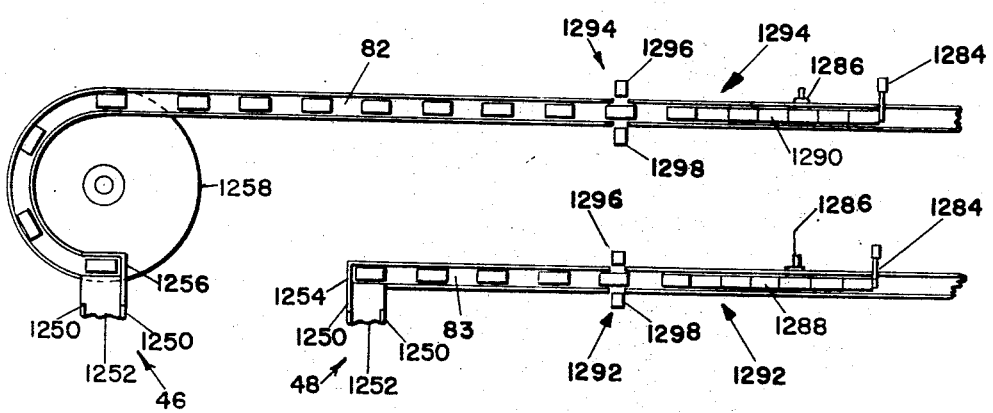
FIG. 37 is a plan view of the discharge conveyers and associated control mechanism to be described.

In order to reciprocate the slide member 832 on the vertically movable bracket 834 to effect the transfer operation, the slide member 832 is connected by a link 862 to an arm 864 keyed to a rocker shaft 866 also journaled in brackets attached to the machine frame. A second arm 870 keyed to the shaft 866 carries a roll 872 which cooperates with a barrel cam 874 also fast on the cam shaft 136. Thus, in operation the composite carton blank is advanced by the pusher mechanism 65, preferably at a slightly faster rate than the advance of the carton by the conveyer chains 150, to present the carton blank and its lining between guides 825 and against a stop member 827 and spanning the carton supporting and folding members 824, 826 in operative relation and in registered position relative to the intermittently operated forming block 68. The carton in its registered position is arranged with its longitudinal scored lines 17, 19 in alignment with the inner edges of the carton supporting members 824, 826 so that when the intermittently operated forming block 68 is rotated into engagement with the composite carton block it will engage the side wall panel 16 and will fold upwardly against the sides of the forming block, end wall panels 20 and 18, the latter having the connected side wall panel 14 attached thereto. As illustrated in FIG. 25, the panels 20 and 18 are held in their upwardly folded condition during travel of the forming block from a horizontal station of operation to the side seam folding station 71 disposed at 45° from the horizontal, at which station the side wall panel 14 will be folded over the upper surface of the forming block and secured in overlaping relation to the side seam flap 22 as will be hereinafter more fully described.

Figure 21:
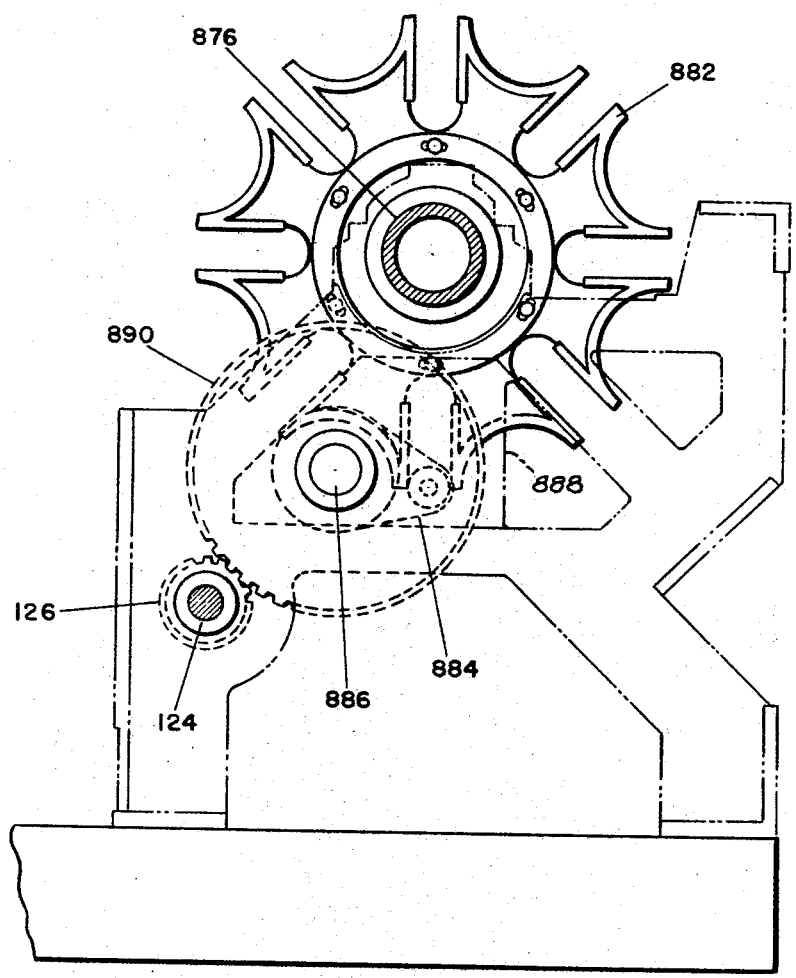
FIG. 21 is a side elevation of the Geneva driving mechanism.
Figure 22:
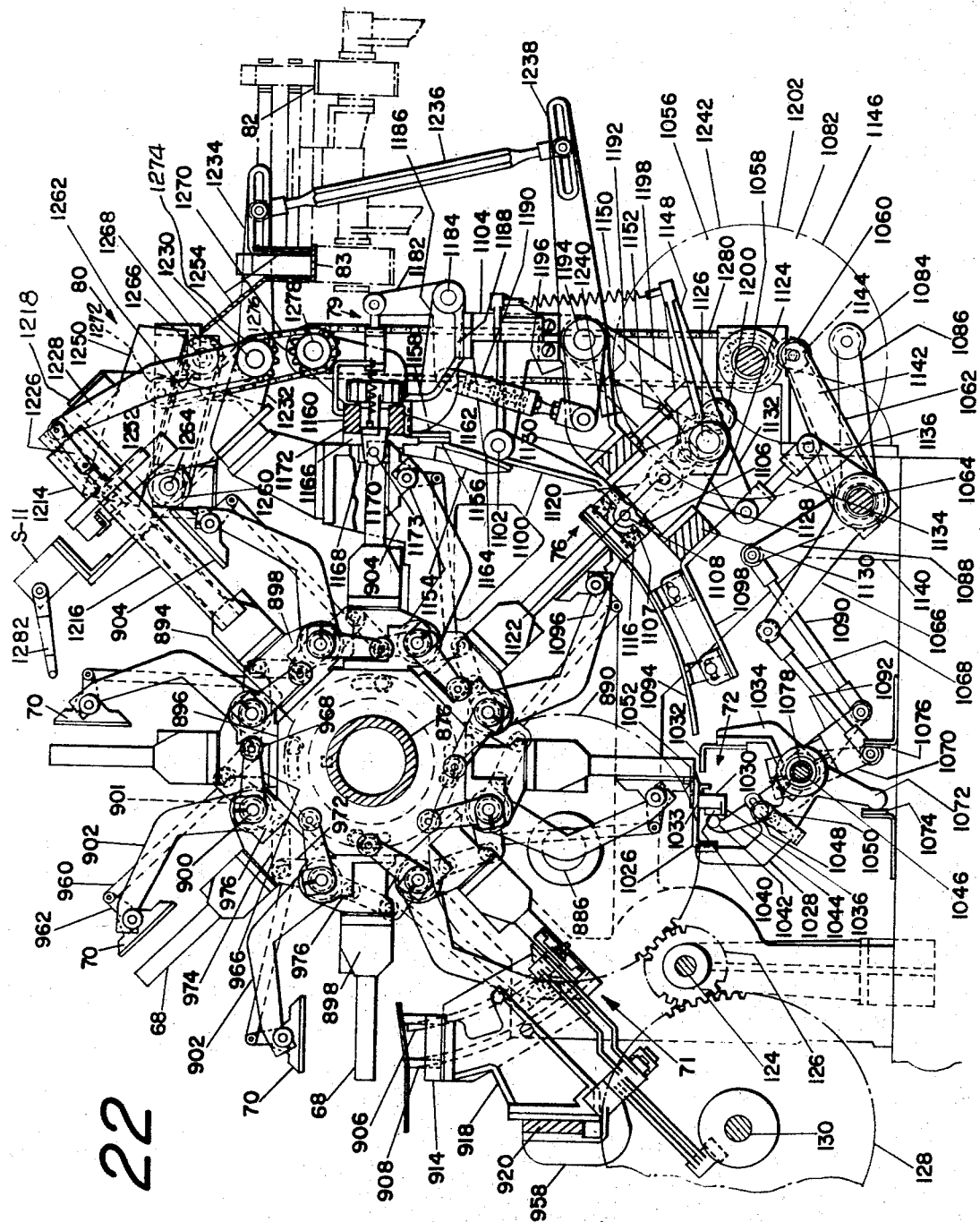
FIG. 22 is a side elevation, partly in cross section, of the forming block spider and showing the various operating stations for producing the lined carton.

Referring now to FIGS. 21 and 22, the rotary spider carrying the radially extended and intermittently operated forming blocks 68 is mounted on a hollow shaft 876 journaled in the spaced side frames of the machine. The hollow shaft 876 is arranged to be intermittently rotated through a Geneva drive which includes an 8-point Geneva spider 882 keyed to the hollow shaft 876 and arranged to cooperate with a Geneva driver 884 fast on one end of a stud 886 journaled in a bracket 888 secured to a side frame. The stud 886 is provided at its other end with a gear 890 in mesh with the drive pinion 126 fast on the main drive shaft 124 and which also drives the gear 128 on the cam shaft 130 as described. Also keyed to the hollow shaft is a flanged member 894 to which an octagonal supporting member 986 is secured. A bracket 898 is connected to each octagonal face, and a forming block 68 is attached to and readily extended from the outer face of each bracket 898 as illustrated. Each bracket 898 also carries a shaft 900 provided with a sleeve shaft 901 on which is mounted an arm 902 which carries the side seam presser 70 to be hereinafter more fully described.

As illustrated in FIGS. 22 and 25, during the intermittent movement of the forming block 68 through 45° to engage and fold the end wall panels 18, 20 and the attached lining sheet against the narrow sides of the forming block 68, the end wall panels are maintained against the sides of the forming block by a plurality of opposed sets of curved rails 906, 908. The rails extend through about 45° to the next station of operation indicated generally at 71 wherein the side seam folding operation is performed. The rails 906, 908 may be resiliently supported by studs 912 carried by plates 914, the studs being provided with springs 916 interposed between the plates and the rails to maintain pressure against the sides of the forming block. The studs 912 are loosely mounted in the plates 914, and the latter are supported by extensions from spaced brackets 918 secured to a transverse bar 920 attached to the machine frame.

When the forming block 68 comes to rest after its first 45° movement at station 71, provision is made for folding inwardly the upstanding side seam flap 22 and its adjacent lining portion, and the upstanding side wall panel 14 and its adjacent lining portion to present the adhesive strip 38 in sealing engagement with the side seam flap 22 and to present the adhesive strip 42 of the lining in overlapping and sealing engagement with the opposing marginal edge of the lining. It will be noted that at this time the adhesive areas 32, 34 on the carton blank are caused to be pressed against the lining sheet to adhere thereto.

As shown in FIGS. 3b, 22 and 25, the folding operation is accomplished by opposed cam operated folding plates 921, 922. The plate 921 for folding in the side seam flap 22 is attached to a bracket 923 carried by one arm 924 of a two-armed lever pivotally mounted on a stud 926, the second arm 928 being provided with a cam roll 930 for cooperation with a barrel cam 932 fast on the cam shaft 130. A parallel link 934, also attached to the bracket 923, is connected to an arm 935 clamped to the pivot stud 926 to provide substantially parallel movement of the folding plate 921. The plate is provided with slots 936, as shown, to provide clearance for the resiliently pressed rails 908 which hold the composite blank against the block at this time. The folding plate 921, as seen in FIG. 25, may comprise a U-shaped member having a lower leg 938 for engagement with the underside of the block so as to support the carton tightly against the block during the folding operation.

The opposite folding plate 922 is also attached to a bracket 940 carried by one arm 942 of a two-armed lever pivotally mounted on a stud 944. The second arm 946 of the two-armed lever also carries a cam roll 948 for cooperation with a barrel cam 950 fast on the cam shaft 130. A parallel link 952 also connects the bracket 940 to an arm 954 clamped to the pivot stud 944. The folding plate 922 is also provided with clearance slots 956 for the rails 906. The pivot studs 926 and 944 are supported in similar brackets 958 attached to the transverse bar 920.

Figure 2B:
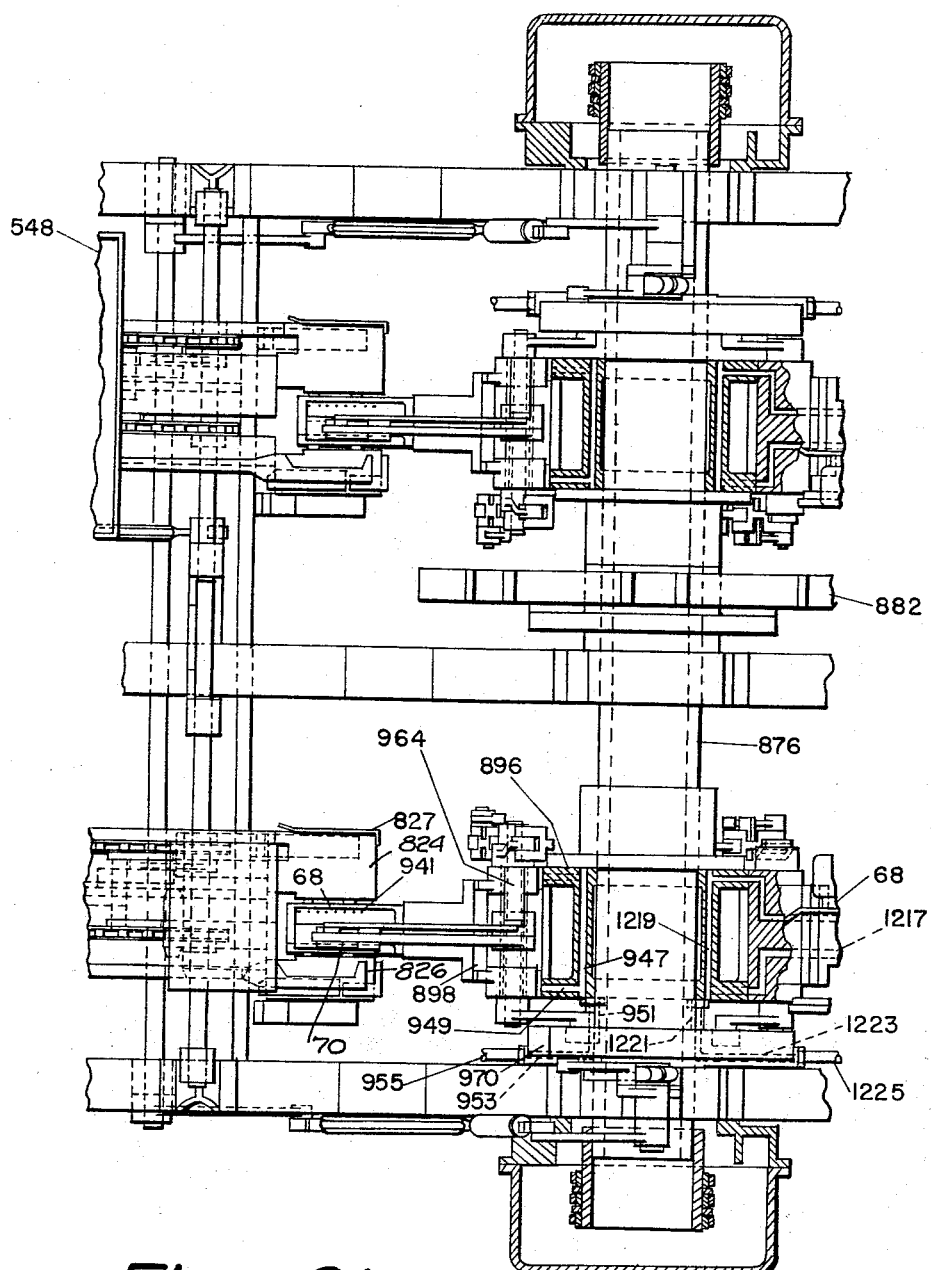
Figure 2C:
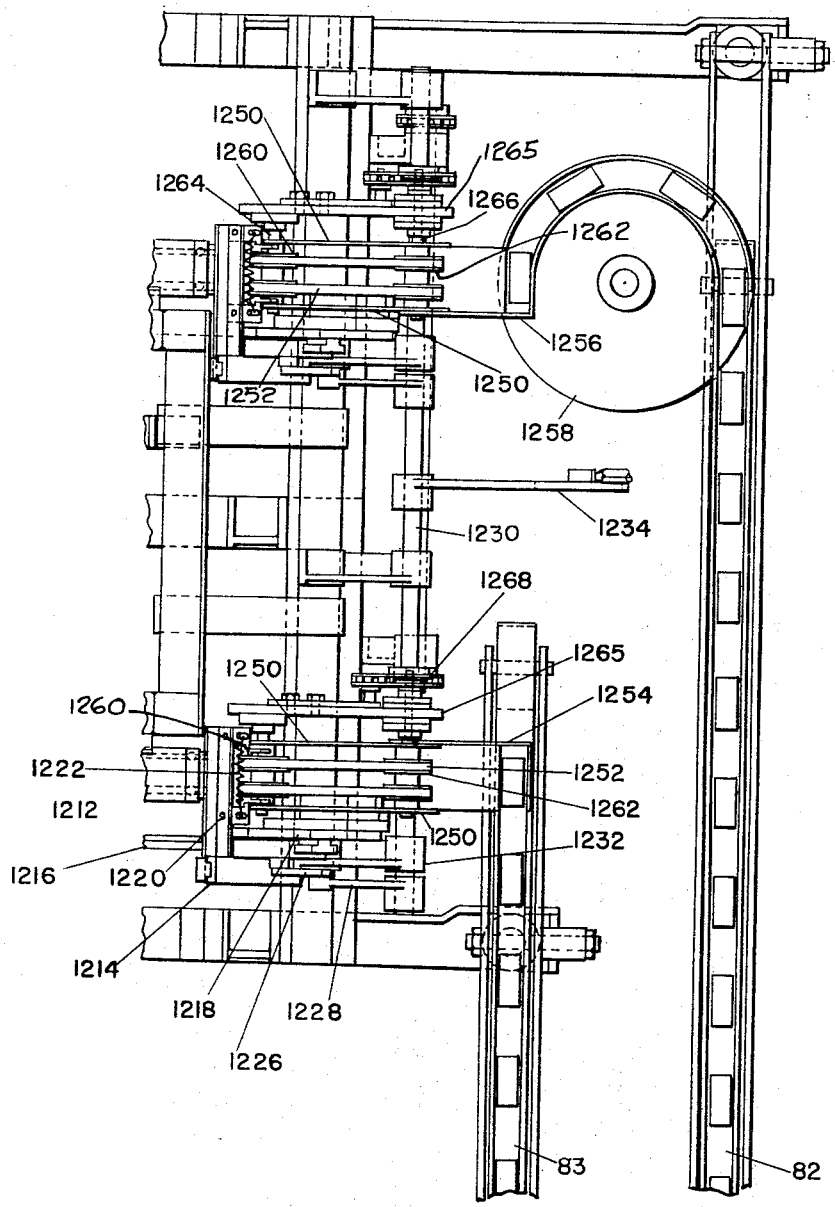
Figure 13:
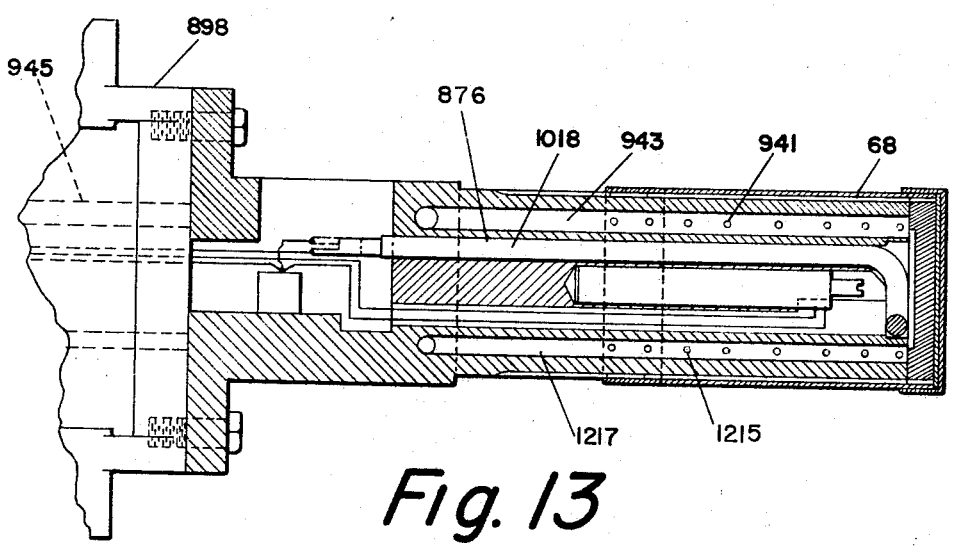
FIG. 13 is a detail view in cross section of a forming block.
Figure 14:
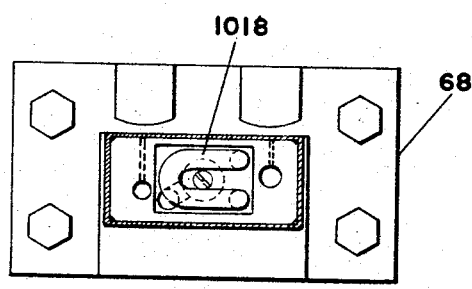
FIG. 14 is an end view of the same with the end plate removed.
Figure 33:
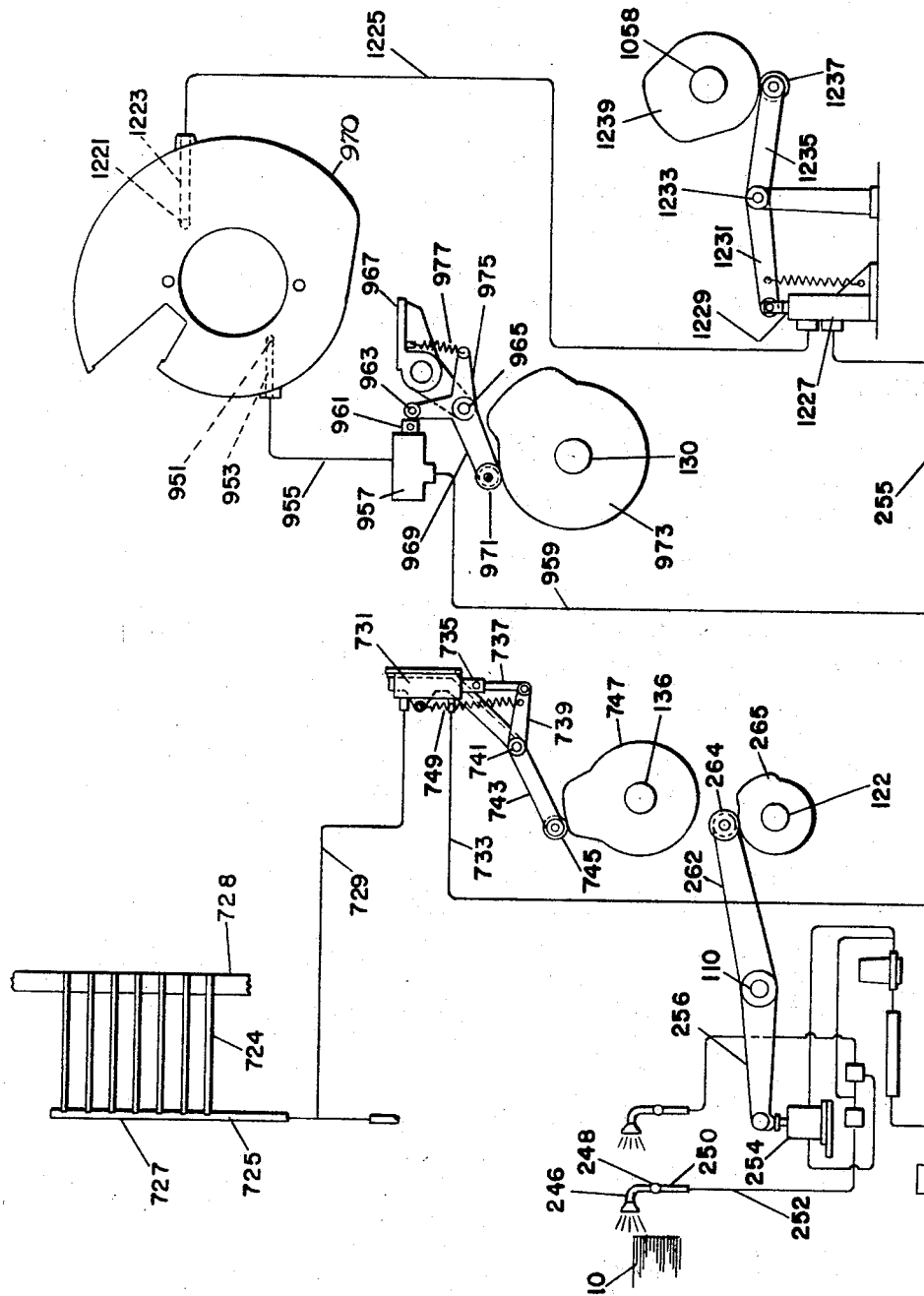
FIG. 33 is a diagrammatic view of the air lines to the various air operated mechanisms to be described.
Figure 34:
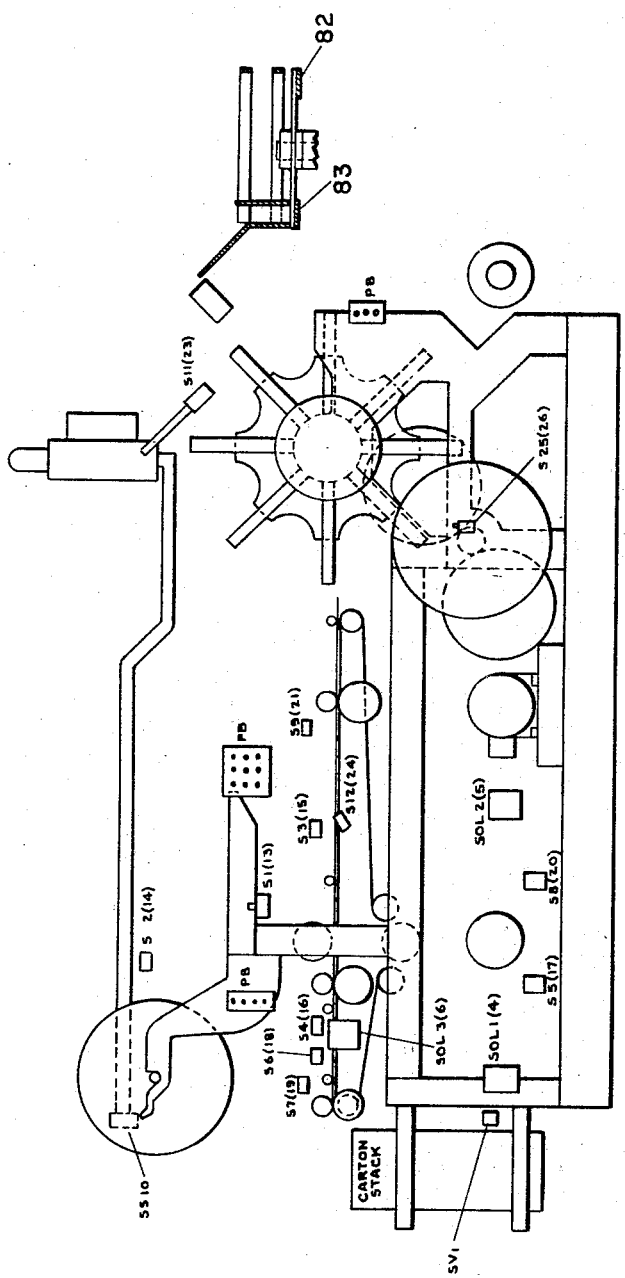
FIG. 34 is a diagrammatic view in side elevation showing the various controls embodied in the present machine.
Figure 35:
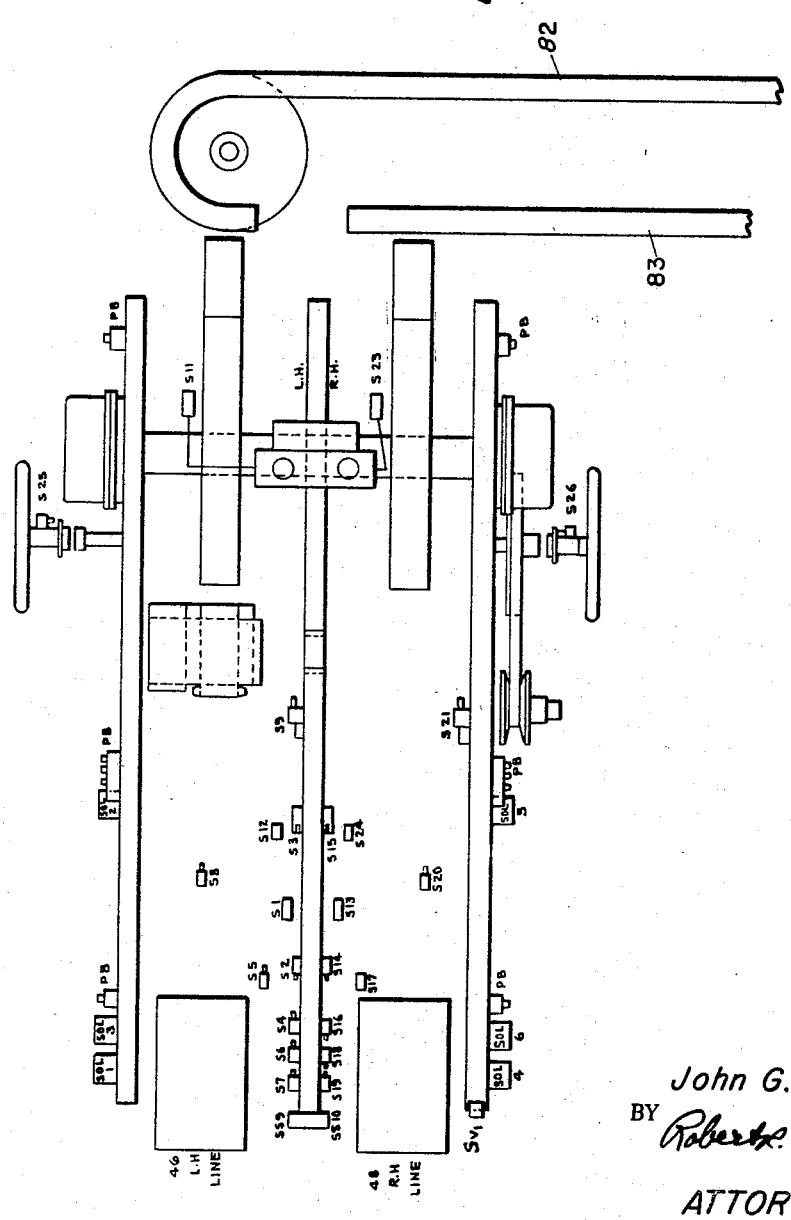
FIG. 35 is a plan view of the same.

Since the lining sheet may be of a flexible and non-rigid material, the unsupported extended marginal portion of the lining adjacent the side wall panel 14 which is to be folded into overlapping and sealing engagement with the opposing marginal portion of the lining may collapse, and as a result thereof during the suosequent folding operation the marginal portion of the lining may not assume a fully extended position. In order to maintain the marginal portion of the lining in a fully extended position at this time, provision is made for releasing streams of air through openings 941 along an adjacent marginal edge of the forming block 68 against the inner face of the lining prior to the folding operation. As illustrated in FIGS. 2b, 13 and 33, the openings 941 communicate with a passageway 943 formed in the block which in turn communicates with a passageway 945 formed in the connecting bracket 898 attached to the octagonal supporting member 896 mounted on the hollow shaft 876. The octagonal supporting member 896 is provided with a lateral opening 947 leading to a passageway 949 which communicates with the passageway 945 in the connecting bracket 898 attached thereto. When the forming block 68 is moved to the side seam folding station 71, the lateral opening 947 is aligned with a laterally extended hollow stud 951 fast in a stationary cam 970. The stud 951 communicates with a passageway 953 in the stationary cam and is connected by a pipe 955 to a valve 957 as diagrammatically indicated in FIG. 33. The valve 957 is connected to the main air line 255 by a pipe 959. A valve stem 961, arranged to port the air to the pipe 955, is connected to one arm 963 of a three-armed lever pivotally mounted at 965 in a bracket 967 attached to the machine frame. A second arm 969 is provided with a cam roll 971 for cooperation with a cam 973 fast on the cam shaft 130. The third arm 975 is connected by a spring 977 to hold the roll against the cam. In operation the air is released through the openings 941 when the forming block comes to rest at station 71, and the air is discontinued when the side seam folding operation is started.

In operation the folding plate 921 is moved inwardly to fold the side seam flap 22 against the upper face of the forming block, and the folding plate 922 is then moved inwardly to fold the side wall panel against the upper surface of the forming block, the plate 921 being retracted at this time to permit the adhesively coated strip 38 of the side wall panel to engage and overlap the side seam flap 22. It will be apparent that the adjacent portions of the lining sheet 12 are simultaneously folded inwardly with the side seam flap and the side wall panel to present the adhesive strip 42 of the lining against the extended marginal edge of the lining folded inwardly with the side seam flap.

The side seam presser 70 is now rocked into pressing engagement with the lining and carton side seams while the folding plate 922 is being retracted. As illustrated, the side seam presser is relatively narrow to engage the marginal edge of the upper surface of the forming block. In practice the leading edge of the folding plate 922 is moved only part way across the upper surface of the forming block so as not to interfere with the presser, and the plate 922 may remain in engagement with the side wall panel 14 to hold the same in its folded position until the presser is lowered whereupon the folding plate 922 is retracted.

Figure 24:
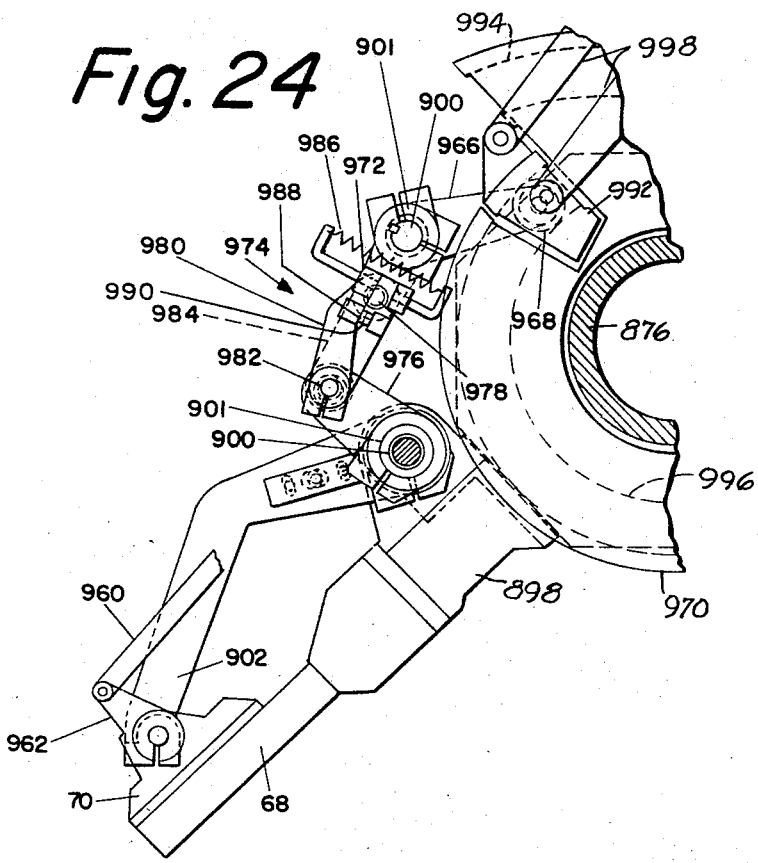
FIG. 24 is a detail view in side elevation of the side seam clamping mechanism.

As illustrated in FIGS. 22, 23 and 24, the side seam presser 70 is pivotally carried by the arm 902 and is provided with a parallel link 960 connected between an extension 962 of the presser and an angle bracket 964 secured to the supporting bracket 898 to provide movement of the presser in a plane substantially parallel to the upper face of the forming block 68. Provision is made for rocking the sleeve shaft 901 to present the side seam presser 70 into pressing engagement with the side seam at this time through connections from the central shaft 900 of an adjacent succeeding side seam presser unit. As herein shown, one end of each shaft 900 has keyed thereto an arm 966 provided with a cam roll 968 which rides in a cam path formed in a stationary cam 970. The cam 970 is stationarily supported on the hollow shaft 876 and is held stationary by connections to the side frames. The other end of each central shaft 900 is provided with an arm 972 keyed thereto which is connected through toggle connections indicated generally at 974 to an arm 976 clamped to the sleeve shaft 901 of the preceding side seam presser. The toggle connections include the arm 972 which is connected by a pin 978 to a bifurcated arm 980. The other end of the arm 980 is bifurcated and has one end of an eccentric pin 982 extended therethrough. The other end of the eccentric pin 982 is carried by the arm 976 which is clamped to the sleeve shaft 901 to which the presser arm 902 is connected.

From the description thus far it will be seen that the pivotally connected arms 972 and 980 between the central shaft 900 of one presser unit and the side seam presser operating arm 976 of a preceding presser unit will effect rocking of the presser 70 into and out of engagement with the side seam. Provision is also made for rocking the eccentric pin 982 to increase the pressure when the toggle approaches the end of its presser stroke. For this purpose, the pin 982 has clamped thereto an arm 984 disposed between the bifurcations of the second end of the toggle arm 980 and which is connected by a spring 986 to the toggle arm 972 to move therewith as limited by stops 988, 990 carried by the arms 984 and 980, respectively. Thus, in operation, when the toggle linkage is rocked to perform the pressing operation, the eccentric pin 982 is positively rocked by virtue of the engagement of the stops 988, 990 to apply additional pressure through the eccentric connection.

Since the side seam presser mechanism must be operated during a portion of the idle period of the intermittently operated forming blocks, the stationary cam 970 is provided with a movable section 992, see FIG. 23, which is cam operated to be moved from a position in alignment with the end of the high point 994 of the stationary cam to a position in alignment with the beginning of the low point 996 of the stationary cam. As herein shown, the movable cam section 992 is carried by parallel linkage 998 connected to one end of a shaft 1000 journaled in a bracket 1002 attached to the machine frame. The other end of the shaft 1000 is provided with an arm 1003 connected by a link 1004 to an arm 1006 fast on a rocker shaft 1008 journaled in brackets 1010 attached to the machine frame. A second arm 1012 fast on the rocker shaft 1008 is provided with a cam roll 1014 which cooperates with a cam 1016 fast on the cam shaft 130.

In operation, when the intermittently operated forming block comes to rest at the side seam folding station, the movable cam section 992 is in alignment with the high point 994 of the stationary cam 970, and the cam roll 968 comes to rest in the movable cam section 992. After the side seam flap 22 and the side wall panel 14 have been folded down, as described, the cam 1016 operates to move the cam section 992 down into alignment with the low point 996 of the stationary cam 970, thus operating the side presser to perform the pressing operation. During a succeeding intermittent movement of the forming block 68 the roll 968 follows the low portion 996 of the stationary cam path to maintain constant pressure against the side seam during subsequent carton forming operations.

In practice, when the carton or lining embodies a hot melt adhesive, such as is applied to the present lining sheet, the forming blocks 68 are arranged to be heated so as to effect reactivation of the adhesive when pressure is applied to the side seam, as above described, to form the seal. As herein shown, see FIG. 13, each forming block 68 is provided with electric heating elements indicated at 1018 which are connected by wires extended through the hollow shaft 876. The other ends of the wires are connected to a commutator and brush mechanism indicated generally at 1020 in FIG. 1b. The commutator and brush mechanism 1020 is connected to the open end of the hollow shaft 876 and is contained in a housing 1022 attached to the side frame of the machine as shown. Also, when the lining material comprises a wax paper or a thermoplastic material, it will be apparent that the contacting portions of such materials will be softened and fused together upon application of heat and pressure.

When the forming block 68 is moved 45° to the next station of operation, comprising the lining end fold and carton end fold station indicated at 72, the carton is in condition shown in FIG. 17 wherein the lining is fully extended, and the end closure panels 26 and 28 are also extended.

As illustrated in FIG. 22, when the forming block comes to rest at the lining and carton end fold station 72, the shorter end closure flap 26 is first folded inwardly by a folding plate 1026 adjustably carried by a rocker arm 1028 and, simultaneously therewith, the adjacent extended lining portions are also folded inwardly. Immediately thereafter the narrow side wall portions of the extended lining are folded outwardly by opposed curved folding elements 1030 carried by the folding plate 1026 which cause such portions to assume an angular shape forming one half of the laterally extended triangular end tabs 74 which are formed when the opposite full length closing flap 28 is folded inwardly together with the adjacent extended lining portions by a second folding plate 1032 carried by an opposing rocker arm 1034.

Figure 26:
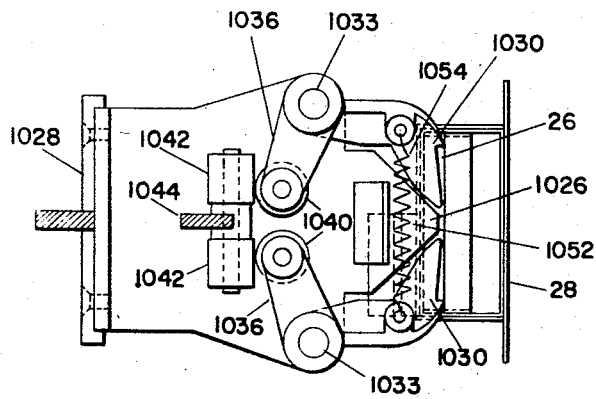
FIG. 26 is a detail view as seen from the underside of a portion of the end folding mechanism.
Figure 27:
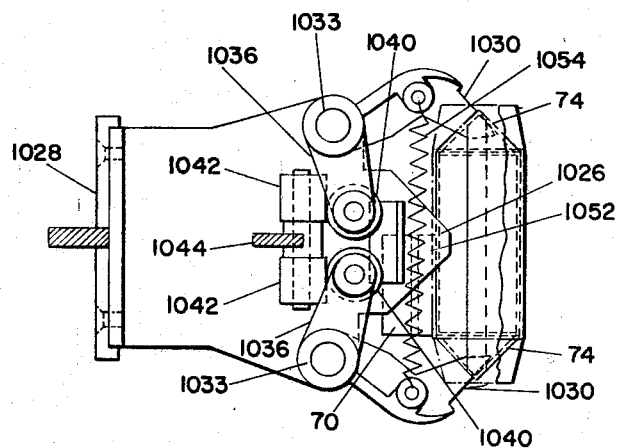
FIG. 27 is a similar view showing the parts in a different position of operation.
Figure 28:
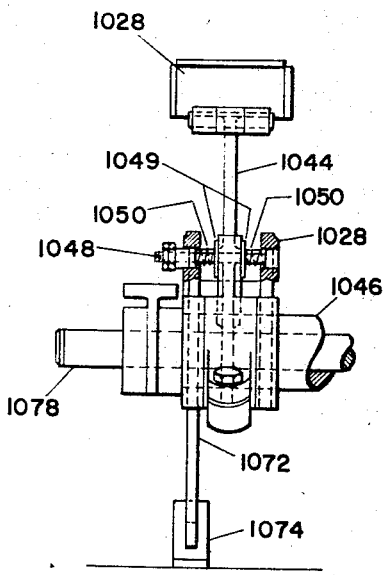
FIG. 28 is a detail view in front elevation of a portion of the end folding mechanism.

As herein shown, see FIGS. 26 and 27, each curved folding element 1030 carried by the folding plate 1026 forms one arm of a bell crank pivotally carried by depending pins 1033. The second arm 1036 of each bell crank carries vertically disposed rollers 1040 for cooperation with horizontally disposed rollers 1042 mounted on a cam operated arm 1044 fast on a sleeve shaft 1046. The arm 1028 is loosely mounted on the sleeve shaft 1046 and is frictionally connected to move with the cam operated arm 1044 by a pin and slot connection, as shown in FIG. 28. A pin 1048 is received in an opening in the arm 1028 and extends through a slot in the arm 1044. The pin is provided with spaced springs 1050 coiled thereabout and confined thereon to apply pressure against friction washers 1049 which engage opposite sides of the cam operated arm 1044 to permit relative frictional movement of the arms. The folding plate 1026 carried by the arm 1028 is provided with a stop 1052 which engages the adjacent edge of the forming block after the closure flap 26 is folded inwardly to bring the frictionally movable arm 1028 to rest while the cam operated arm 1044 continues to move to effect outward rocking of the curved folding elements 1030. The latter are connected by a spring 1054 to be urged inwardly towards each other. The cam operated arm 1044 is arranged to be rocked by a cam 1056 fast on a cam shaft 1058 and by connections including a cooperating cam roll 1060 carried by one arm 1062 of a two-armed lever pivotally mounted on a shaft 1064. The second arm 1066 is connected by a link 1068 to an arm 1070 fast on the sleeve shaft 1046. The cam shaft 1058 is driven through connections from the cam shaft 130 which include bevel gears 1059, 1061 connecting the shaft 130 to a cam shaft 1063, and the latter is also connected by bevel gears 1065, 1067 to the cam shaft 1058 as shown in FIGS. 3b and 3c.

In operation, when the cam operated arm 1044 is rocked inwardly, the frictionally movable arm 1028 is rocked inwardly therewith to effect folding of the short flap 26 and the adjacent lining extension against the bottom of the forming block. When the stop 1052 engages the edge of the forming block, the frictionally movable arm 1028 comes to rest while the cam operated arm 1044 continues to effect rocking of the folding elements 1030 outwardly to spread the adjacent lining portions laterally as described. Simultaneously with engagement of the stop 1052 with the edge of the forming block, a depending extension 1072 of the frictionally movable arm 1028 engages a lower stop 1074 secured to the machine platen to hold the arm in its stopped position and to relieve any excessive pressure against the side of the block. Subsequently, at the end of the folding stroke, the cam operated arm 1044 is rocked outwardly with the frictionally engaged arm 1028 until it approaches the end of its retracting stroke, at which time the extension 1072 strikes another lower stop 1076 which holds the arm 1028 stationary while the cam operated arm 1044 completes its retracting stroke to effect resetting of the frictionally engaged arms in their initial position in readiness for a succeeding folding operation.

Before retraction of the folding plate 1026, the opposing folding plate 1032 carried by the rocker arm 1034 is rocked inwardly to fold the full length flap 28 over the free end of the shorter flap 26, the folding plate 1026 being retracted as the folding plate 1032 is advanced. The adjacent lining extension is folded inwardly with the flap 28 into overlapping relation with the opposing folded lining extension, the end wall portions of the lining being folded outwardly to complete the other half of the triangular end tabs 74.

The rocker arm 1034 which carries the folding plate 1032 is fast on a central shaft 1078 on which the sleeve shaft 1046 is carried. The central shaft is journaled in bearing brackets 1080 attached to the machine platen and is arranged to be rocked to perform the folding operation by a cam 1082 fast on the cam shaft 1058 and by connections including a cooperating cam roll 1084 carried by one arm 1086 of a two-armed lever pivotally mounted on the shaft 1064. The second arm 1088 of the two-armed lever is connected by a link 1090 to an arm 1092 fast on the shaft 1078.

In operation, the folding plate 1032 may remain in its forwardly extended position during the initial movement of the forming block to the next station of operaiton in order to hold the last folded flap 28 in position to be engaged by a curved rail 1094 as illustrated in FIG. 22. It will be observed that the folding plate 1032 does not snugly engage the bottom of the block, but is spaced a short distance therefrom, sufficient to hold the last folded flap 28 in overlapping engagement with the shorter flap 26, as shown, and when the forming block is moved onto the curved rail, the latter serves to maintain the folded portions of the bottom closure in operative position to be pressed into sealing engagement at the next station of operation as indicated at 76. It will be observed that after the forming block passes beyond the upper end of the curved rail 1094 the partially formed bottom closure is retained in operative position to be sealed by engagement with the upper surface of a presser plate 1096 in its retracted position. The curved rail 1094 may be adjustably supported by a bracket 1098 secured to a part of the machine frame.

From the description thus far it will be observed that when the forming block 68 arrives at the end press station 76 the partially completed bottom closure is in the condition shown in FIG. 18 with the lining end tabs 74 extending over the laterally extended end flaps 30, which latter assume such position when the side flap 28 is folded inwardly. The presser plate 1096 is arranged to apply considerable pressure against the end of the forming block to seal the bottom closure in the condition shown in FIG. 18. As herein shown, the end press member 1096 is resiliently and floatingly mounted so as to be capable of self-alignment parallel to the end of the forming block and is arranged to be moved into pressing engagement with the end of the forming block by a cam operated toggle mechanism.

Figure 29:
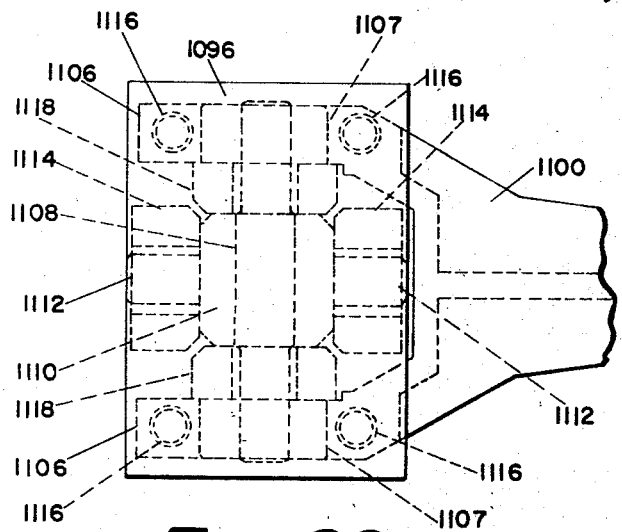
FIG. 29 is a front elevation of the end press mechanism.

As shown in FIGS. 22 and 29, the press plate 1096 is supported and guided for movement toward and from the end of the forming block by a supporting arm 1100 mounted to rock on a stud 1102 secured in a supporting bracket 1104. The arm 1100 is provided at its free end with two spaced extensions 1106 which are provided with bearings 1107 to rockingly support the reduced diameter ends of an elongated stud 1108. The stud 1108 passes through and supports an enlarged portion 1110 of a transverse stud, the reduced diameter ends 1112 of which are supported in spaced depending bearing portions 1114 of the presser plate 1096. Coiled springs 1116 are supported at each corner of the presser plate interposed between the presser plate and the spaced extensions 1106 of the rocker arm 1100. The spaced upper ends 1118 of one toggle link 1120 are also connected to the elongated stud 1108 between the enlarged portion 1110 of the transverse stud and the adjacent bearings 1107 of the spaced extensions 1106. Each bearing, as well as the connected end of the toggle, may be split and provided with caps for assembly purposes. It will be seen that as thus assembled, when the presser plate 1096 is moved to engage the end of the forming block, the plate may rock in two directions at right angles to each other to permit it to align itself parallel to the end of the block 68. It will be observed that the coil springs 1116 are effective merely to maintain the presser plate in a position substantially parallel to the supporting extensions 1106 and also permit rocking of the presser plate into parallel alignment with the end of the block when it engages the end thereof. In other words, the coil springs do not apply resilient pressure against the end of the block, but merely permit the plate to align itself with the block.

The toggle mechanism includes the toggle link 1120 which is connected by a pin 1122 to a second toggle link 1124 mounted to rock on an eccentric stud 1126. The eccentric stud at its reduced diameter ends is journaled in the spaced arms of a bracket 1128 extending between and secured to spaced tie bars 1130 attached to the machine frame. The toggle link 1124 forms one arm of a bell crank, the second arm 1132 of which is connected by a rod 1134 to an arm 1136 fast on the rocker shaft 1064. The rocker shaft 1064 is supported in a bearing bracket 1140 attached to the machine platen and is provided with a cam lever 1142 also fast thereon. The lever 1142 carries a roll 1144 for cooperation with a cam 1146 fast on the cam shaft 1058.

The toggle bell crank 1124, 1132 is loosely mounted on the eccentric stud 1126 and is adjustably held in a position to cause maximum pressure to be applied during the pressing operation by an elongated arm 1148 clamped thereto and connected by a spring 1150 to urge the eccentric in a direction to cause the toggle mechanism to apply maximum pressure as adjustably limited by a stop screw 1152 engageable with the arm 1148. In operation, when the toggle mechanism approaches its maximum extension to a position just before the toggle links come into alignment, the pressure against the end of the block may cause the eccentric to rock in an opposite direction to stretch the spring 1150 a short distance and to thus relieve the forming block of any excessive pressure which might damage the parts.

Figure 30:
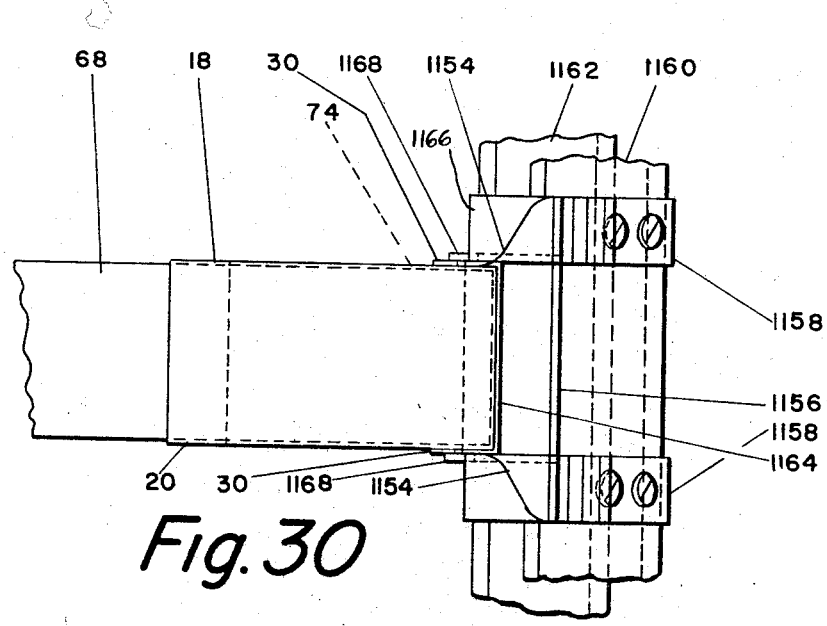
FIG. 30 is a cross sectional detail view showing the end closure tabs being folded against the end wall panels of the carton.

After the end pressing operation the presser plate 1096 is retracted, and the forming block is intermittently moved 45° to the next station of operation which comprises the side press mechanism 79. During such intermittent movement the laterally extended side flaps 30 and their overlying lining end tabs 74 are engaged by spaced stationary curved rails 1154 shaped to effect folding of the laterally extended portions of the bottom closure against the outer faces of the adjacent end wall panels 18, 20 of the lined carton as shown in FIG. 30. The curved rails are supported by a bar 1156 carried by an angle bracket 1158 secured to one of a pair of spaced tie pieces 1160, 1162 attached to the machine frame. A curved guide plate 1164 arranged between the rails 1154 extends to a position above the end of the forming block at the side press station and is supported by angle brackets 1166 secured to the tie piece 1162. The upper end of the plate 1164 is provided with short depending guide portions 1168 to hold the corners of the flaps 30 square during the end press operation.

Figure 31:
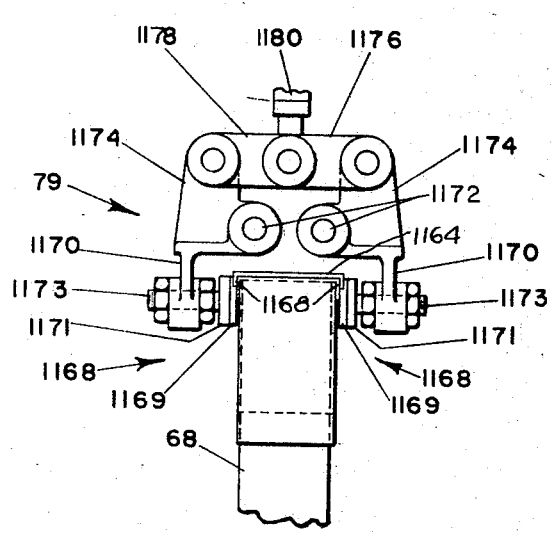
FIG. 31 is a plan view of the side press mechanism.

As illustrated in FIGS. 30, 22 and 31, the side press mechanism 79 includes opposed presser elements 1168 arranged to apply considerable pressure against the folded end flaps 30 to seal the same together with the underlying lining tabs 74 against the side of the end wall panels 18, 20. The presser elements 1168 are carried by opposed arms 1170 pivotally mounted on pins 1172 extended between and supported in the spaced tie pieces 1160, 1162. Extensions 1174 from the arms 1170 are connected by toggle links 1176, 1178 which are connected at their joined ends by a link 1180 to one arm 1182 of a two-armed operating lever. The operating lever is secured to a stud 1184 journaled in spaced bearing brackets 1186 attached to and extended from the tie piece 1162. The second arm 1188 of the operating lever is connected by a yieldable link 1190 to an arm 1192 fast on a shaft 1194 journaled in a bracket 1196. An arm 1198 also fast on the shaft 1194 is provided with a cam roll 1200 for cooperation with a cam 1202 fast on the cam shaft 1058.

In operation, when the forming block comes to rest, the side flaps 30 and their lining tabs are engaged by the opposed presser elements 1168, and considerable pressure is applied through the toggle mechanism described to seal the flaps against the end wall panels 18, 20 and thus complete the bottom closure. It will be observed that both lines of the duplex mechanism operate simultaneously to produce two cartons each cycle, a single cam 1202 serving to operate the mechanism in both lines. As shown in FIG. 31, each presser element 1168 may include a synthetic rubber pad 1169 replaceably mounted on a plate 1171 carried by a threaded stud 1173 adjustably secured to its respective arm 1170.

Figure 32:
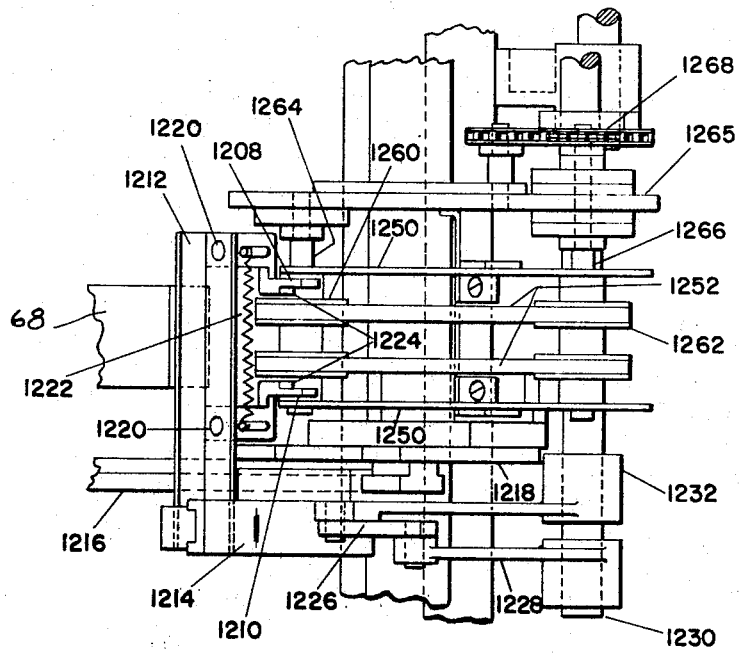
FIG. 32 is a plan view of the carton stripping mechanism.

Upon retraction of the side press elements 1168 the forming block is moved 45° to the stripper station 80 where the cartons are removed from the forming block and deposited on the parallel conveyers 82, 83 herein shown as arranged at right angles to the direction of discharge of the cartons from the duplex lines. During its travel from the side press station 79 to the stripper station 80, the side seam presser 904, which has been in engagement with the side seam throughout the bottom closure operations, is moved away from pressing engagement with the forming block to permit stripping of the carton from its block. This movement of the side seam presser 904 is effected by the linkage previously described which cooperates with the stationary cam 970. As herein shown, see FIGS. 22 and 32, the forming block is arranged at an angle of 45° at the stripping station, and the carton is stripped from the block by stripper elements 1208, 1210 carried by a transverse angle bar extension 1212 adjustably secured to a slide bracket 1214. The slide bracket is mounted for reciprocation on an elongated slide support 1216 which is secured to a bracket 1218 attached to the machine frame. The slide support 1216 is disposed adjacent one side of the forming block when the latter comes to rest, and the transverse angle bar extension 1212 extends across a face of the block when it is moved down into stripping engagement with the block. The stripping elements 1208, 1210 extend from the bar to engage the ends of the top closure flaps 24 on opposite sides of the block. The stripper elements are pivotally mounted on studs 1220 carried by the extension 1212 and are urged toward each other by a spring 1222 extending between the elements. The stripping face of each element 1208, 1210 is provided with a shoulder 1224 arranged to engage the ends of the top closure flaps and to strip the carton off the block when the slide bracket 1214 is moved longitudinally outwardly.

As illustrated in FIG. 22, the slide bracket 1214 is connected by a link 1226 to an arm 1228 fast on a rocker shaft 1230 journaled in brackets 1232 attached to the machine frame. A second arm 1234 fast on the rocker shaft is connected by a link 1236 to one arm 1238 of a two-armed lever mounted on the shaft 1194. The second arm 1240 of the two-armed lever carries a cam roll for coperation with a cam 1242 fast on the cam shaft 1058. In operation, when the forming block comes to rest at the stripper station, the reciprocable stripping elements are moved from an elevated position beyond the end of the forming block, as shown in FIGS. 22, to a lowered position to engage the shouldered portions 1224 with the ends of the extended top closing flaps whereupon the stripping unit is again elevated to remove the carton from the block.

Provision is also made for releasing cool compressed air into the carton during the stripping operation for the purpose of dissipating the heat absorbed by the carton and the lining from the heated block during the carton forming operation. As herein shown, see FIGS. 2b and 13, the forming block 68 is provided with openings 1215 along the marginal edge of the block adjacent the side seam seal of the carton, which openings communicate with an elongated passageway 1217 formed in the block. The passageway 1217 communicates with aligned passageways formed in the connecting bracket 898 and in the octagonal supporting member 896, respectively, terminating in a lateral opening 1219 in the supporting member 896. When the forming block comes to rest at the stripping station, the lateral opening 1219 is aligned with a hollow stud 1221 extending laterally from the stationary cam 970. The hollow stud communicates with a passageway 1223 in the cam 970 which is connected by a pipe 1225 to a valve 1227. The valve 1227 is also connected to the main air supply line 255 as shown in FIG. 33. The valve is provided with a stem 1229 connected by a link to one arm 1231 of a cam lever pivotally mounted at 1233. The second arm 1235 is provided with a cam roll 1237 for cooperation with a cam 1239 fast on the cam shaft 1058. In operation the air is ported to the forming block to release air into the space between the carton and the block when the forming block comes to rest at the stripping station, and the release of air is subsequently discontinued when the stripping elements engage and strip the carton from the block. The compressed air serves to cool and set the adhesive and to firm up the lining material during stripping of the carton from the block, and the pressure of the air also serves to assist in removing the carton from the block.

The stripped carton removed from the block is received between side guides 1250 and onto spaced downwardly inclined delivery belts 1252, the removed carton being free to rock to present its closed end downwardly when it engages the upper end of the inclined belt. Cartons are stripped simultaneously from a forming block in each package making line, the carton in one line 48 being delivered between vertical guides 1254 directly onto the continuously moving conveyer 83 comprising the inner conveyer, and the carton in the other line 46 being delivered between vertical guides 1256 onto a turntable 1258 arranged to transfer its carton onto the second conveyer 82 comprising the outer conveyer. Each inclined delivery belt 1252 is arranged to run over pulleys 1260, 1262 mounted on shafts 1264, 1266, respectively, journaled in spaced brackets 1265 attached to the machine frame. The lower shaft 1266 is provided with a sprocket 1268 driven by a chain 1270 which runs over sprockets 1272, 1274 and 1276, the latter being fast on a drive shaft 1278. The drive shaft 1278 is connected by a chain and sprocket drive 1280 to the cam shaft 1058. As illustrated, a portion of the turntable 1258 overlies and is frictionally engaged with the adjacent end of the outer conveyer 82 to effect rotation of the turntable.

In the event that a carton fails to be stripped from its forming block 68 at the stripping station 80 because of some malfunction of the stripping mechanism, provision is made for detecting the presence of a carton on the forming block during movement of the same to the next station of operation and for stopping the machine in the event that a carton is detected during such movement of the forming block. As herein shown, a microswitch S11 provided with a feeler arm 1282 is supported in a position to engage the outer end of the forming block as it is moved therepast. In the event that a carton remains on the block at this time, the thickness of the carton material will cause the arm 1282 to be rocked to close the switch S11 and effect stopping of the machine. The switch S11 is supported to detect an unstripped carton in the left hand line 46, and a corresponding switch S23 is provided in the right hand line 48. When a carton is thus detected and the machine stopped, the carton must be manually removed to assure that the forming block is free of a carton when it arrives at the station where it engages a new carton blank to be folded and formed as described.

The cartons thus delivered in two lines may lead to two separate filling machines, or to a duplex weighing machine, not shown. In practice, the cartons are delivered to the filling machines at a rate such as to assure a continuous supply thereto, and in order to assure such continuous supply, the cartons are produced in the present duplex machine and delivered to the conveyers at a rate substantially equal to the demand therefor by the filling machines. The cartons are delivered to the conveyers in spaced relation, and when they reach the intake of the filling machines they are brought into contiguous relation to form a line or rservoir from which successive foremost cartons or pairs of cartons are withdrawn by the filling machines.

As hereinbefore stated, provision is made for discontinuing production of cartons in one or both lines when the reservoir of contiguous cartons reach a predetermined maximum so as to prevent a jam of cartons on the conveyers 82, 83. A surplus of cartons in the reservoir may be caused by the package making machine producing cartons at a slightly faster rate than the demand by the weighing machine, or by a slow down or stopping of the weighing operation. Production of cartons in one or both lines is discontinued by providing detecting means along the conveyers at a point corresponding to such predetermined maximum, and means responsive to said detecting means for discontinuing the feed of carton blanks into the machine while permitting operation of the machine to continue to complete production of the few cartons already started through the machine, which few cartons subsequently delivered to the conveyers 82 or 83 are not sufficient to cause a jam on the conveyers. Thereafter, when a sufficient number of cartons have been withdrawn from the reservoirs by the filling machines to reduce the supply in the reservoir to a predetermined minimum, the feed of carton blanks into the machine is automatically resumed. It will be understood that individual controls are provided for each line of the duplex machine so that cartons may continue to be produced in one line while the other line to which the feed of carton blanks is discontinued will continue in operation without producing cartons except such cartons as have already started through the machine.

As herein shown, the intake to the filling machines may comprise any usual or preferred type of container releasing mechanism diagrammatically indicated herein as a movable stop member 1284 adapted to be rocked into and out of the path of the line of cartons, and a pinch bar 1286 adapted to hold back the remaining cartons in the line when the foremost cartons are released in pairs into the filling machines in timed relation to the operation thereof. It will be understood that release of the cartons may occur singly or in multiples of two or more each cycle to accommodate the number of filling units in the weighing machines. A reservoir of contiguous cartons indicated at 1288, 1290 may extend from the intake to the detecting means, the latter being indicated generally at 1292 and 1294 and which may comprise photoelectric means including a photocell 1296 and a light source 1298 in each line. As shown in the wiring diagram, FIG. 36, the detector 1292 is associated with the conveyer 82 and forms part of a time delay relay indicated at PE1, and the detector 1294 is associated with the conveyer 83 and forms a part of a time delay relay indicated at PE2, each of which are arranged to close their respective contacts PE1 and PE2 and energize their respective solenoids SOL-1 and SOL-4 whereby to discontinue the feed of carton blanks to their respective package making lines 46, 48 when the reservoir of cartons on the conveyers reaches a predetermined maximum. The time delay relays PE1 and PE2 are adjusted so that the passage of one container past the photocell detecting means will not effect closing of their respective contacts. However, when the contiguous containers in the reservoirs reach a predetermined maximum so as to cut off the light source beyond a predetermined time, the contacts PE1, line 2, and PE2, line 39, will be closed to effect discontinuance of the carton blank transfer mechanisms 90. As previously described, when the solenoid SOL-1 is energized, the vacuum valve 93 is held open to the atmosphere so as to discontinue the vacuum to the suction cups 92 to thus prevent transfer of carton blanks to the package making line 46 and, similarly, when the solenoid SOL-4 is energized the vacuum to the transfer mechanism in the package making line 48 is discontinued. Provision is also made for selectively discontinuing the vacuum to the left hand package making line 46 by closing switch SS1, line 3, when it is desired to discontinue the feed of cartons, similar provision being made for selectively discontinuing the feed in the right hand line 48 by closing switch SS2, line 40.

Figure 36:
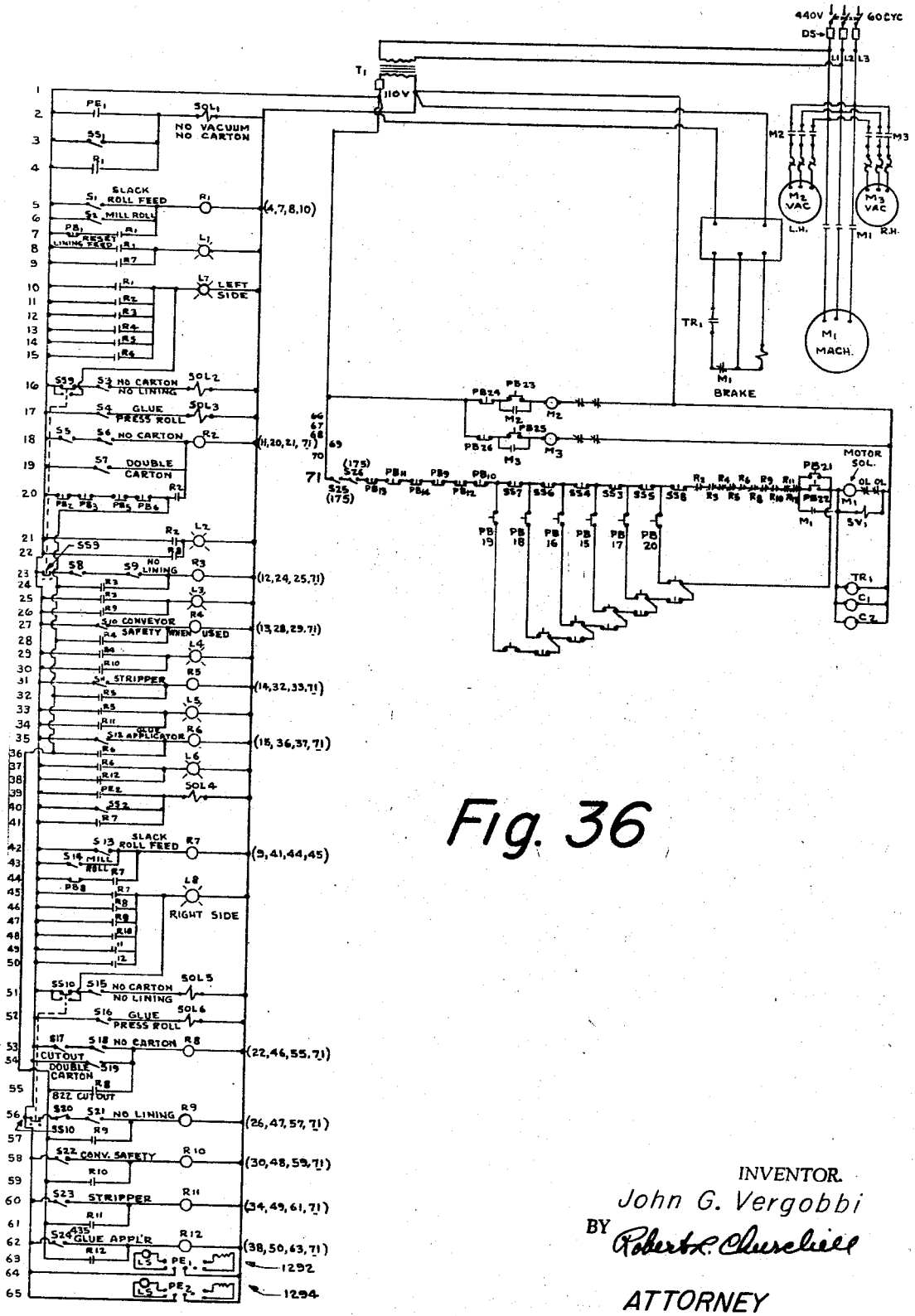

Referring further to the electrical controls indicated in the elementary wiring diagram FIG. 36, since the controls for one package making line are duplicated in the second package making line throughout the duplex machine, it is believed that a description of the controls in one line will suffice for both. Thus, when the carton blank detecting roll 282 detects the absence of a carton and closes switch S6, line 18, relay R2 is energized to open the normally closed switch R2, line 71. This will deenergize the motor solenoid M1, line 71, to discontinue operation of the machine. Simultaneously therewith, a signal switch R2, line 11, is closed to light a signal lamp L7, as shown; a switch R2, line 21, is closed to light a second signal lamp L2; and a switch R2, line 20, is also closed to hold relay R2 energized until one of the push buttons PB2, PB3, PB5 or PB6 is pressed to open the circuit to the relay R2.

The above described control for discontinuing operation of the machine when a carton blank is not transferred to the package making line is operative during normal operation of the machine. However, when the solenoid SOL-1 is energized in response to an excessive accumulation of cartons on the discharge conveyer 83, provision is made for rendering the control switch S6 and relay R2 inoperative to stop the machine so that the cartons already started through the machine may be completed. This is accomplished by opening the normally closed switch S5, line 18, simultaneously with energizing the solenoid SOL-1 through the mechanical connections described so as to prevent energizing of relay R2, as will be apparent.

When the double carton blank detecting roll 266 detects a double carton and closes switch S7, line 19, relay R2 is also energized to discontinue operation of the machine. However, since this is a malfunction of the machine, no provision is made for rendering this control inoperative. Thus, energization of relay R2 will open the normally closed contact R2, line 71, to discontinue operation of the machine.

The blank detecting roll 372 preceding the carton blank adhesive applying mechanism 56 is arranged to close switch S4, line 17, when a carton blank is absent at this point. This will energize solenoid SOL-3, line 17, to effect latching of the presser roll 354 in an inoperative position during the continued operation of the machine as described. Since the detecting roll 372 is cam operated each cycle, the switch S4 will be opened, and the presser roll will be unlatched in readiness for a carton blank advanced during a succeeding cycle.

The microswitch S12, line 35, is closed to energize relay R6 when a carton blank adheres to the adhesive applying roll 330 as described. Relay R6 will open the normally closed switch R6, line 71, to stop the machine. This relay will also close the circuits to the signal lights, lines 15 and 37, and will close a holding circuit, line 36.

The microswitch S2, line 6, arranged to detect depletion of the supply roll 62 will energize relay R1 when closed. This relay will close switch R1, line 4, to energize solenoid SOL-1 to discontinue the transfer of carton blanks. The relay will also close a holding circuit, line 7, and signal light circuits, lines 8 and 10. The machine will continue in operation to complete the cartons started through the machine, and when a new supply roll is mounted and spliced, the relay R1 and SOL-1 may be deenergized by pressing push button PB1, line 7, to open the circuits. Similarly, microswitch S1, line 5, for detecting a break in the slack feed portion of the web is arranged to energize relay R1 for the same purposes.

The solenoid SOL-2, line 16, is energized when switch S3 is closed upon detection of the absence of a carton blank at a point preceding the lining mechanism to prevent operation of the indexing mechanism to feed a length of lining material during a cycle in which such absence is detected. The detecting roll 663, being cam operated each cycle, will deenergize solenoid S2 at the end of a cycle in readiness for a succeeding cycle while the machine continues in operation to complete those cartons already started through the machine. A manually operated selective switch SS9 may be opened to permit feed of the lining web when a carton blank is absent for testing purposes.

The microswitch S9, line 23, for detecting the absence of a lining on a carton blank at the combining station is arranged to energize relay R3 which will open the normally closed switch R3, line 71, to discontinue operation of the machine. This relay is also provided with a holding circuit, line 24, and signal light circuits, lines 25 and 12. As hereinbefore described, provision is made for rendering the microswitch S9 inoperative to stop the machine when a carton blank is found to be absent at a point prior to arrival at the combining station. At such time the lining indexing mechanism is rendered inoperative to advance the lining and, simultaneously therewith, a microswitch S8, line 23, is opened to prevent energization of relay R3. This permits the machine to continue in operation to complete such cartons being advanced through the stations subsequent to the combining station.

The microswitch S11, line 31, for detecting the presence of a carton on the forming block after passing the stripper station is arranged to energize a relay R5 which will open the normally closed switch R5, line 71, to discontinue operation of the machine. The relay R5 will also close contacts R5, line 32, to hold the relay energized, and will also close signal light contacts R5, line 14, and R5, line 33.

Handwheel safety switch S25, line 71, is arranged to open the motor circuit to discontinue operation of the machine when the handwheel is released to be operatively engaged with the driving mechanism as described. As herein shown, line 71, is also provided with push buttons PB9 to PB14 located at convenient positions on the machine. Solenoid valve SV1, line 71, is provided to cut off the compressed air in the main supply line when the machine is stopped. Push buttons PB23, line 66, and PB25, line 68, are provided for energizing relays M2 and M3, respectively for starting the vacuum pump motors M2 and M3, and push buttons PB24 and PB26 are provided for discontinuing the operation thereof. A plurality of conventional selective safety switches SS3, 4, 5, 6 and 7 are also provided in line 71 which are conveniently disposed at various positions on the machine. These switches have three positions, namely, RUN, SAFE and JOG to permit the operator to safely control the machine at such various positions.

From the above description it will be seen that the present duplex package maker is designed to produce two lined cartons simultaneously in two lines for delivery to separate conveyers leading to succeeding machines in the packaging line, such as filling or weighing machines, and that each line is provided with separate controls responsive to the demand for cartons by such succeeding machines, as indicated by the rate of withdrawal from the supply of cartons on the conveyers, for discontinuing the feed of carton making materials into its respective line while permitting the machine to continue in operation to complete those cartons already started through the machine, the feed of carton making materials being again initiated when the supply on the conveyers is partially depleted by continued withdrawal therefrom. The principal advantage of such control, aside from the fact that the supply of cartons is automatically controlled in response to the demand therefor, is that such portions of the carton blank and lining sheet as have been provided with a coating of adhesive will not come to rest in a semicompleted condition wherein the adhesive, such as a liquid adhesive, might set up during a shut down of the machine and thus be rendered ineffective to seal the carton and lining portions when the machine is subsequently started. As a result, waste of carton and lining materials is prevented. It will also be apparent that it is of advantage to maintain the adhesive applying mechanisms in continuous operation so as to keep the adhesive in a fluid condition on the adhesive transfer and applying rolls. It will be further observed that the individual controls in each package making line renders the machine capable of producing lined cartons in one line only when desired.

It will be observed that the present structure of mechanism for effecting initial folding of the prescored lined blank about three sides of the forming block by movement of the intermittently operated block into engagement with the blank and during continued movement thereof affords a more rapid folding operation than prior structures wherein the carton blank is brought into engagement with and wrapped about a stationary block.

In practice each line of the duplex machine may produce cartons of the same size or of different sizes by changing the size of the forming blocks and associated carton and lining handling devices to accommodate the different sizes. The compact and unitary design of the present duplex package making machine wherein the forming blocks are rotated in a vertical plane provides a machine which requires less floor space than the conventional single package maker having forming blocks rotated in a horizontal plane, the deplex machine producing twice as many cartons a minute as the single package maker. The present machine also produces an efficient, tightly sealed carton using a minimum area of lining paper and carton board. It will also be seen that different lining and carton making materials may be used for producing different cartons in each line of the duplex machine.

While the preferred embodiment of the invention has been herein illustrated and described, it will be understood that the invention may be embodied in other forms within the scope of the following claims.

Having thus described the invention, what is claimed is:

1. In a package making machine of the character described, in combination, means for producing lined cartons including means for transferring successive carton blanks from a stack thereof into the machine, a discharge conveyer, means for discharging successive lined cartons onto said conveyer in spaced relation, means associated with said conveyer adapted to accumulate a supply of lined cartons in contiguous engagement and to release successive foremost cartons in said supply, control means including means for detecting a surplus of lined cartons in said supply, and means responsive to said detecting means for discontinuing transfer of carton blanks into the machine while permitting the machine to continue in operation to complete those cartons started through the machine.

2. In a package making machine of the character described, in combination, means for producing lined cartons including means for transferring successive carton blanks from a stack thereof into the machine, a discharge conveyer, means for discharging successive lined cartons onto said conveyer in spaced relation, means associated with said conveyer adapted to accumulate a supply of lined cartons in contiguous engagement and to release successive foremost cartons in said supply, control means including means for detecting a surplus of lined cartons in said supply, and means responsive to said detecting means for discontinuing transfer of carton blanks into the machine while permitting the machine to continue in operation to complete those cartons started through the machine, said control means arranged to initiate transfer of carton blanks when said surplus of lined cartons is depleted.

3. In a package making machine of the character described, in combination, means for producing lined cartons including suction means for transferring successive carton blanks from a stack thereof into the machine, a discharge conveyer, means for discharging successive lined cartons onto said conveyer in spaced relation, means associated with said conveyer for accumulating a reservoir of lined cartons in contiguous engagement and for releasing successive foremost cartons in said reservoir, control means including means for detecting a surplus of lined cartons in said reservoir, and means responsive to said detecting means for discontinuing the suction to said suction transfer means while permitting the machine to continue in operation without transferring carton blanks and to permit completion of those cartons previously started through the machine.

4. In a package making machine of the character described, in combination, means for producing lined cartons including suction means for transferring successive carton blanks from a stack thereof into the machine, said suction means including a cam operated vacuum valve arranged to control the suction to the transfer means, a discharge conveyer, means for discharging successive lined cartons onto said conveyers in spaced relation, means associated with said conveyer for accumulating a reservoir of lined cartons in contiguous engagement and for releasing successive foremost cartons in said reservoir, control means including means for detecting a surplus of lined cartons in said reservoir, and means responsive to said detecting means for latching said valve in an inoperative position while permitting the machine to continue in operation without transferring carton blanks and to permit completion of those cartons previously started through the machine.

5. A packaging machine as defined in claim 4 wherein the control means comprises a circuit having a photocell detector arranged to be actuated when a surplus of lined cartons is detected, and a solenoid in said circuit operatively connected to said latching means.

6. In a package making machine of the character described, in combination, means for producing lined cartons comprising a continuously moving intake conveyer, means for transferring successive carton blanks from a stack thereof onto said intake conveyor, means for detecting the presence of a carton blank transferred to said conveyer, means responsive to said detecting means for discontinuing operation of the machine when a carton blank is found to be absent, a discharge conveyer, means for discharging successive lined cartons onto said discharging conveyer in spaced relation, means associated with said discharge conveyer adapted to accumulate a supply of lined cartons in contiguous engagement and to release successive foremost cartons in said supply, means for detecting a surplus of lined cartons in said supply, means responsive thereto for discontinuing transfer of carton blanks onto said intake conveyer, and means operating simultaneously with discontinuance of transfer of carton blanks rendering said first-named detecting means inoperative to discontinue operation of the machine to permit the machine to continue in operation to complete production of those cartons previously transferred to said intake conveyer.

7. In a package making machine of the character described in combination, means for producing lined cartons including means for continuously advancing carton blanks in spaced relation, means for applying adhesive to selected portions of successive carton blanks including an applying roll and a pivotally mounted arm carrying a cooperating presser roll, means for detecting the presence of a carton blank at a point preceding the adhesive applying means, and means responsive to said detecting means for preventing cooperation of said presser roll with the applying roll when a carton blank is found to be absent at such point.

8. A package making machine as defined in claim 7 wherein the presser roll is cam operated in timed relation to the advance of said carton blanks, the means responsive to said detecting means comprising a solenoid operated latch for holding the presser roll out of engagement with the applying roll.

9. In a package making machine of the character described, in combination, means for producing lined cartons including means for continuously advancing carton blanks in spaced relation, means for applying adhesive to selected portions of successive carton blanks including an applying roll and a cooperating presser roll, means for stripping an adhesively secured carton blank from said applying roll, and means responsive to said stripping means for discontinuing operation of the machine.

10. In a package making machine of the character described, in combination, means for producing lined cartons including a conveyer for continuously advancing successive carton blanks in uniformly spaced relation, means for applying adhesive to selected portions of successive continuously moving carton blaks, means for advancing a length of lining material into the path of successive continuously moving carton blanks, means for severing the length to provide a lining sheet, means operated in timed relation to the movement of said carton blank for pressing the lining sheet into adhesive engagement with the continuously advancing carton blank, said means for advancing a length of lining material comprising an intermittently operated feed roll, and means for rotating said feed roll in timed relation to the advance of said carton blank.

11. In a package making machine of the character described, in combination, means for producing lined cartons including a continuously moving intake conveyer, means for transferring successive carton blanks from a stack thereof onto said conveyer, means for applying adhesive to selected portions of successive continuously moving carton blanks, means for applying and adhesively securing a lining sheet to successive carton blanks during the continuous movement thereof, means for forming the lined blanks into a carton having a side seam and a bottom closure, a discharge conveyer, means for discharging successive lined carton onto said conveyer in spaced relation, means associated with said conveyer adapted to accumulate a supply of lined cartons in contiguous engagement and to release successive foremost cartons in said supply, control means including means for detecting a surplus of lined cartons in said supply, and means responsive to said detecting means for discontinuing transfer of carton blanks onto said intake conveyer while permitting the machine to continue in operation to permit completion of those cartons previously started through the machine.

12. A packaging machine as defined in claim 11 wherein the adhesive applying means includes a supply of liquid adhesive and means for recirculating the same, continued operation of the machine maintaining the adhesive in circulation to prevent hardening thereof.

13. In a package making machine of the character described, in combination, means for producing lined cartons including means for continuously advancing carton blanks in uniformly spaced relation, means for applying adhesive to selected portions of successive carton blanks, means for intermittently advancing successive lengths of lining material into the path of and above successive carton blanks, means for severing the length to provide a lining sheet, a cam operated presser roll cooperating with a driven roll and operated in timed relation to the movement of the carton blank for pressing the lining against a portion of the adhesive on the carton blank to combine the blank and the sheet during the continuous movement thereof.

14. In a package making machine of the character described, in combination, means for producing lined cartons including means for continuously advancing carton blanks in uniformly spaced relation, means for applying adhesive to selected portions of successive carton blanks, means for intermittently advancing successive lengths of lining material into the path of and above successive carton blanks, means for severing the length to provide a lining sheet, a cam operated presser roll cooperating with a driven roll and operated in timed relation to the movement of the carton blank for pressing the lining against a portion of the adhesive on the carton blank to combine the blank and the sheet during the continuous movement thereof, means for detecting the presence of a lining sheet during the pressing operation, and means for discontinuing operation of the machine in the event that the lining sheet is absent.

15. In a package making machine of the character described, in combination, means for producing lined cartons including means for continuously advancing carton blanks in uniformly spaced relation, means for applying adhesive to selected portions of successive carton blanks, means for intermittently advancing successive lengths of a lining material into the path of and above successive carton blanks, means for severing the length to provide a lining sheet, a cam operated presser roll cooperating with a driven roll and operated in timed relation to the movement of the carton blank for pressing the lining against a portion of the adhesive on the carton blank to combine the blank and the sheet during the continuous movement thereof, means for detecting the presence of a lining sheet during the pressing operation, means for discontinuing operation of the machine in the event that the lining sheet is absent, means for detecting the presence of a carton blank at a point preceding the lining advancing means, means responsive thereto for preventing advance of the lining when a blank is found to be absent, and means also responsive thereto for rendering inoperative said lining detecting means when said blank is absent to prevent discontinuance of operation of the machine when no lining is advanced whereby to permit the machine to continue in operation to complete production of the preceding cartons.

16. In a package making machine of the character described, in combination, means for producing lined cartons including means for continuously advancing carton blanks in uniformly spaced relation, means for applying adhesive to selected portions of successive carton blanks, means for intermittently advancing successive lengths of lining material into the path of and above successive carton blanks, means for severing the length to provide a lining sheet, a cam operated presser roll cooperating with a driven roll and operated in timed relation to the movement of the carton blank for pressing the lining against a portion of the adhesive on the carton blank to combine the blank and the sheet during the continuous movement thereof, means for detecting the presence of a carton blank at a point preceding the lining advancing means, and means responsive thereto for preventing advance of the lining when a blank is found to be absent at such point.

17. In a package making machine of the character described, in combination, means for producing lined cartons comprising a continuously moving intake conveyer, means for transferring successive carton blanks from a stack thereof onto said conveyor in uniformly spaced relation, means for applying adhesive to selected portions of successive carton blanks, and means for advancing and severing successive lengths of a web of lining material for application to successive carton blanks including: means for supporting a supply roll of lining material; means for continuously withdrawing the web of lining material from said roll; intermittently operated adhesive applying means for applying adhesive to selected portions of the withdrawn web; means for taking up the slack in the web between said continuously operated withdrawing means and said intermittently operated web adhesive applying means; intermittently operated feeding mechanism for advancing successive lengths of the web into the path of successive carton blanks; means for severing said lengths; and means for pressing the severed lengths into adhesive engagement with successive continuously moving carton blanks.

18. A package making machine as defined in claim 17 which includes means for detecting depletion of said supply roll, and means responsive thereto for discontinuing transfer of carton blanks onto the conveyer while permitting the machine to continue in operation to complete production of the preceding cartons.

19. A package making machine as defined in claim 17 which includes means for detecting a sudden release of tension in the slack portion of the web, and means responsive thereto for discontinuing transfer of carton blanks onto said conveyer while permitting the machine to continue in operation to complete production of the preceding cartons.

20. A package making machine as defined in claim 17 which includes means responsive to variations in the length of the slack portion of the web for starting and stopping the web withdrawing means.

21. A package making machine as defined in claim 17 wherein the web withdrawing means includes a clutch, and said means for taking up the slack in the web includes an arm having a roller and movable with the web as the slack is increased or decreased, and connections between said arm and said clutch for disengaging said clutch when the slack is increased beyond a predetermined length and for again engaging the clutch when the slack is again reduced.

22. A package making machine as defined in claim 17 wherein the adhesive applied to said web comprises a hot melt adhesive, and a chill plate over which the web is trained to set the adhesive and stiffen the web material after the adhesive applying operation.

23. A package making machine as defined in claim 17 wherein the intermittently operated feeding mechanism includes a feed roll and means rotating said roll to feed a sheet length each cycle of operation.

24. A package making machine as defined in claim 23 wherein the web adhesive applying means includes an applying roll, and driving connections between the applying roll and said feed roll synchronizing the rotation thereof.

25. In a package making machine of the character described, in combination, means for producing lined cartons comprising means for continuously advancing carton blanks in uniformly spaced relation, means for advancing and severing successive lengths of a web of lining material for application to successive carton blanks including: means for supporting a roll of lining material; means for continuously withdrawing the web of lining material from said roll including a metering roll; intermittently operated adhesive applying means for applying adhesive to selected portions of the withdrawn web including an adhesive applying roll; means for taking up the slack in the web between said metering roll and said adhesive applying roll; an intermittently operated feed roll for advancing successive length of the web into the path of successive carton blanks; means for severing said lengths; and means for pressing the severed lengths into adhesive engagement with successive continuously moving carton blanks.

26. A package making machine as defined in claim 25 which includes means for guiding the free end of the web into the path of the carton blank, and means for directing a stream of air under said free end to maintain the same in a fully extended position during said advancing operation.

27. In a package making machine of the character described, in combination, means for producing lined cartons comprising means for continuously advancing carton blanks in uniformly spaced relation, means for advancing and severing successive lengths of a web of lining material for application to successive carton blanks including: means for supporting a roll of lining material; means for continuously withdrawing the web of lining material from said roll including a metering roll; intermittently operated adhesive applying means for applying adhesive to selected portions of the withdrawn web including an adhesive applying roll; means for taking up the slack in the web between said metering roll and said adhesive applying roll; an intermittently operated feed roll for advancing successive lengths of the web into the path of successive carton blanks; means for severing said lengths; and means for pressing the severed lengths into adhesive engagement with successive continuously moving carton blanks, means for driving said intermittently operated feed roll comprising a drive pawl and a notched disk, means for detecting the presence of a carton blank at a point preceding the web advancing means, and means responsive thereto for preventing engagement of the drive pawl with a notch in the disk to prevent advance of the web when a carton blank is found to be absent at such point.

28. A package making machine as defined in claim 27 wherein the means for preventing engagement of the drive pawl with a notch comprises a cam operated arm movable into and out of alignment with said notch, and a solenoid operated latch responsive to said detecting means for holding said arm in alignment with said notch to prevent engagement of said pawl when a carton blank is found to be absent.

29. A package making machine as defined in claim 28 which includes means also responsive to said carton blank detecting means for preventing operation of said severing means when a carton blank is found to be absent.

30. A package making machine as defined in claim 27 which includes means for detecting the presence of a severed lining sheet applied to said carton blank, means responsive thereto for discontinuing operation of the machine in the event a lining sheet fails to be applied to a carton blank.

31. A package making machine as defined in claim 27 which includes means for detecting the presence of a severed lining sheet applied to said carton blank, means responsive thereto for discontinuing operation of the machine in the event a lining sheet fails to be applied to a carton blank, and means also responsive to said carton blank detecting means for rendering inoperative said lining detecting means when a carton blank is absent.

32. In a package making machine, in combination, means for continuously advancing prescored carton blanks in a line and in spaced relation, means for applying and securing a lining sheet to successive carton blanks, an intermittently rotated spider having a plurality of radially extended forming blocks and rotated in a vertical plane, means for transferring successive lined blanks into the path of successive forming blocks, and means for folding the lined blanks about the forming blocks to produce lined cartons having a side seam and a bottom closure, the initial folding operation being performed by engagement of the moving block with the lined blank to fold the blank about three sides of the block during intermittent movement of the block from one station to a second station.

33. In a package making machine, in combination, a continuously moving conveyer, means for transferring successive prescored carton blanks from a stack thereof onto said conveyer, means for applying and securing a lining sheet to successive carton blanks, an intermittently rotated spider having a plurality of radially extended forming blocks and rotated in a vertical plane, means for transferring successive lined blanks from said conveyer into the path of successive forming blocks, means for folding the lined blanks about the forming blocks to produce lined cartons having a side seam and a bottom closure, and means for removing the lined cartons from successive forming blocks, the initial folding operation being performed by engagement of the moving block with the lined blank to fold the blank about three sides of the block during intermittent movement of the block from one station to a second station.

34. In a package making machine, in combination, a continuously moving conveyer, means for transferring successive prescored carton blanks from a stack thereof onto said conveyer, means for applying and securing a lining sheet to successive carton blanks, an intermittently rotated spider having a plurality of radially extended forming blocks and rotated in a vertical plane, means for transferring successive lined blanks into the path of successive forming blocks, means for folding the lined blanks about the forming blocks to produce lined cartons having a side seam and a bottom closure, means for removing the lined cartons from successive forming blocks, a discharge conveyer, means for depositing the removed cartons onto the discharge conveyer in spaced relation, said discharge conveyer having means adapted to form a reservoir of contiguous cartons and to release successive foremost cartons into a succeeding machine, and control means associated with said discharge conveyer including means for detecting a surplus of lined cartons in said reservoir, and means responsive to said detecting means for discontinuing the transfer of carton blanks onto said intake conveyer while permitting the machine to continue in operation to complete those cartons already started through the machine.

35. In a package making machine, in combination, a continuously moving conveyer, means for transferring successive prescored carton blanks from a stack thereof onto said conveyer, means for applying and securing a lining sheet to successive carton blanks, an intermittently rotated spider having a plurality of radially extended forming blocks and rotated in a vertical plane, means for transferring successive lined blanks into the path of successive forming blocks, means for folding the lined blanks about the forming blocks to produce lined cartons having a side seam and a bottom closure, means for removing the lined cartons from successive forming blocks, a discharge conveyer, means for depositing the removed cartons onto the discharge conveyer in spaced relation, said discharge conveyer having means adapted to form a reservoir of contiguous cartons and to release successive foremost cartons into a succeeding machine, control means associated with said discharge conveyer including means for detecting a surplus of lined cartons in said reservoir, means responsive to said detecting means for discontinuing the transfer of carton blanks onto said intake conveyer while permitting the machine to continue in operation to complete those cartons already started through the machine, means for detecting the presence of a carton blank transferred to said conveyer, means responsive to said last-named detecting means for discontinuing operation of the machine when a carton blank is found to be absent, and means rendering said last-named detecting means inoperative to discontinue operation of the machine when the transfer of carton blanks is discontinued because of a surplus of lined cartons in said reservoir.

36. In a package making machine, in combination, means for continuously advancing prescored carton blanks in spaced relation, means for applying adhesive to selected portions of successive carton blanks, means for applying a lining sheet to successive carton blanks, an intermittently rotated spider having a plurality of radially extended forming blocks and rotated in a vertical plane, means for transferring successive lined blanks into the path of successive forming blocks, spaced stationary carton blank supporting elements between which said forming blocks are moved and across which the carton blanks are straddled, the initial folding operation being performed by engagement of the moving block with the lined blank in cooperation with said stationary supports to effect folding of the blank about three sides of the block during the intermittent movement of the block from one station to a second station of operation, means for thereafter folding the remaining portions of the lined blanks about the forming blocks to produce lined cartons having a side seam and a bottom closure, and means for removing the lined cartons from successive forming blocks.

37. In a package making machine, in combination, means for continuously advancing prescored carton blanks in a line and in spaced relation, means for applying adhesive to selected portions of successive continuously advanced carton blanks, means for intermittently advancing a web of lining material and severing the web to provide a lining sheet for application to successive carton blanks, an intermittently rotated spider having a plurality of radially extended forming blocks and rotated in a vertical plane, means for transferring successive lined blanks into the path of successive forming blocks, means for folding the lined blanks about the forming blocks to produce lined cartons having a side seam and a bottom closure, means for removing the lined cartons from successive forming blocks, means for detecting the presence of a lined carton which has failed to be removed from a forming block, and means responsive to said detecting means for discontinuing operation of the machine in the event the lined carton failed to be removed.

38. In a package making machine, in combination, a conveyer for continuously advancing prescored carton blanks in uniformly spaced relation, each blank having a side seam flap and two opposed bottom closing side flaps, an intermittently rotated spider having a plurality of radially extended forming blocks and rotated in a vertical plane, means for transferring successive carton blanks from said conveyer into the path of successive forming blocks, and spaced stationary carton blank supporting and folding elements between which said forming blocks are moved and across which the transferred carton blanks are supported, movement of a forming block into engagement with a carton blank and between said spaced supporting and folding elements effecting folding of the blank about three sides of the block, and means for folding the remaining portions of the blank about the block to produce a carton having a side seam and a bottom closure.

39. In a package making machine, in combination, a conveyer for continuously advancing prescored carton blanks in uniformly spaced relation, each blank having a side seam flap and two opposed bottom closing side flaps, an intermittently rotated spider having a plurality of radially extended forming blocks and rotated in a vertical plane, means for transferring successive carton blanks from said conveyer into the path of successive forming blocks, spaced stationary carton blank supporting and folding elements between which said forming blocks are moved and across which the transferred carton blanks are supported, movement of a forming block into engagement with a carton blank and between said spaced supporting and folding elements effecting folding of the blank about three sides of the block, means for folding the remaining portions of the blank about the block to produce a carton having a side seam and a bottom closure, said last-named means including means for folding the blank about the remaining side of the block and into sealing engagement with said side seam flap, means for thereafter folding the opposed bottom closing side flaps in sealing engagement, one of said side flaps being provided with laterally extended integral end flaps, and means for folding said end flaps upwardly into sealing engagement with the adjacent end walls of the carton.

40. In a package making machine of the character described, in combination, a conveyer for continuously advancing prescored carton blanks in uniformly spaced relation, each blank having a side seam flap and two opposed bottom closing side flaps, means for applying adhesive to selected portions of said carton blanks, means for applying a lining sheet to successive carton blanks, an intermittently rotated spider having a plurality of radially extending forming blocks and rotated in a vertical plane, means for transferring successive lined blanks from said conveyer into the path of successive forming blocks, spaced stationary blank supporting and folding elements between which said forming blocks are moved and across which the transferred blanks are supported, movement of a forming block into engagement with a lined carton blank and between said spaced supporting and folding elements effecting folding of the carton blank and its attached lining about three sides of the block during movement of the block from one station to a second station of operation, and means for folding the remaining portions of the blank and lining about the block to produce a lined carton having a side seam and a bottom closure.

41. In a package making machine of the character described, in combination, a conveyer for continuously advancing prescored carton blanks in uniformly spaced relation, each blank having a side seam flap and two opposed bottom closing side flaps, means for applying adhesive to selected portions of said carton blanks, means for applying a lining sheet to successive carton blanks, an intermittently rotated spider having a plurality of radially extended forming blocks and rotated in a vertical plane, means for transferring successive lined blanks from said conveyer into the path of successive forming blocks, spaced stationary blank supporting and folding elements between which said forming blocks are moved and across which the transferred blanks are supported, movement of a forming block into engagement with a lined carton blank and between said spaced supporting and folding elements effecting folding of the carton blank and its attached lining about three sides of the block during movement of the block from one station to a second station of operation, and means for folding the remaining portions of the blank and lining about the block to produce a lined carton having a side seam and a bottom closure, said last-named means including means at said second station for folding the blank about the remaining side of the block to present the marginal edges of the lining in overlapping relation and to present the remaining portion of the carton in overlapping relation to said side seam flap, means movable with each block for pressing said side seam, means at a succeeding station for folding the opposed bottom closing side flaps together with adjacent lining portions in sealing engagement, means operating simultaneously therewith for folding outwardly portions of the lining to provide triangular tabs, means at a subsequent station for pressing said bottom closure, one of said bottom closing side flaps being provided with laterally extended integral end flaps, means for folding said end flaps upwardly together with said triangular tabs against the end walls of the carton during movement of the block from said bottom closing press station to a succeeding station, and means at said last-named station for pressing said end flaps into sealing engagement with the carton.

42. A package making machine as defined in claim 41 wherein said lining sheet is provided with a hot melt adhesive along its overlapping portions, and wherein said forming blocks are heated.

43. A package making machine as defined in claim 42 which includes means for stripping the lined carton from its forming block, and means for releasing air from the forming block during the stripping operation to effect cooling of the carton.

44. A package making machine as defined in claim 41 wherein provision is made for releasing air from a marginal edge of the forming block at said side seam station to maintain the adjacent lining portion in an extended position prior to the side seam folding operation.

45. A package making machine as defined in claim 41 which includes means for operating said side seam presser comprising a stationary cam having a high point and a low point, and a cam piece movable between said high point and said low point operative to effect engagement of the side seam presser with the side seam when the forming block is stationary.

46. In a duplex package making machine having two package making lines for producing lined cartons in each line simultaneously, driving means common to each line, each line having means for transferring successive carton blanks from a stack thereof into the machine, means for applying and securing a lining sheet to successive carton blanks, means for folding the blanks to produce lined cartons having a side seam and a bottom closure, a discharge conveyer for each line, means for discharging successive lined cartons onto their respective discharge conveyers in spaced relation, means associated with each conveyer adapted to accumulate a supply of lined cartons in contiguous engagement and to release successive foremost cartons in said supply, control means including means on each conveyer for detecting a surplus of lined cartons in the supply, and means responsive to their respective detecting means for automatically discontinuing transfer of carton blanks into their respective package making lines while permitting the machine to continue in operation and to permit completion of those cartons previously started through the machine.

47. A duplex package making machine as defined in claim 46 wherein the control means in one line is independent of the control means in the other line whereby one line having a normal supply of lined cartons on its discharge conveyer may continue in full production and the other line having a surplus of lined cartons on its discharge conveyer may temporarily suspend production until its supply is reduced to a normal supply.

48. A duplex package making machine as defined in claim 46 wherein provision is made in each line for independently detecting the failure of said transfer means, means responsive to such failure in one or the other line for discontinuing operation of the machine, and means operating simultaneously with automatic discontinuance of said transfer operation for rendering said last-named detecting means inoperative to discontinue operation of the machine.

49. A duplex package making machine as defined in claim 46 wherein provision is made for independently detecting the transfer of a multiple thickness carton blank, and means responsive to transfer of a multiple thickness blank detected in one line or the other for discontinuing operation of the machine.

50. In a duplex package making machine having two package making lines for simultaneously producing lined cartons, each line having a conveyer for continuously advancing carton blanks in uniformly spaced relation, means for applying adhesive to selected portions of said carton blanks during the continuous movement thereof, means for advancing a length of lining material into the path of a continuously moving carton blank, means for severing the length to provide a lining sheet, means operated in timed relation to the movement of the carton blank for pressing the lining sheet into adhesive engagement with the continuously moving carton blank, independently operated means in each line for detecting the presence of a carton blank at a point preceding said lining advancing means, and means responsive to its respective detecting means for preventing advance of a length of lining material and operation of the severing means when a carton blank is found to be absent at such point.

51. A duplex package making machine as defined in claim 50 which includes means for detecting the presence of a lining sheet during the pressing operation, and means responsive thereto for discontinuing operation of the machine in the event that the lining sheet is absent.

52. A duplex package making machine as defined in claim 51 which includes means operating simultaneously with preventing advance of said lining material for rendering inoperative the means for discontinuing operation of the machine because of the absence of the lining material when a carton blank is found to be absent in its respective line.

53. A duplex package making machine as defined in claim 52 wherein the absence of a lining detected during the pressing operation in one line will discontinue operation of the machine irrespective of discontinuance of lining advance and inoperativeness of the lining detecting means in the other line.

54. In a duplex package making machine, in combination, two package making lines for producing lined cartons simultaneously in each line, driving means common to each line, each line having means for continuously advancing prescored carton blanks in a line and in spaced relation, means for applying and securing a lining sheet to successive blanks, an intermittently rotated spider having a plurality of radially extended forming blocks and rotated in a vertical plane, means for transferring successive lined blanks into the path of successive forming blocks, and means for folding the lined blanks about the forming blocks to produce lined cartons having a side seam and a bottom closure, the initial folding operation being performed by engagement of the moving block with the lined blank to fold the same about three sides of the block during movement of the block from one station to a second station.

55. In a duplex package making machine, in combination, two package making lines for producing lined cartons simultaneously in each line, driving means common to each line, each line having a conveyer for continuously advancing prescored carton blanks in spaced relation, means for applying adhesive to selected portions of successive carton blanks, means for applying a lining sheet to successive carton blanks, an intermittently rotated spider having a plurality of radially extended forming blocks and rotated in a vertical plane, means for transferring successive lined blanks into the path of successive forming blocks, spaced stationary carton blank supporting elements between which said forming blocks are moved and across which the transferred carton blanks are straddled, the initial folding operation being performed by engagement of the moving block with the lined blank in cooperation with said stationary supports to effect folding of the blank about three sides of the block during movement of the block from one station to a second station of operation, means for thereafter folding the remaining portions of the lined blanks about the forming blocks to produce lined cartons having a side seam and a bottom closure, and means for removing the lined cartons from successive forming blocks.

References Cited

UNITED STATES PATENTS

| | | | |
|---|---|---|---|
| 1,543,374 | 6/1925 | Evertt | 93—36.01 |
| 2,432,053 | 12/1947 | Waters. | |
| 2,748,833 | 6/1956 | Monroe et al. | 156—352 |
| 2,776,224 | 1/1957 | Cote. | |
| 2,865,262 | 12/1958 | Fradenburgh | 93—36 |
| 3,130,649 | 4/1964 | Striplin et al. | 93—36.6 X |

BERNARD STICKNEY, *Primary Examiner.*